(12) United States Patent
Dhuse et al.

(10) Patent No.: US 12,493,588 B2
(45) Date of Patent: Dec. 9, 2025

(54) GENERATING COMPRESSED COLUMN SLABS FOR STORAGE IN A DATABASE SYSTEM

(71) Applicant: Ocient Holdings LLC, Chicago, IL (US)

(72) Inventors: Greg R. Dhuse, Chicago, IL (US); Wesley H. Darvin, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/520,702

(22) Filed: Nov. 28, 2023

(65) Prior Publication Data

US 2024/0202166 A1 Jun. 20, 2024

Related U.S. Application Data

(60) Provisional application No. 63/387,597, filed on Dec. 15, 2022.

(51) Int. Cl.
*G06F 16/20* (2019.01)
*G06F 16/21* (2019.01)

(52) U.S. Cl.
CPC .................................. *G06F 16/21* (2019.01)

(58) Field of Classification Search
USPC ........................................................ 707/693
See application file for complete search history.

(56) References Cited

U.S. PATENT DOCUMENTS

| | | | |
|---|---|---|---|
| 5,509,131 A | 4/1996 | Smith | |
| 5,548,770 A | 8/1996 | Bridges | |
| 5,628,023 A | 5/1997 | Bryant | |
| 5,921,582 A | 7/1999 | Gusack | |
| 6,195,661 B1 | 2/2001 | Filepp | |
| 6,230,200 B1 | 5/2001 | Forecast | |
| 6,473,847 B1 | 10/2002 | Kamiya | |
| 6,633,772 B2 | 10/2003 | Ford | |
| 6,816,280 B1 | 11/2004 | Davenport | |
| 6,816,957 B1 | 11/2004 | Halladay | |

(Continued)

OTHER PUBLICATIONS

A new high performance fabric for HPC, Michael Feldman, May 2016, Intersect360 Research.

(Continued)

*Primary Examiner* — Belix M Ortiz Ditren

(74) *Attorney, Agent, or Firm* — Garlick & Markison; Timothy W. Markison

(57) ABSTRACT

A database system is operable to determine a dataset for storage that includes, for each row, a plurality of column values corresponding to a plurality of columns. A plurality of column slab data are generated from the dataset, where each of the plurality of column slab data includes column values for one of the plurality of columns. Each of a plurality of compression dictionaries are trained from a corresponding one of the plurality of column slab data. Each segment of the plurality of segments is generated based on writing a set of compressed column slabs to the each segment based on compressing each of a corresponding set of the plurality of column slab data as a set of variable-length compression frames written to the each segment based on applying a corresponding one of the plurality of compression dictionaries.

20 Claims, 53 Drawing Sheets

(56) References Cited

U.S. PATENT DOCUMENTS

| | | |
|---|---|---|
| 7,499,907 B2 | 3/2009 | Brown |
| 7,783,858 B2 | 8/2010 | Chiang |
| 7,908,242 B1 | 3/2011 | Achanta |
| 8,880,695 B2 | 11/2014 | Sakai |
| 9,547,435 B2 | 1/2017 | Kim |
| 10,354,423 B2 | 7/2019 | Ozawa |
| 11,080,277 B2 * | 8/2021 | Kondiles ............. G06F 16/2453 |
| 2001/0051949 A1 | 12/2001 | Carey |
| 2002/0032676 A1 | 3/2002 | Reiner |
| 2002/0116417 A1 | 8/2002 | Weinberg |
| 2004/0162853 A1 | 8/2004 | Brodersen |
| 2004/0215919 A1 | 10/2004 | Emmes |
| 2006/0212944 A1 | 9/2006 | Hara |
| 2008/0133456 A1 | 6/2008 | Richards |
| 2008/0204806 A1 | 8/2008 | Tao |
| 2009/0063893 A1 | 3/2009 | Bagepalli |
| 2009/0183167 A1 | 7/2009 | Kupferschmidt |
| 2010/0082577 A1 | 4/2010 | Mirchandani |
| 2010/0115172 A1 | 5/2010 | Gillingham |
| 2010/0241646 A1 | 9/2010 | Friedman |
| 2010/0274983 A1 | 10/2010 | Murphy |
| 2010/0312756 A1 | 12/2010 | Zhang |
| 2011/0219169 A1 | 9/2011 | Zhang |
| 2012/0109888 A1 | 5/2012 | Zhang |
| 2012/0150008 A1 | 6/2012 | Kaib |
| 2012/0151118 A1 | 6/2012 | Flynn |
| 2012/0185866 A1 | 7/2012 | Couvee |
| 2012/0210095 A1 | 8/2012 | Nellans |
| 2012/0254252 A1 | 10/2012 | Jin |
| 2012/0311246 A1 | 12/2012 | Mcwilliams |
| 2013/0166690 A1 | 6/2013 | Shatzkamer |
| 2013/0262409 A1 * | 10/2013 | Amit ..................... G06F 3/0638 707/693 |
| 2013/0332484 A1 | 12/2013 | Gajic |
| 2014/0047095 A1 | 2/2014 | Breternitz |
| 2014/0136510 A1 | 5/2014 | Parkkinen |
| 2014/0188841 A1 | 7/2014 | Sun |
| 2014/0201351 A1 | 7/2014 | Fransen |
| 2015/0205607 A1 | 7/2015 | Lindholm |
| 2015/0244804 A1 | 8/2015 | Warfield |
| 2015/0248366 A1 | 9/2015 | Bergsten |
| 2015/0293966 A1 | 10/2015 | Cai |
| 2015/0310045 A1 | 10/2015 | Konik |
| 2016/0034547 A1 | 2/2016 | Lerios |
| 2016/0062805 A1 | 3/2016 | Kumar |
| 2017/0330596 A1 | 11/2017 | Segal |
| 2018/0089867 A1 | 3/2018 | Ozawa |
| 2018/0107598 A1 | 4/2018 | Prodromou |
| 2018/0137187 A1 | 5/2018 | Brodt |
| 2018/0198842 A1 | 7/2018 | Chandran |
| 2018/0285414 A1 | 10/2018 | Kondiles |
| 2018/0316569 A1 | 11/2018 | Cilfone |
| 2019/0297143 A1 | 9/2019 | Anadon |
| 2020/0125568 A1 | 4/2020 | Idicula |
| 2025/0021148 A1 * | 1/2025 | Gladwin ................. G06F 1/263 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy . . . com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci572120011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 node 37

FIG. 20 query processing system 2510 query execution module 2504 database system 10 database system 10 query execution module 2504 database system 10 database system 10 query processing system 2510 query processing system 2510 database system 10 database system 10 segment 2424

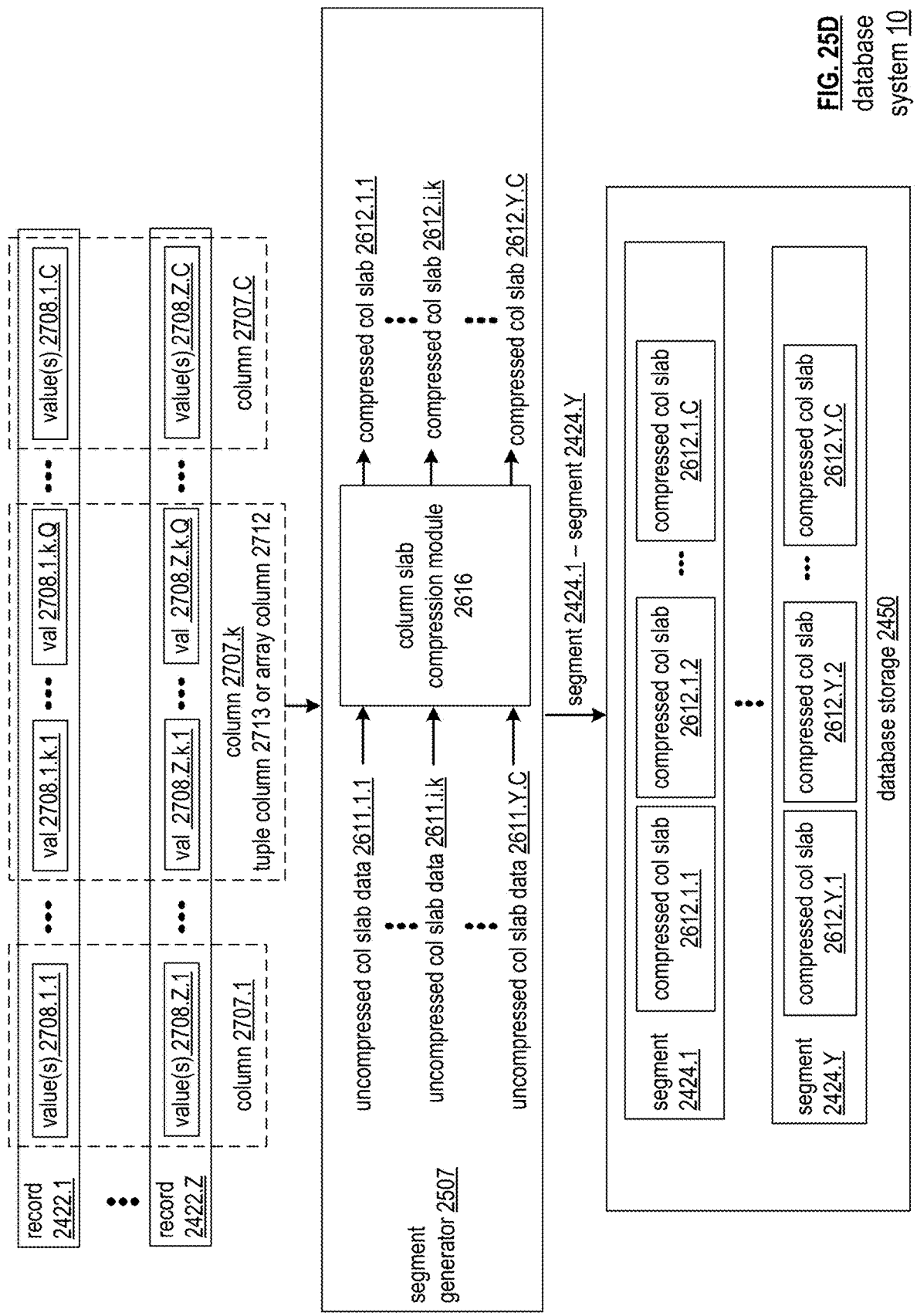

database system 10

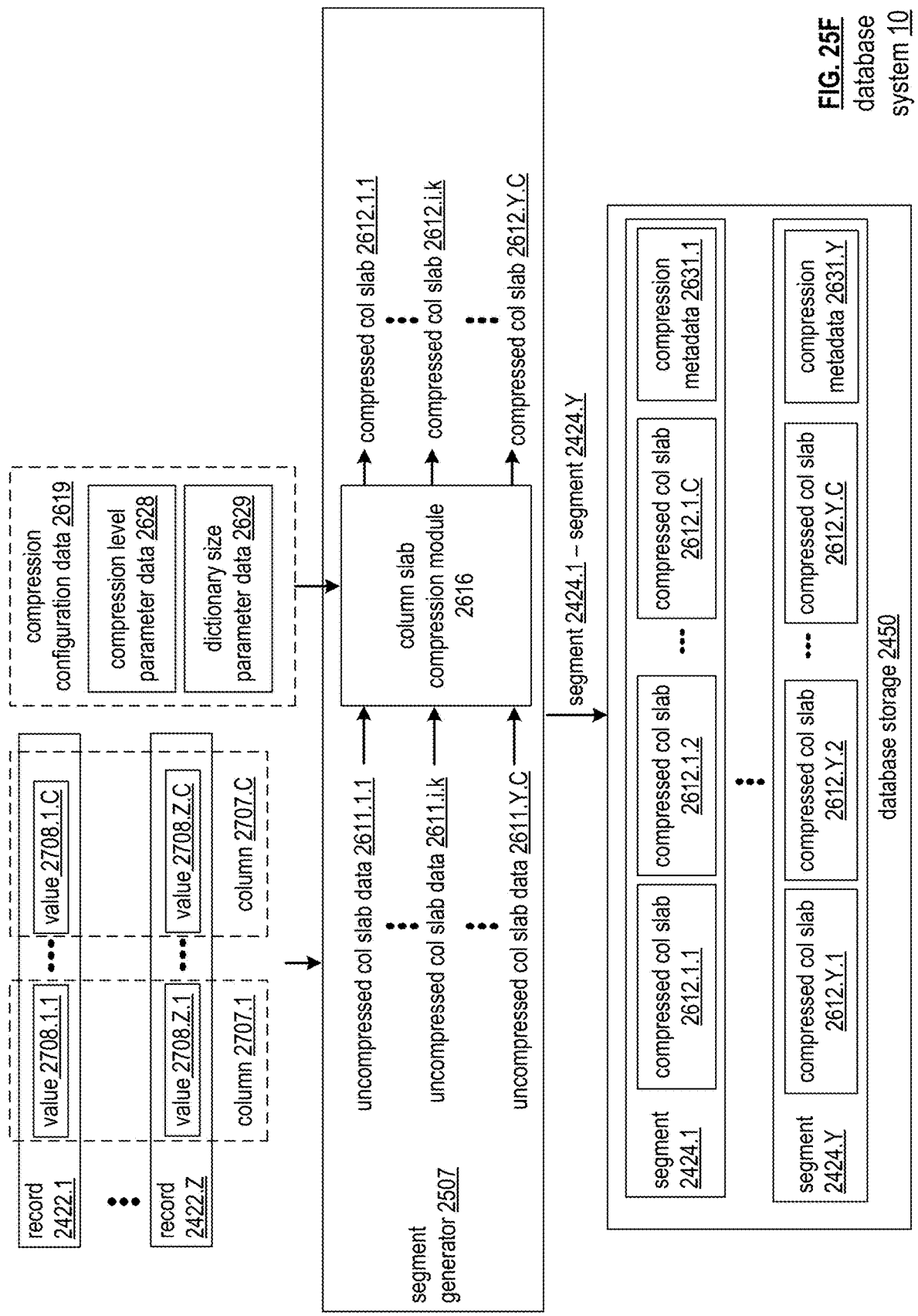
FIG. 25F database system 10 database system 10

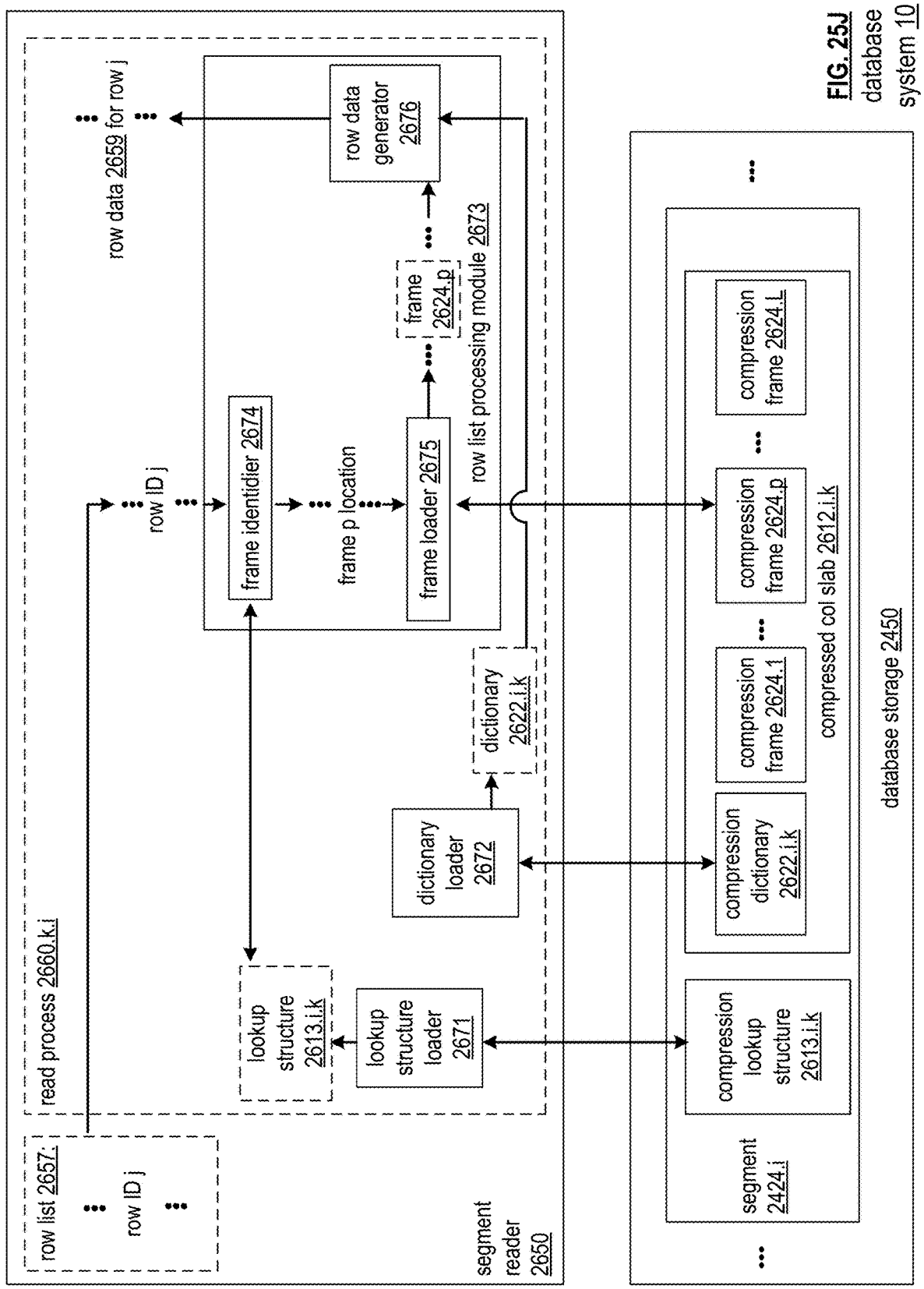

query execution module 2504

GENERATING COMPRESSED COLUMN SLABS FOR STORAGE IN A DATABASE SYSTEM

CROSS-REFERENCE TO RELATED APPLICATIONS

The present U.S. Utility patent application claims priority pursuant to 35 U.S.C. § 119(e) to U.S. Provisional Application No. 63/387,597, entitled "UTILIZING COMPRESSED COLUMN SLABS IN A DATABASE SYSTEM", filed Dec. 15, 2022, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 25D is a schematic block diagram of a database system 10 that generates compressed column slabs for a tuple and/or array column in accordance with various embodiments;

FIG. 25F is a schematic block diagram of a segment generator that implements a column slab compression module based on compression configuration data in accordance with various embodiments;

FIG. 25J is a schematic block diagram of a segment reader that implements a row list processing module to generate row data from a compressed column slab in accordance with various embodiments;

DETAILED DESCRIPTION OF THE INVENTION

Figure 1:
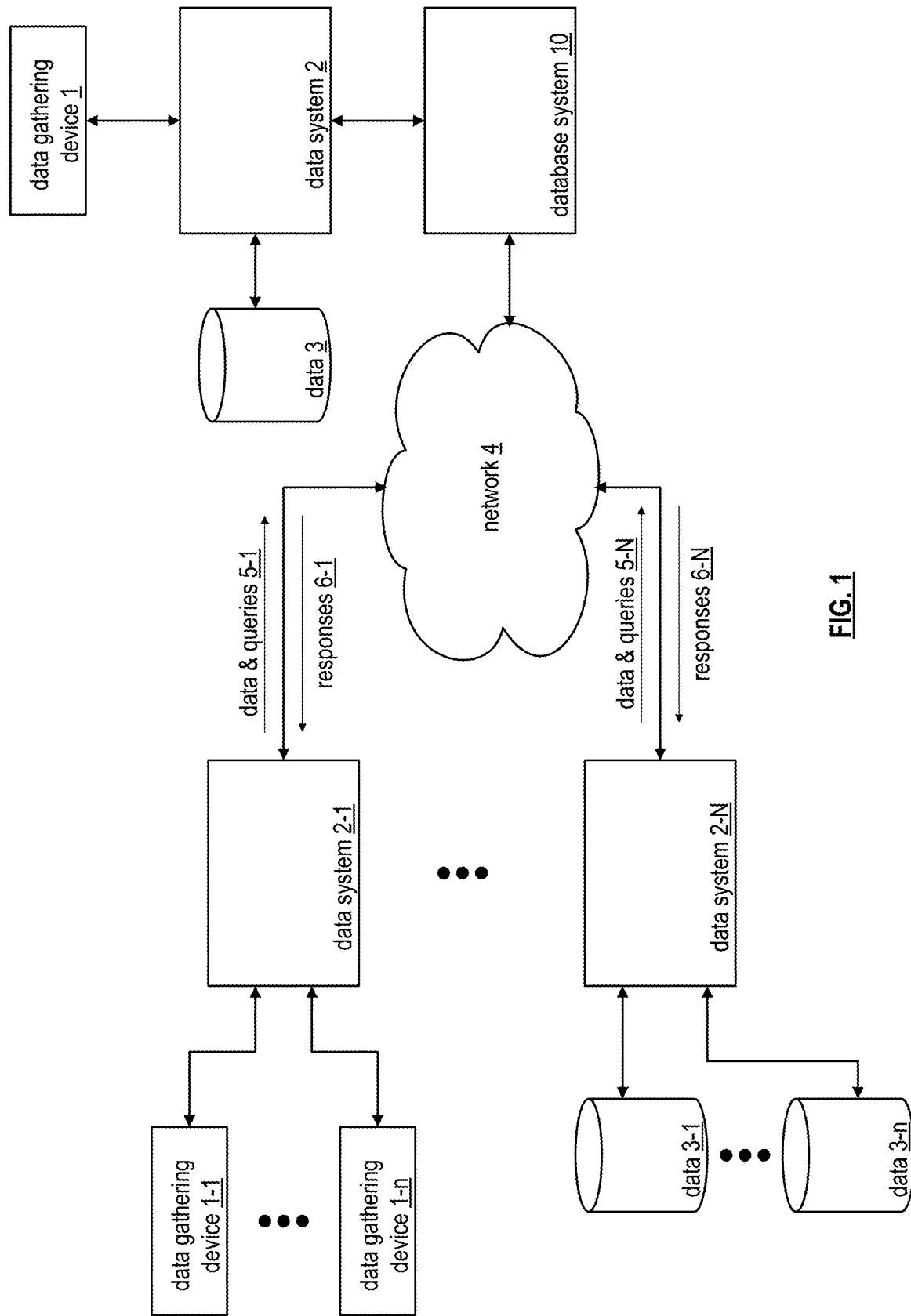
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
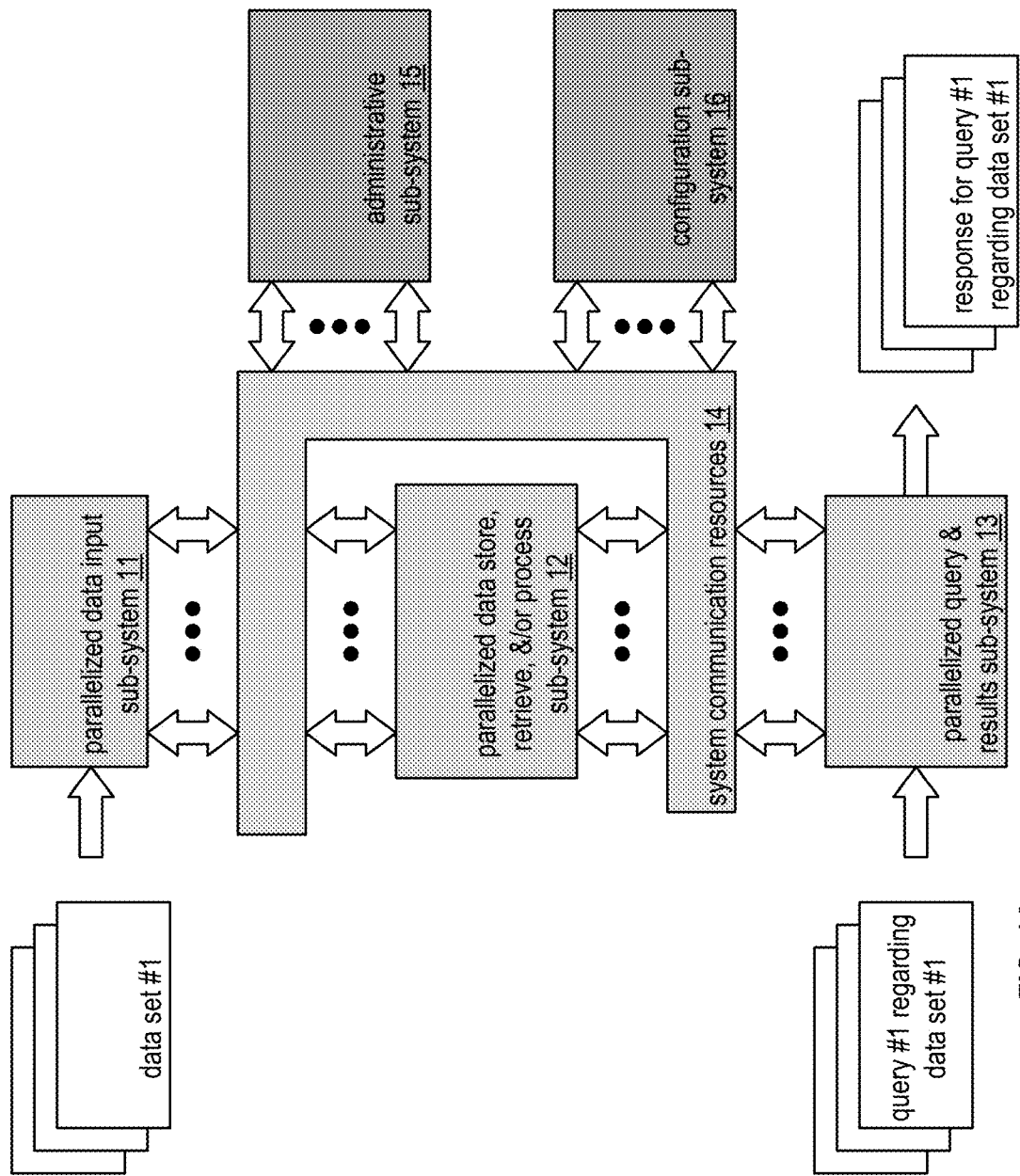
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches for dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
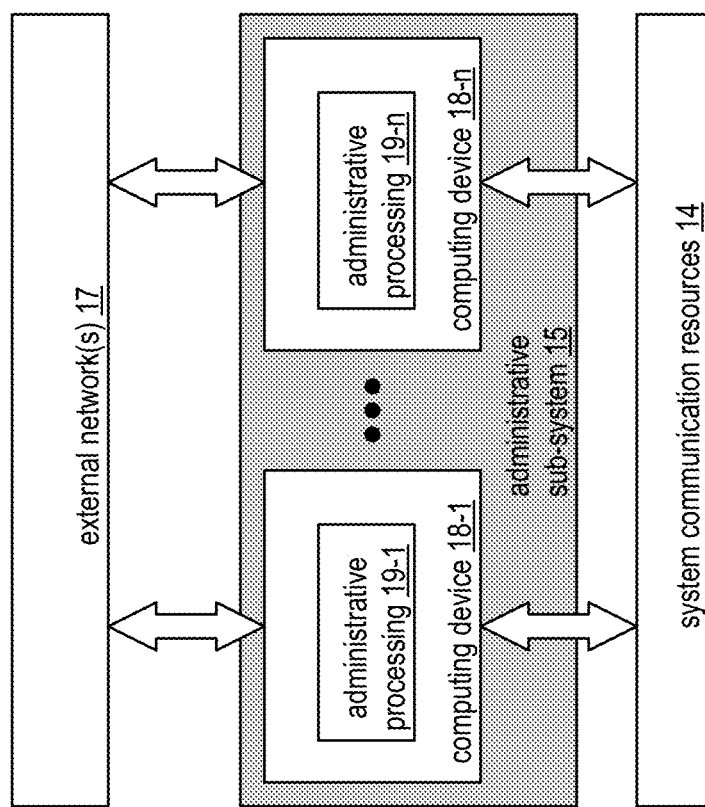
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
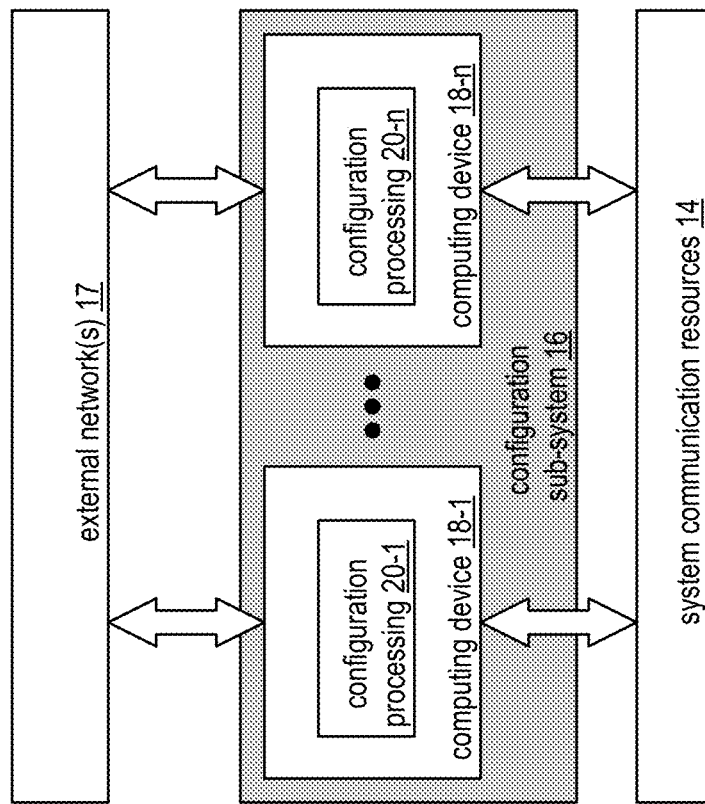
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
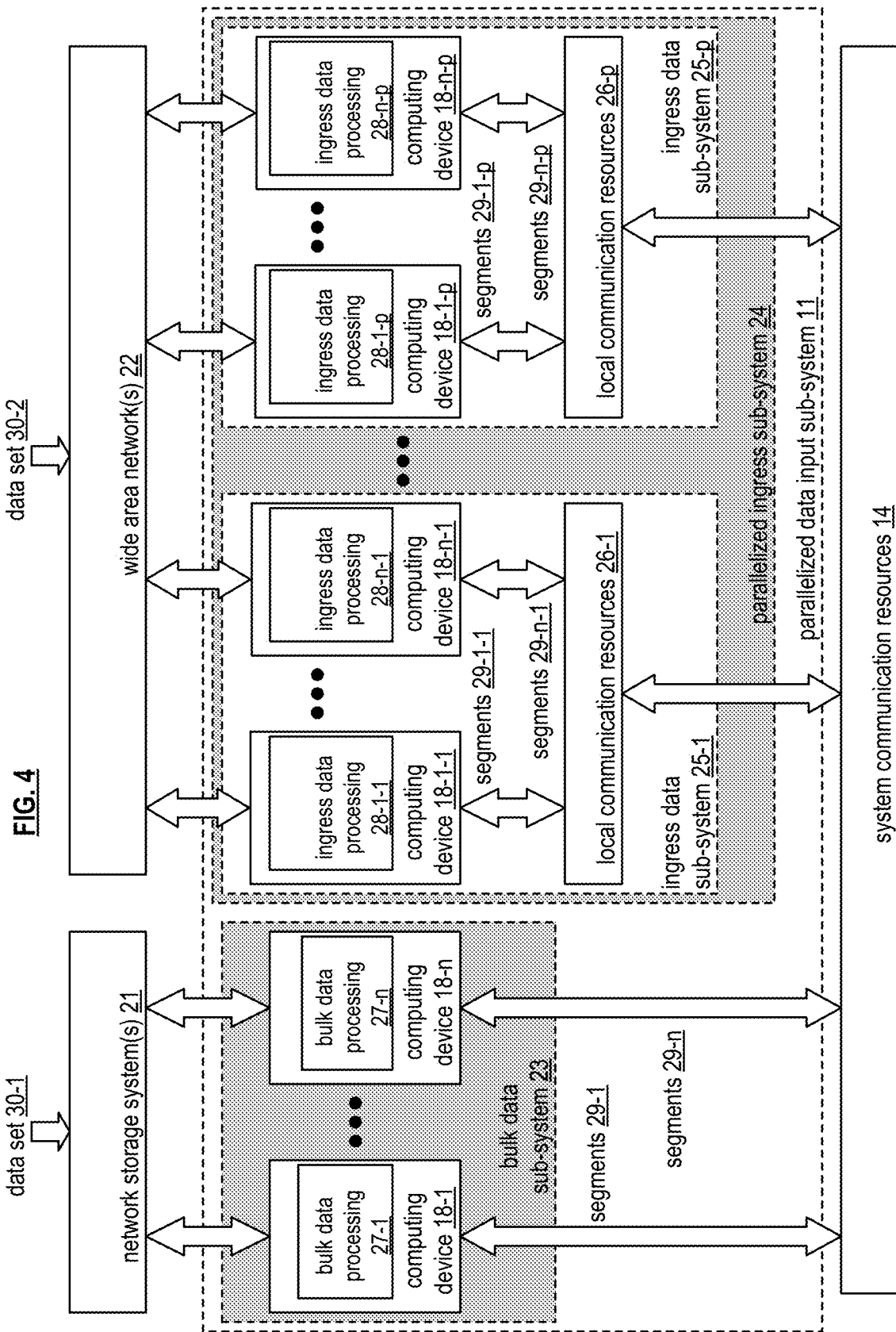
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
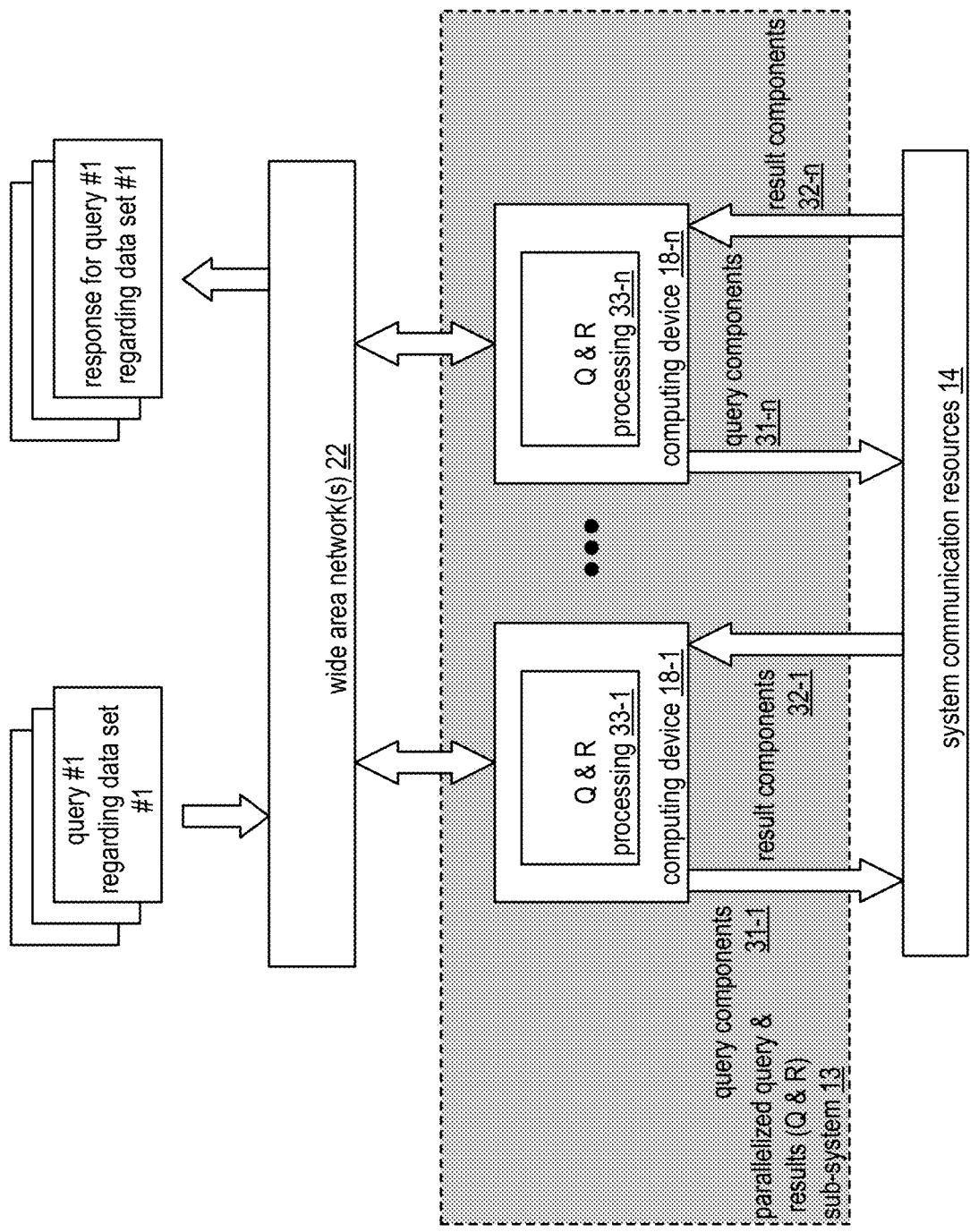
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently.

For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
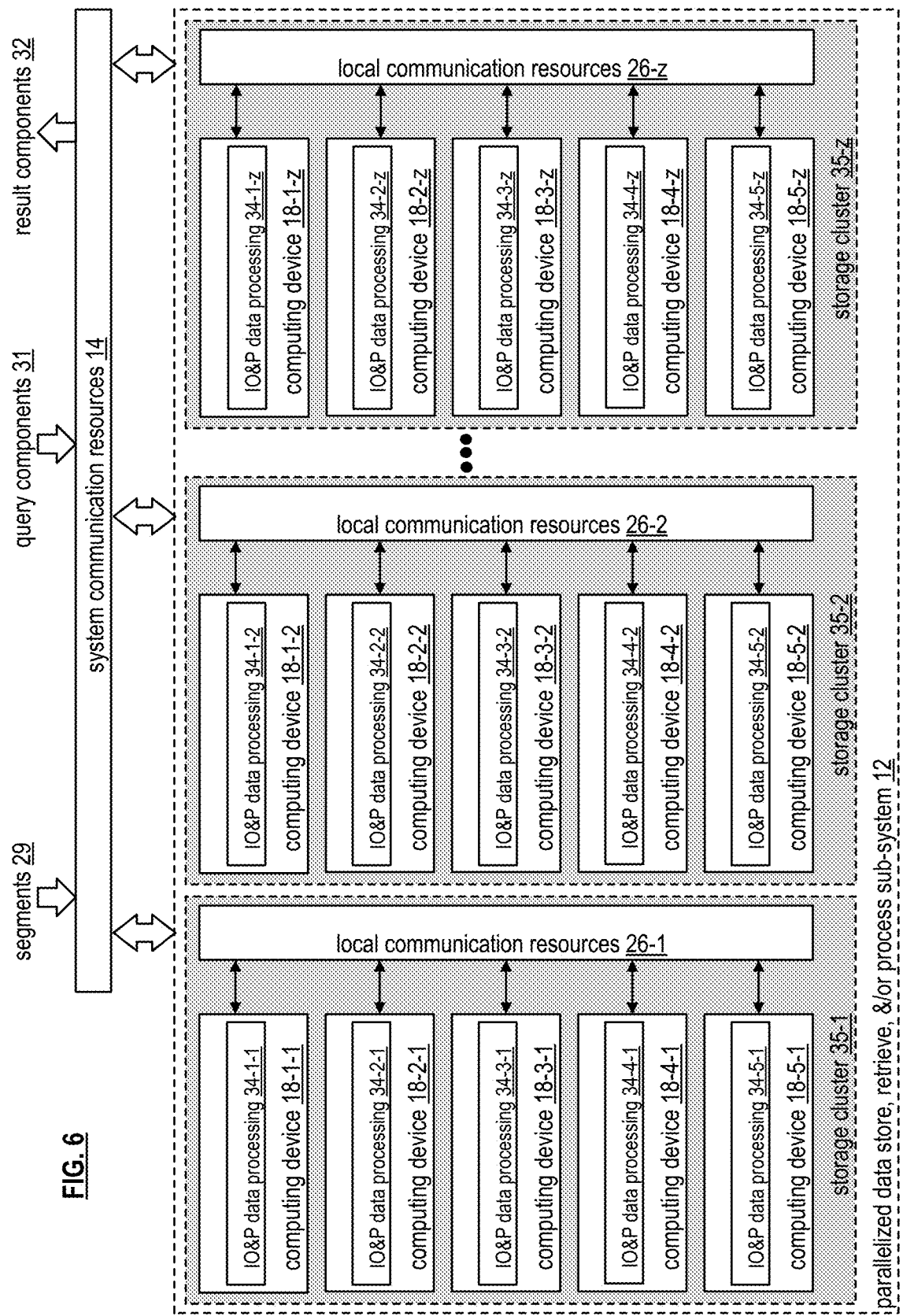
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
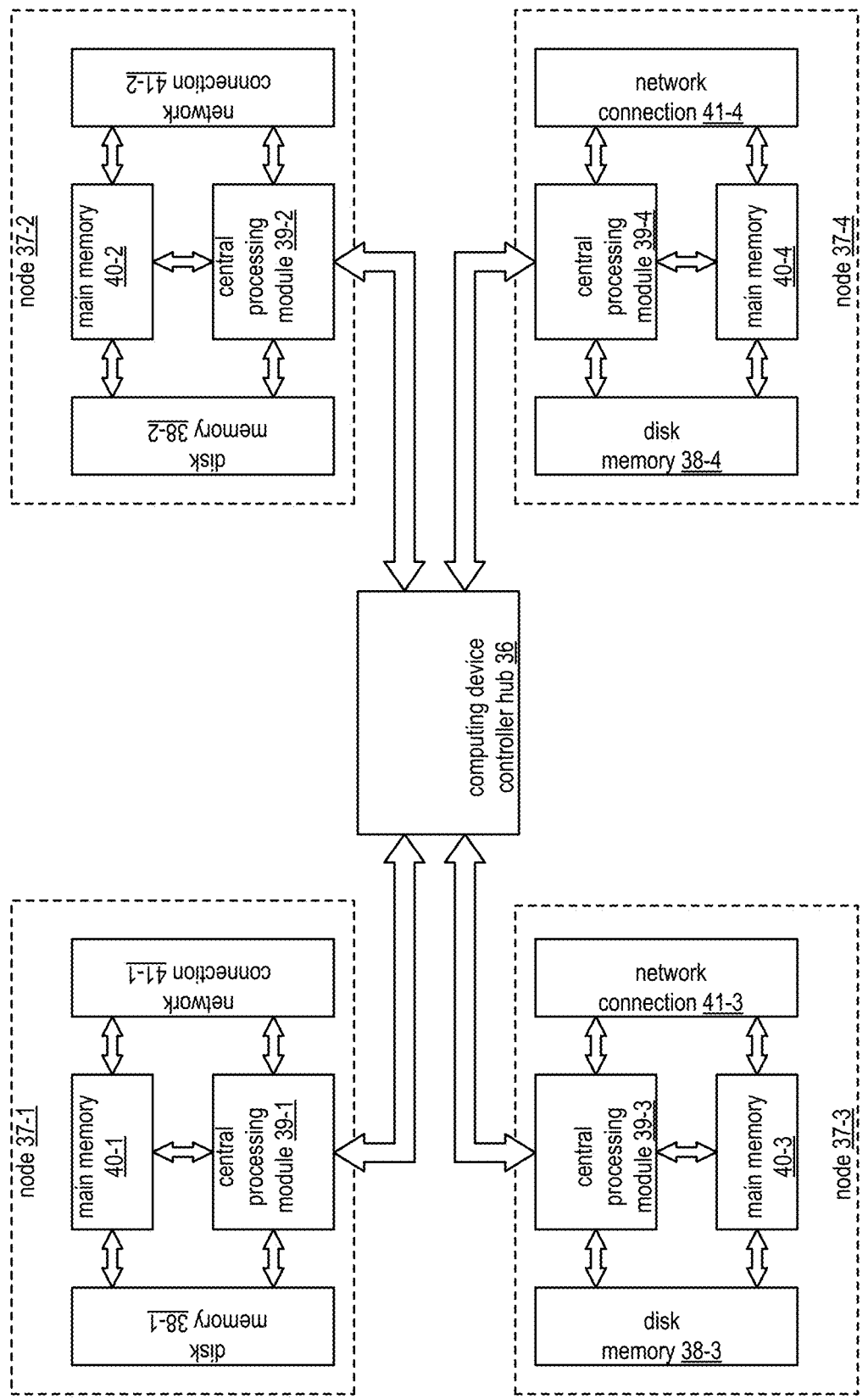
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
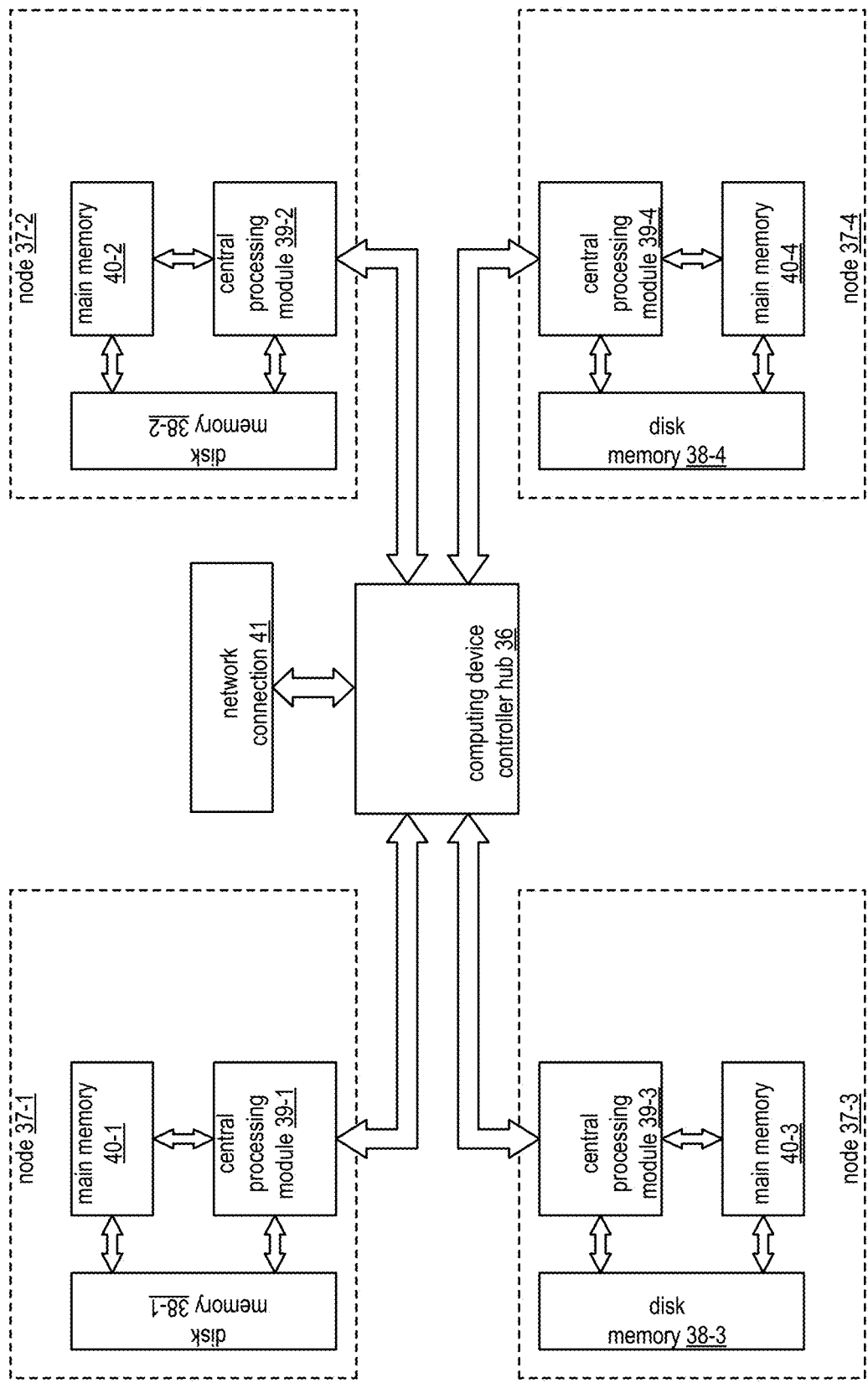
FIG. 8 is a schematic block diagram of another embodiment of a computing device in accordance with the present invention.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
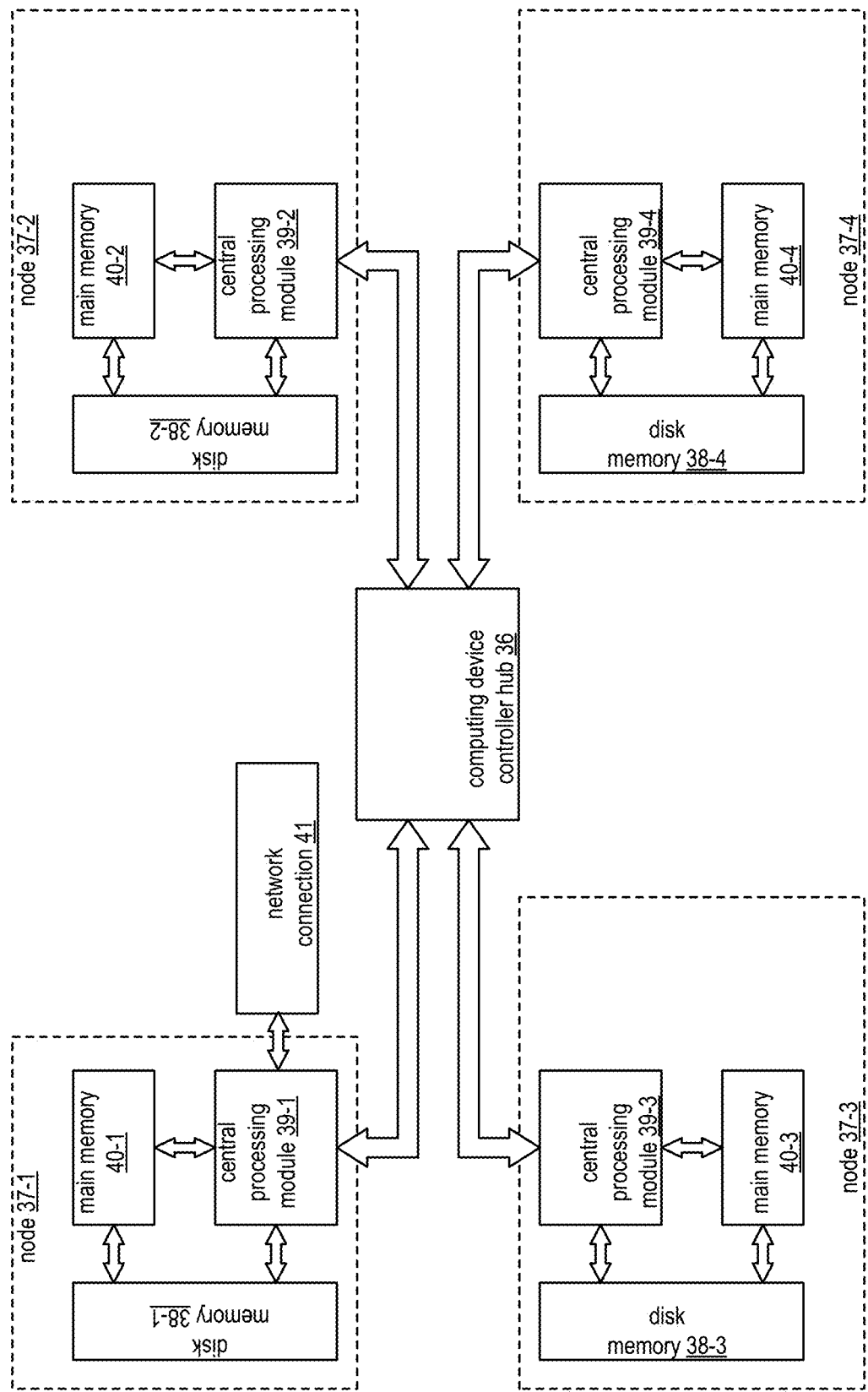
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
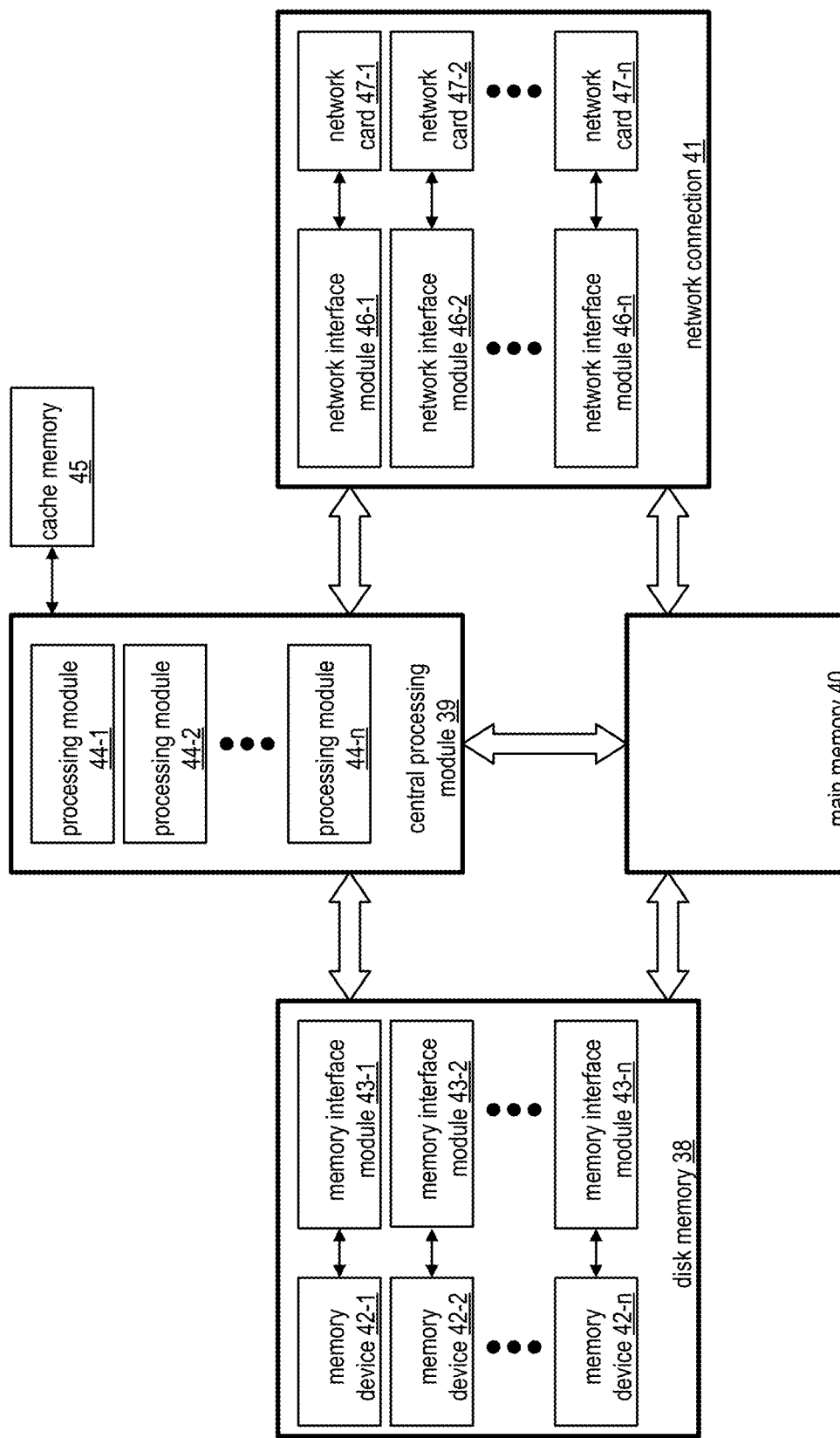
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
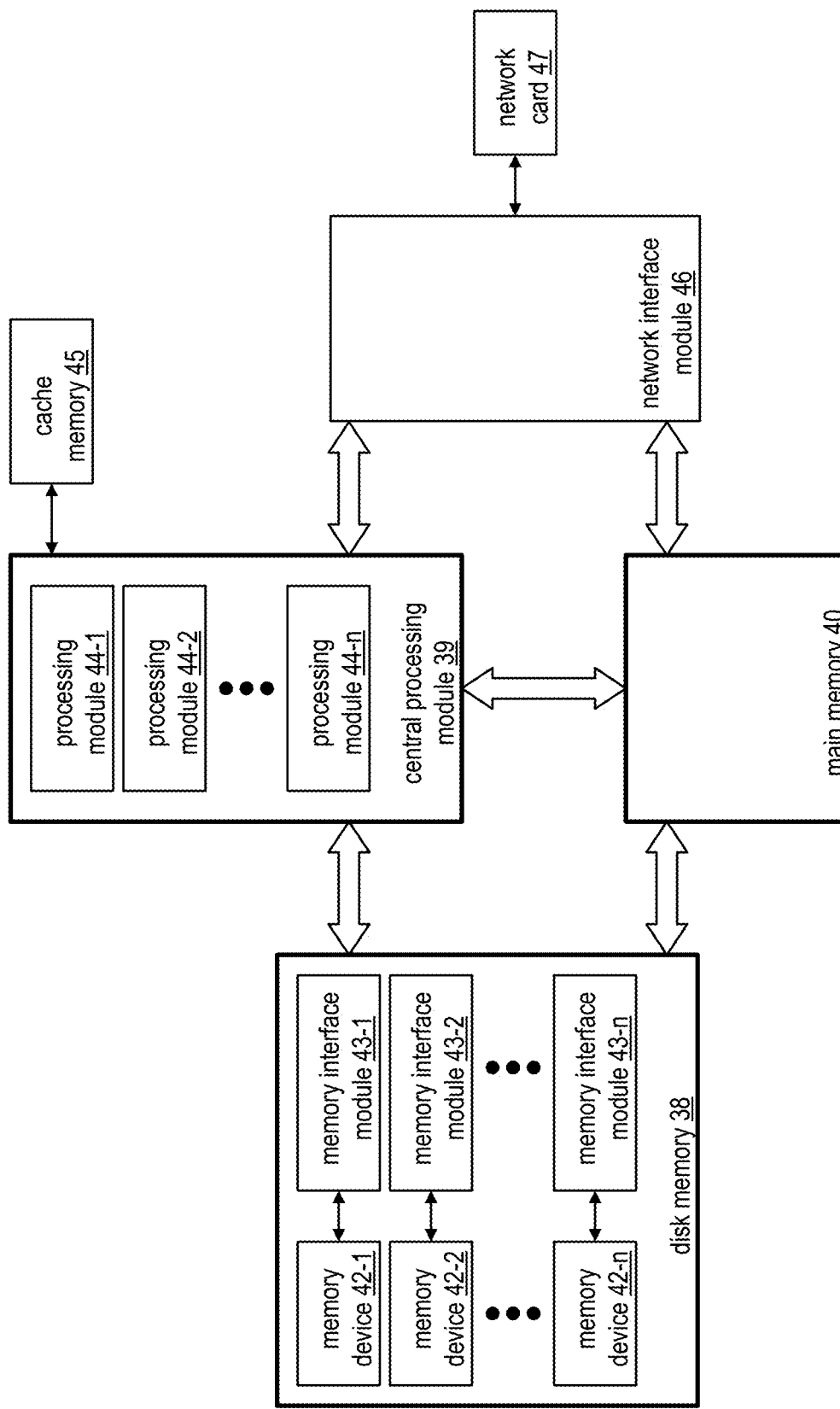
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
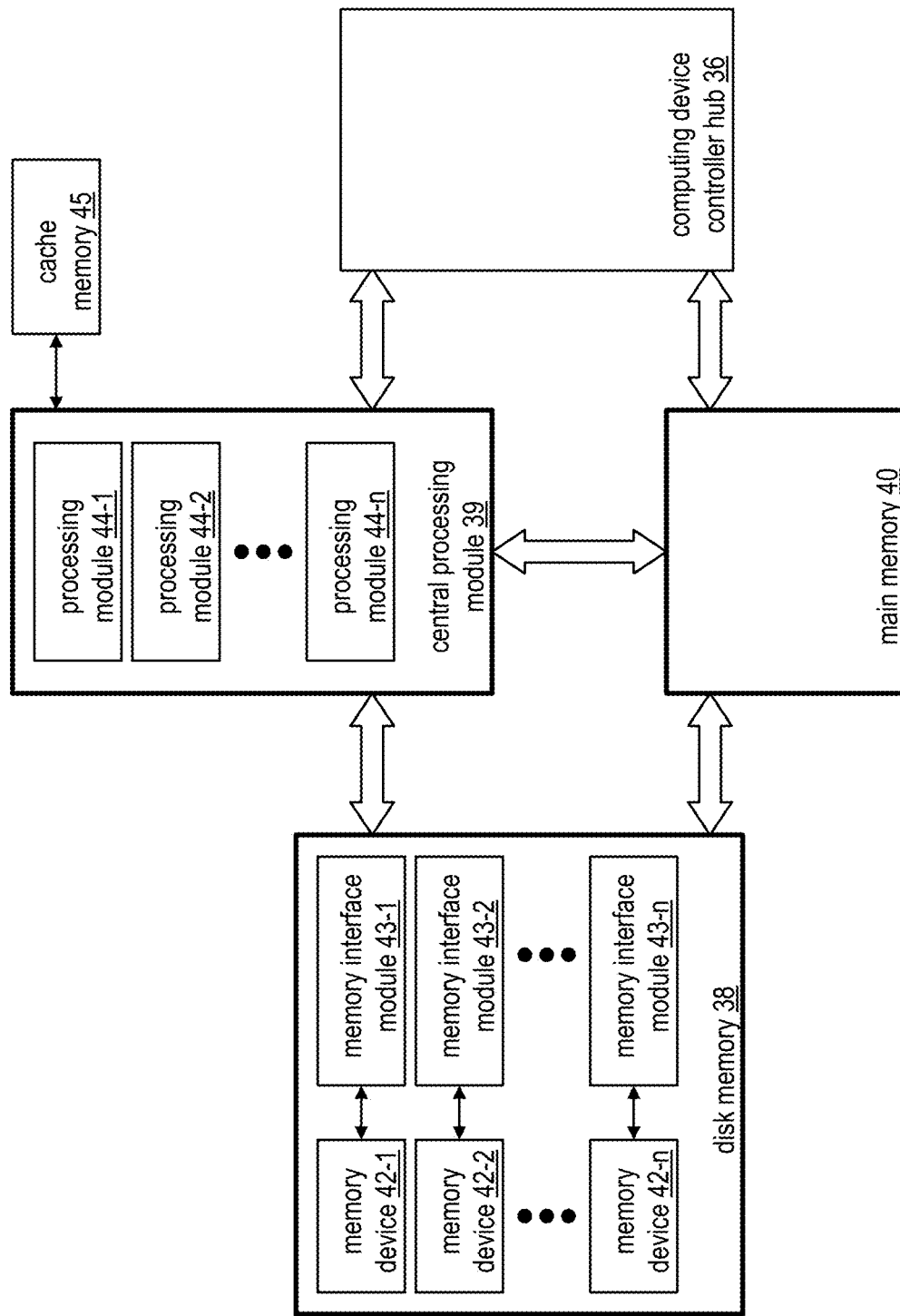
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
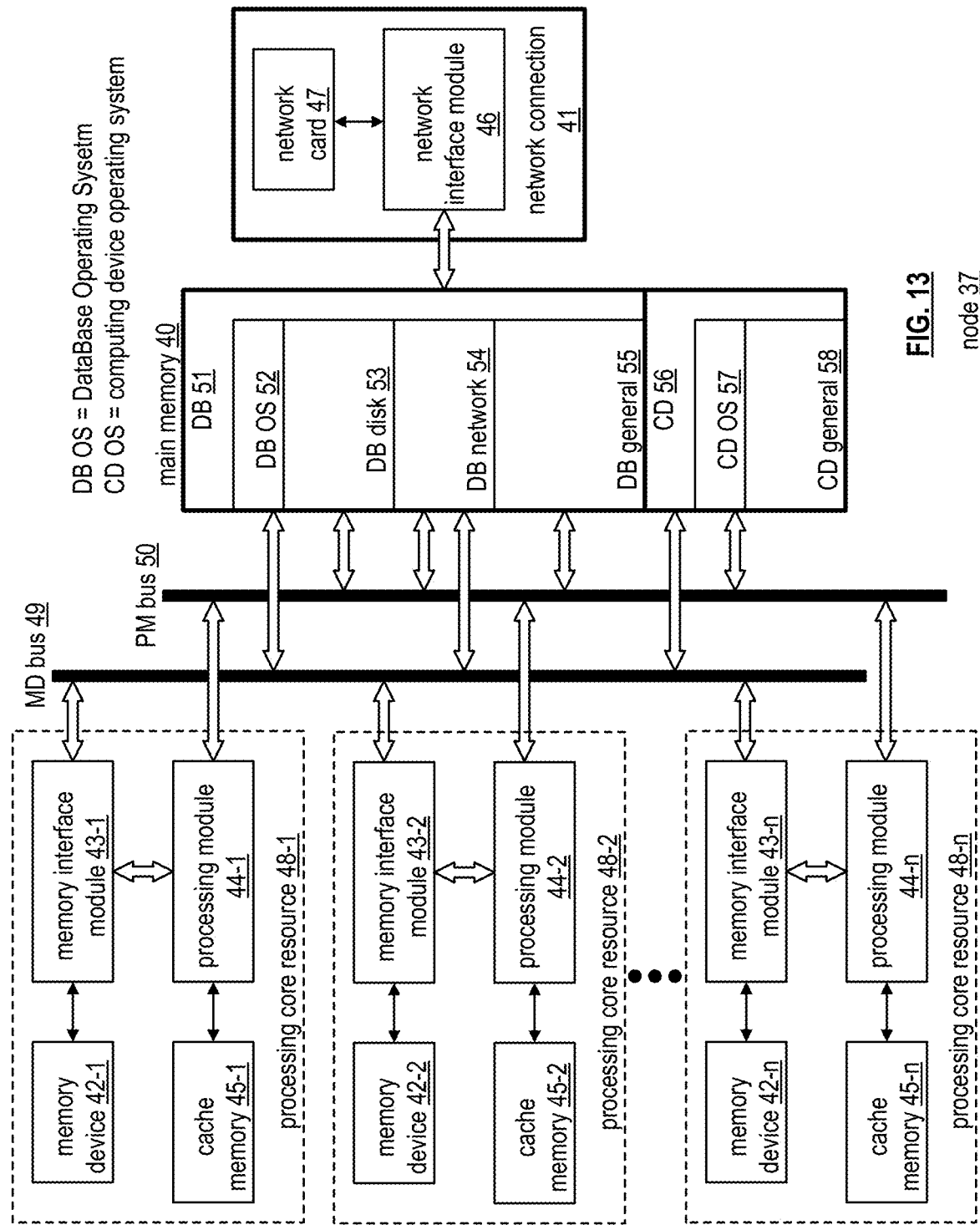
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
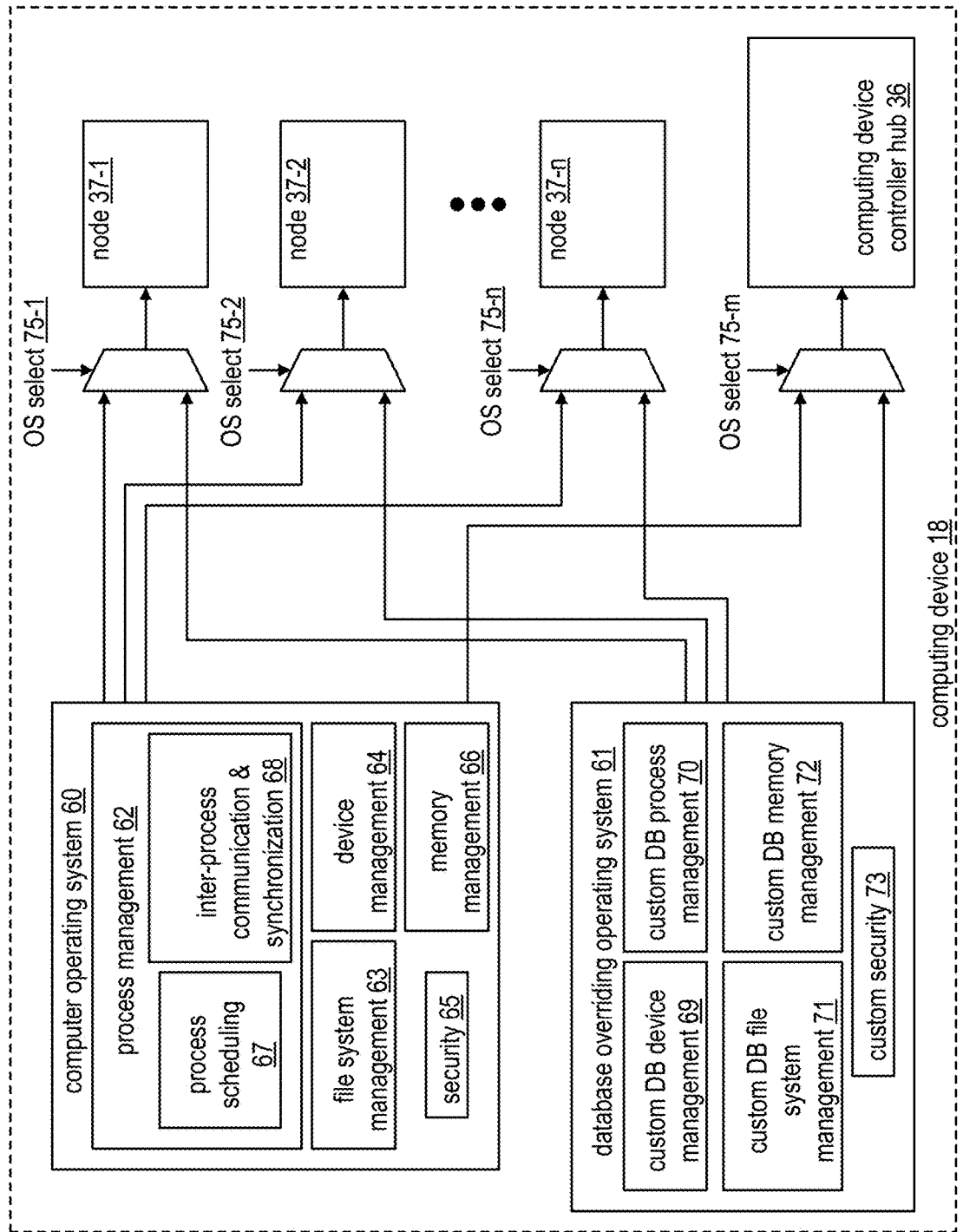
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Terabytes, Petabytes, and/or Exabytes of data. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform multiple independent processes, such as hundreds, thousands, and/or millions of independent processes, in parallel and/or within overlapping time spans.

The database system 10 improves the technology of database system by enabling data to be processed at a massive scale efficiently and/or reliably.

In particular, the database system 10 can be operable to receive data and to store received data at a massive scale. For example, the parallelized retrieval of data and/or query processing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records massive scale in conjunction with query execution, where millions, billions, and/or trillions of records that collectively include many Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale cannot practically be performed by the human mind. The processing of queries at this massive scale improves database system by facilitating greater depth and/or insights of query resultants for queries performed upon this massive scale of data.

Furthermore, the database system 10 can be operable to perform multiple queries concurrently upon data at a massive scale. For example, the parallelized retrieval and processing data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves database system by facilitating greater numbers of users and/or greater numbers of analyses to be serviced within a given time frame and/or over time.

Figure 15:
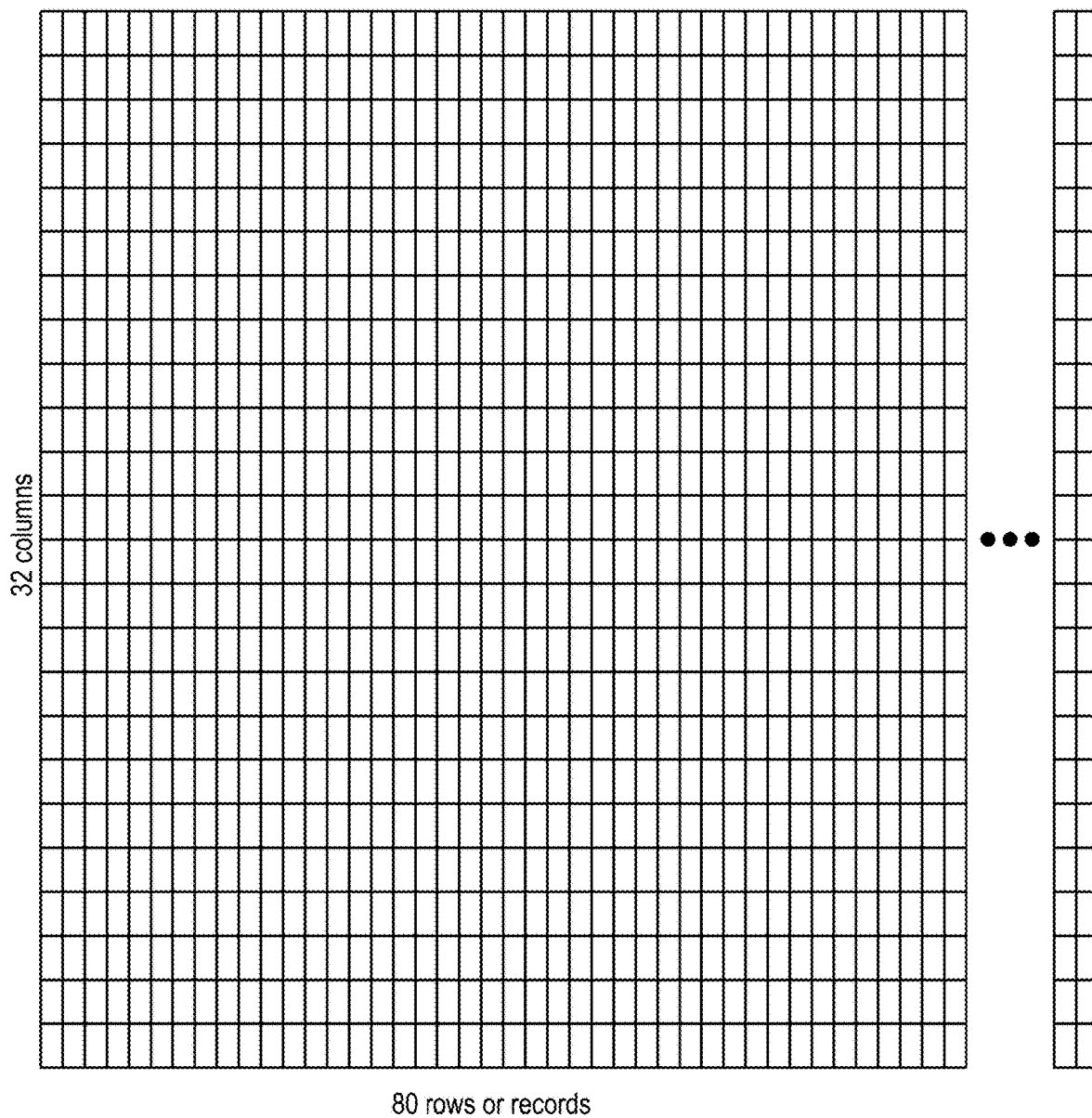

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
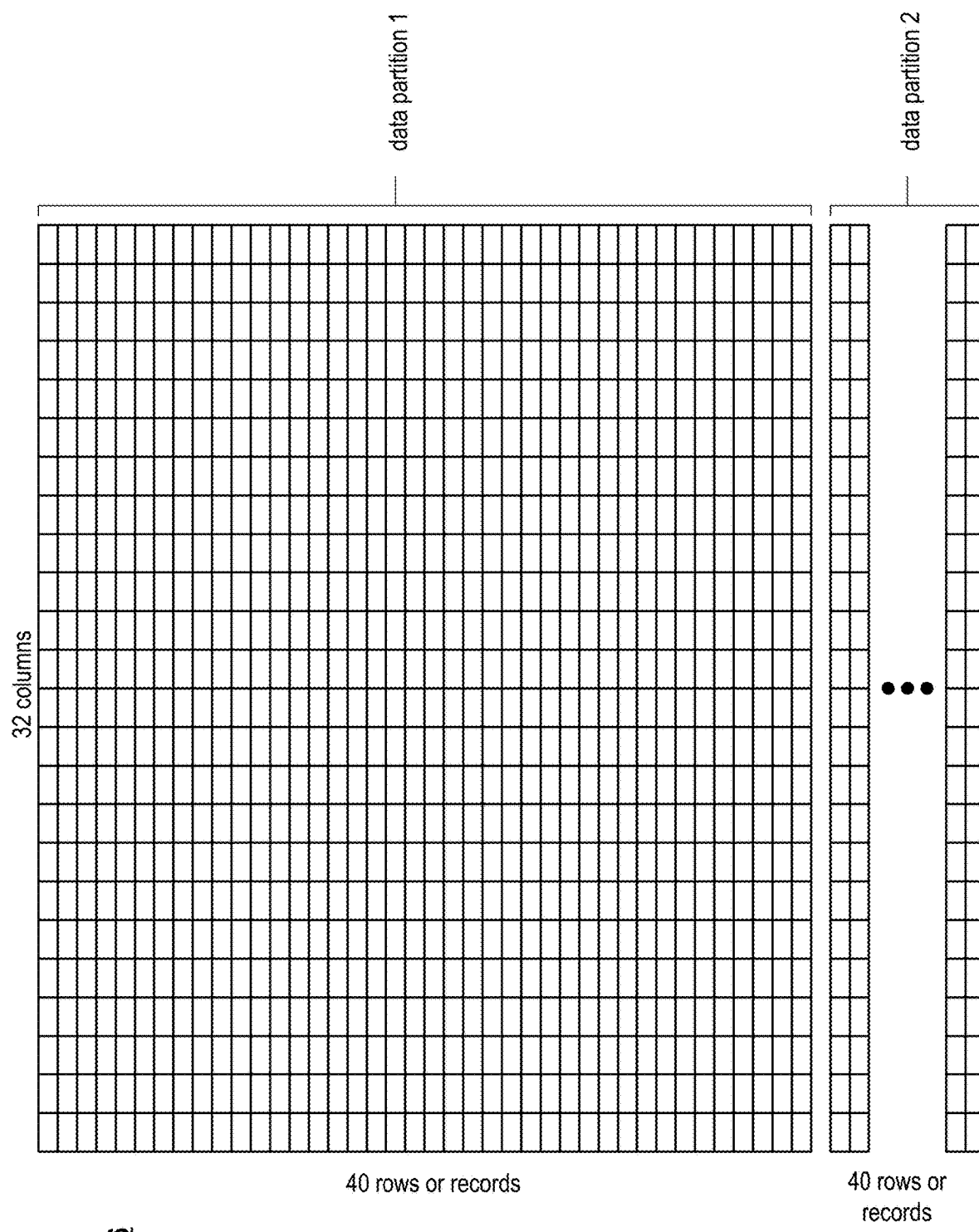

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
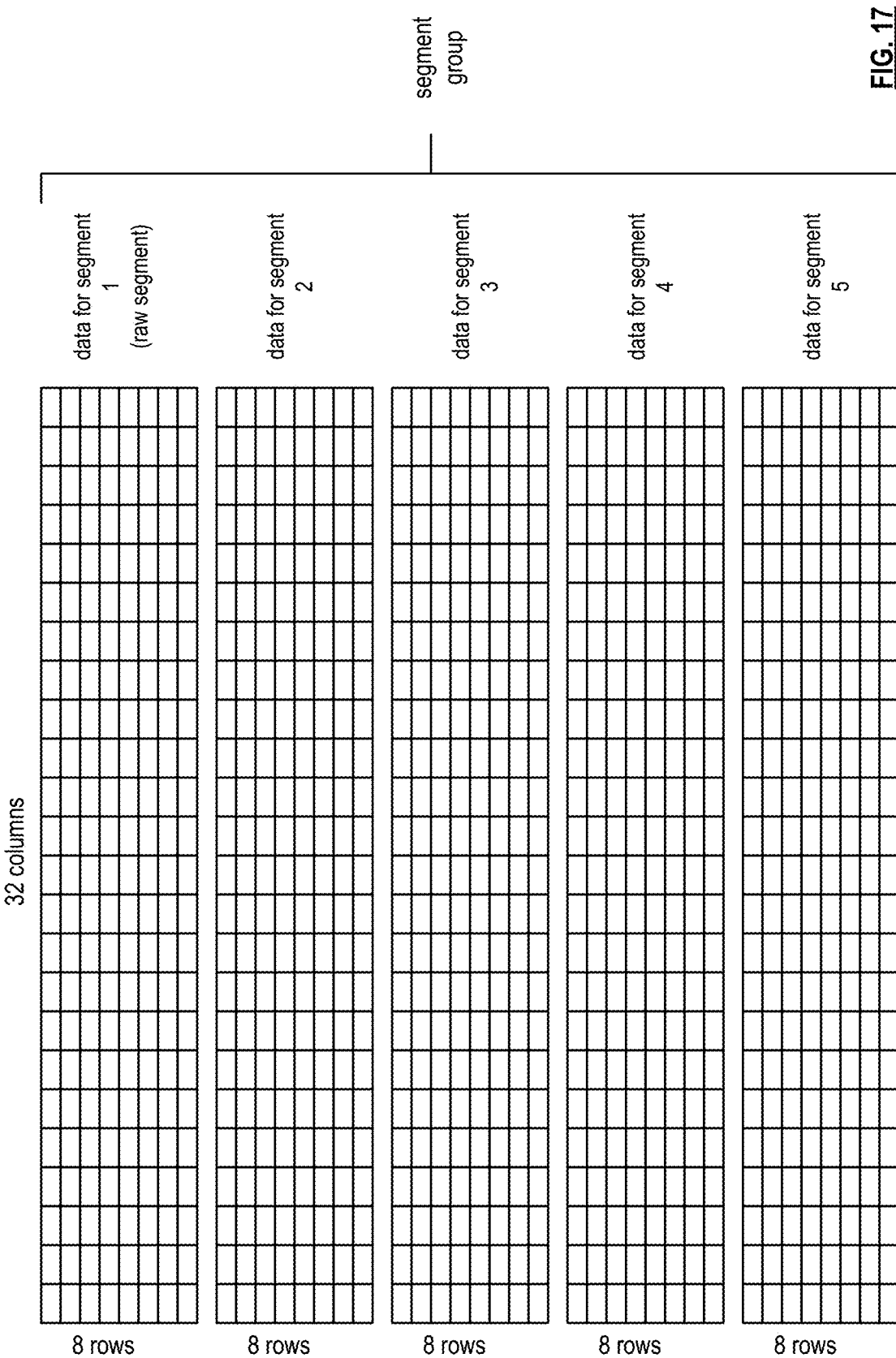

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
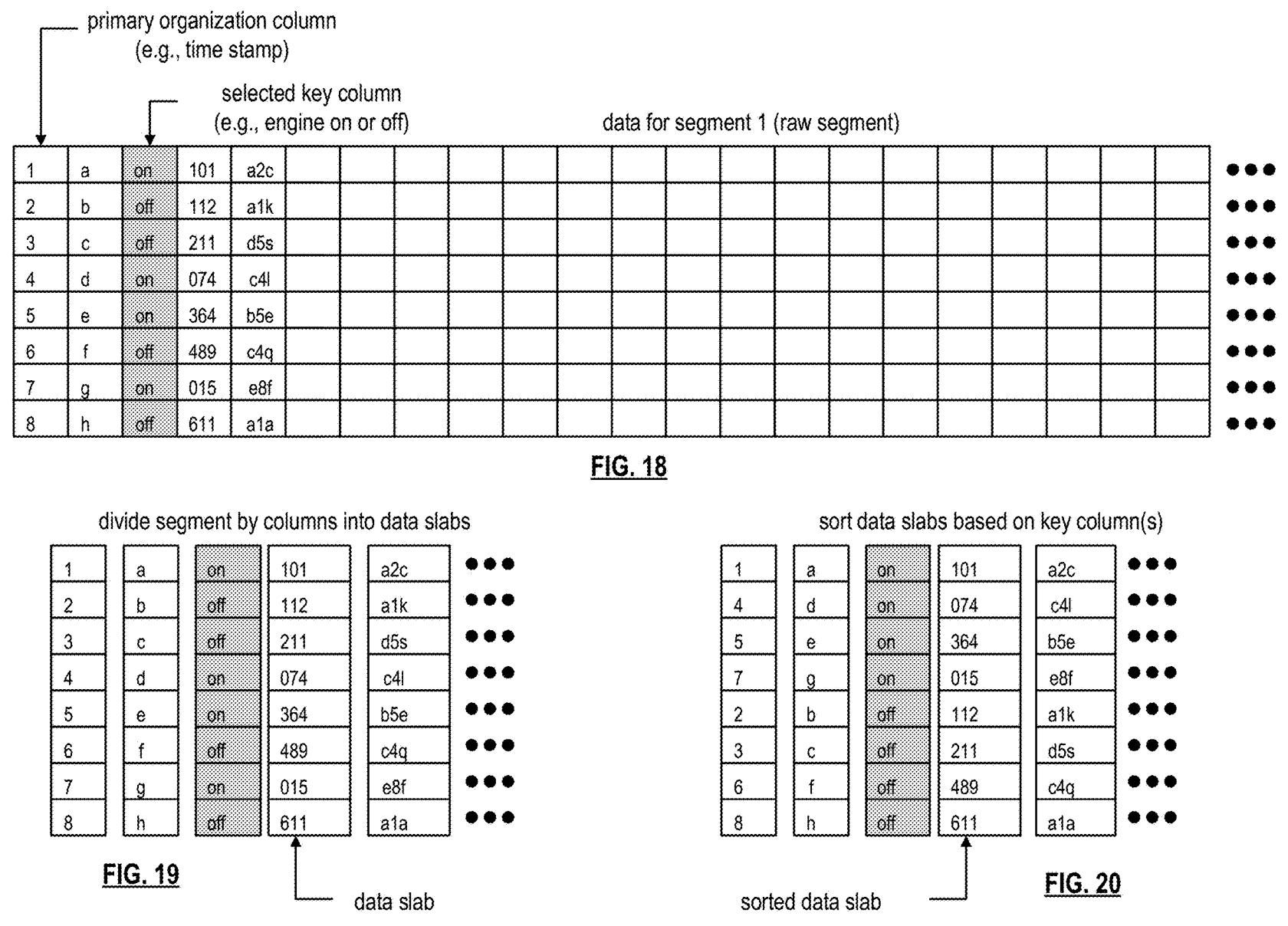

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
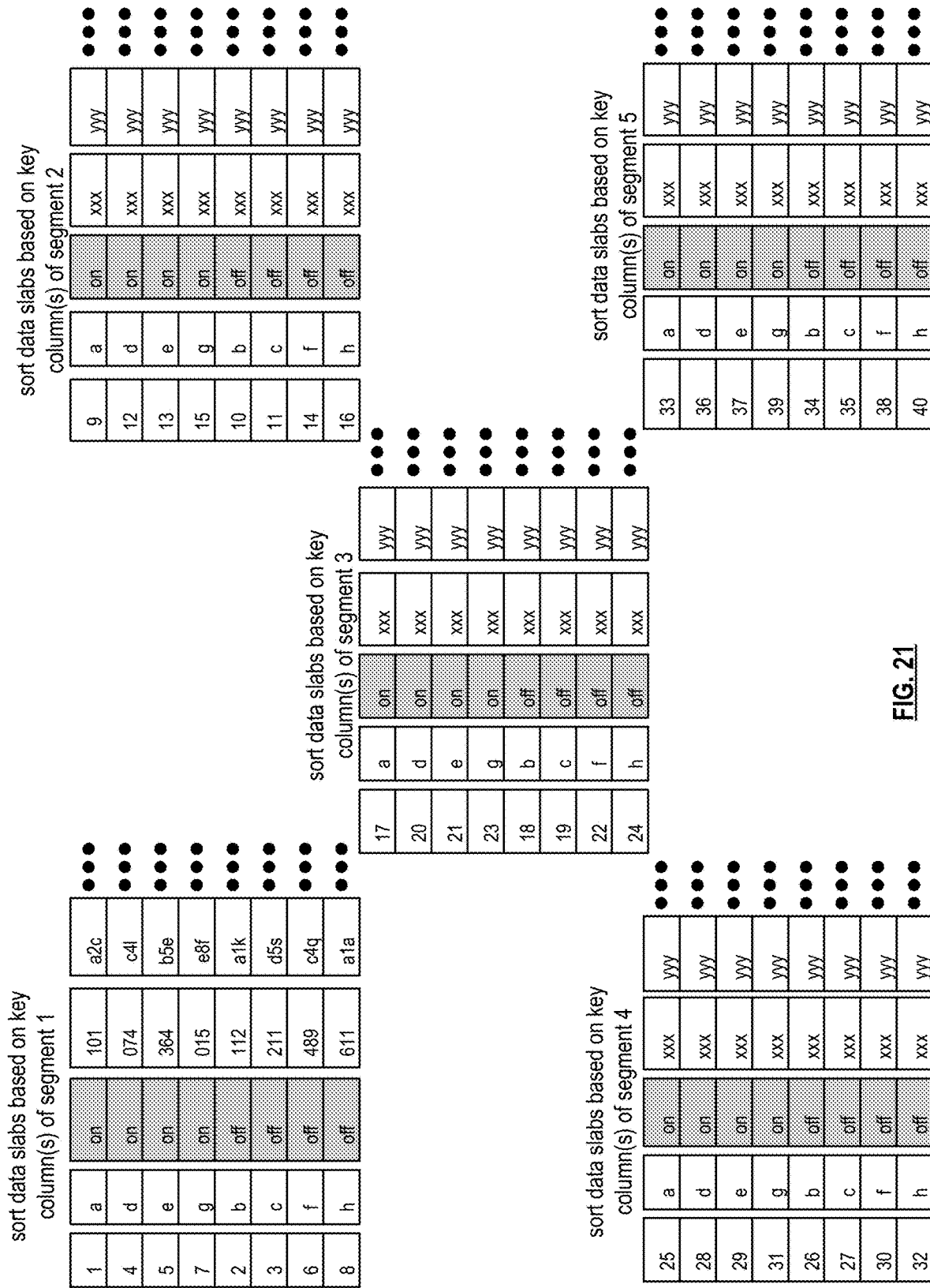

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
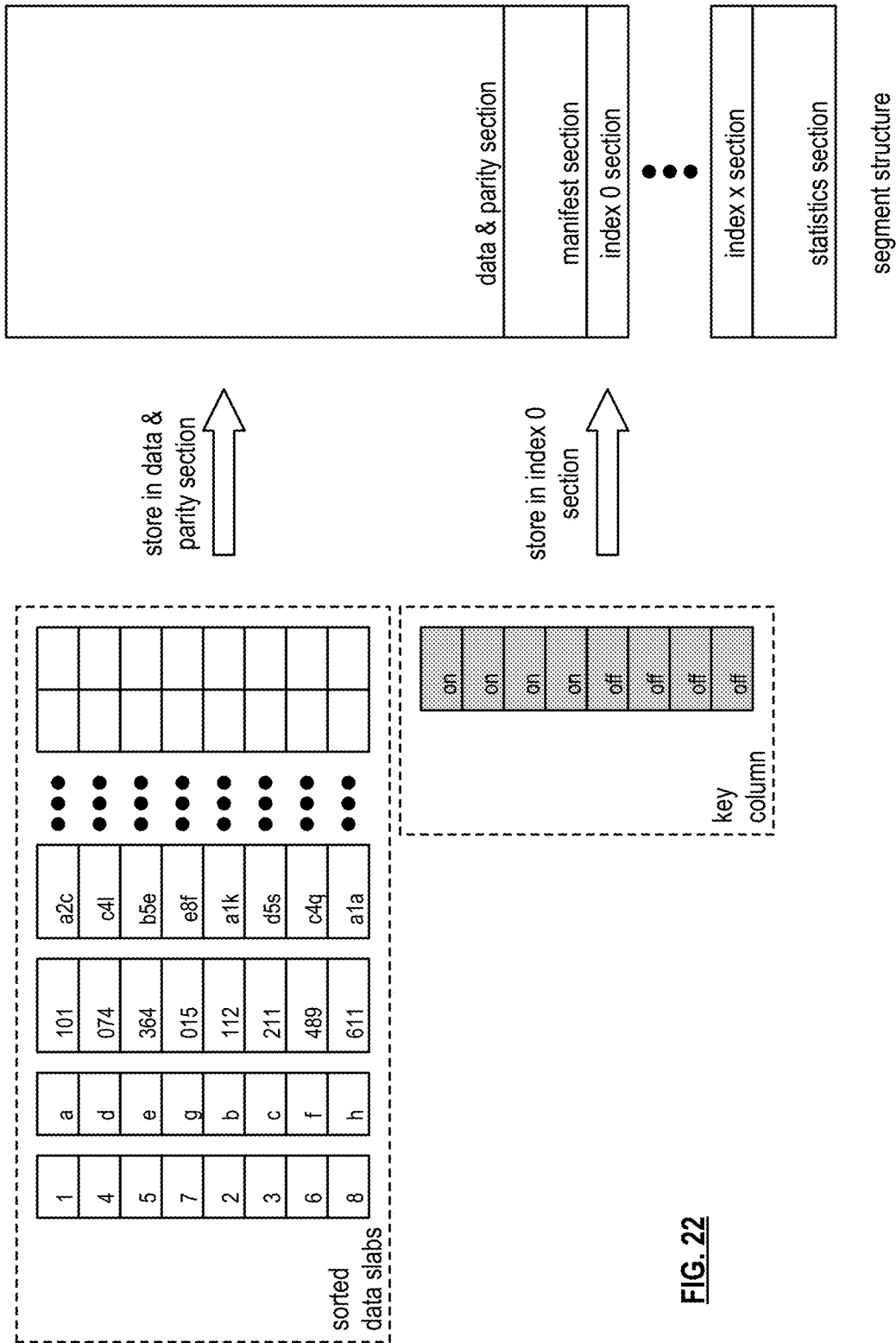

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
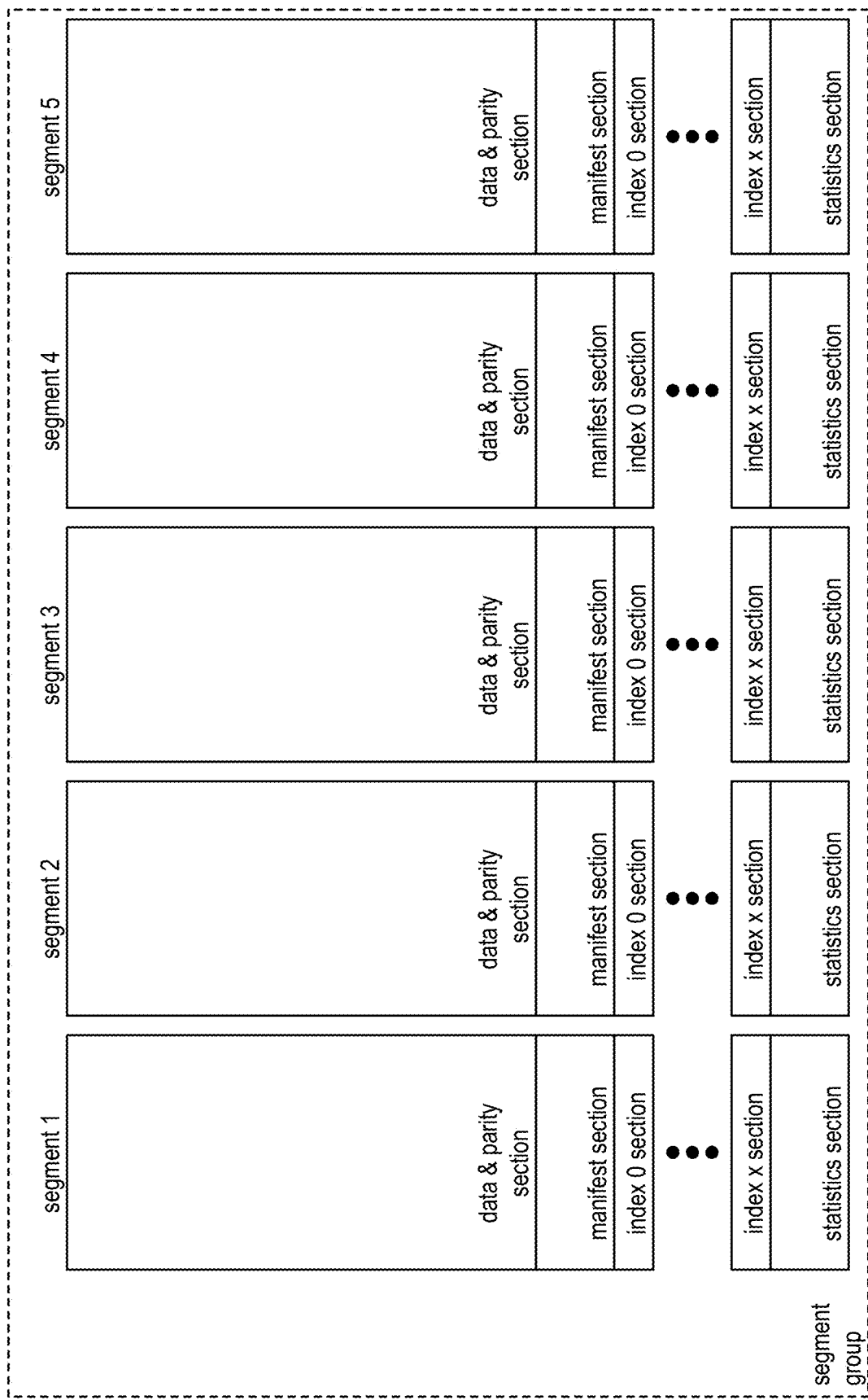

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
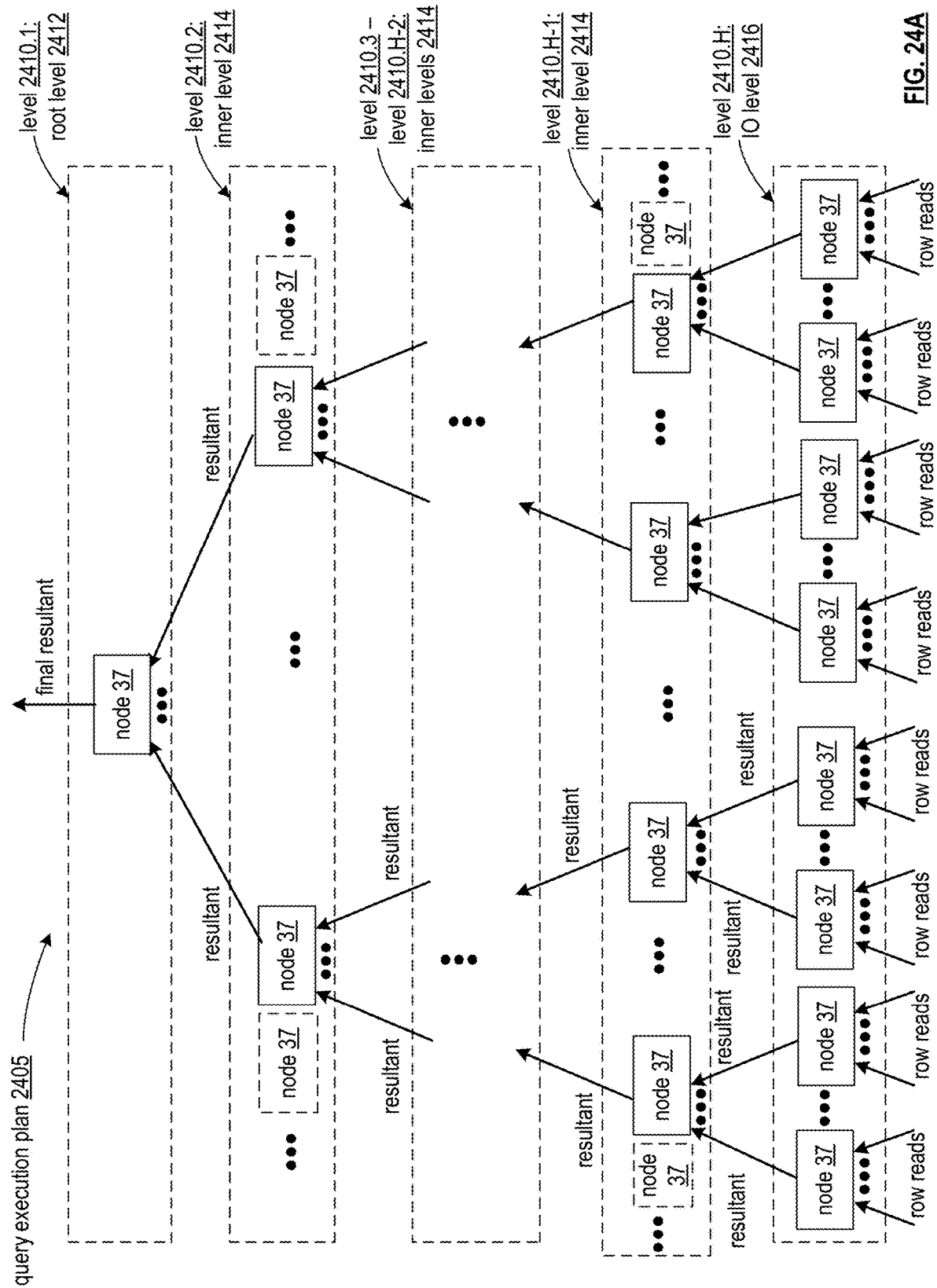
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
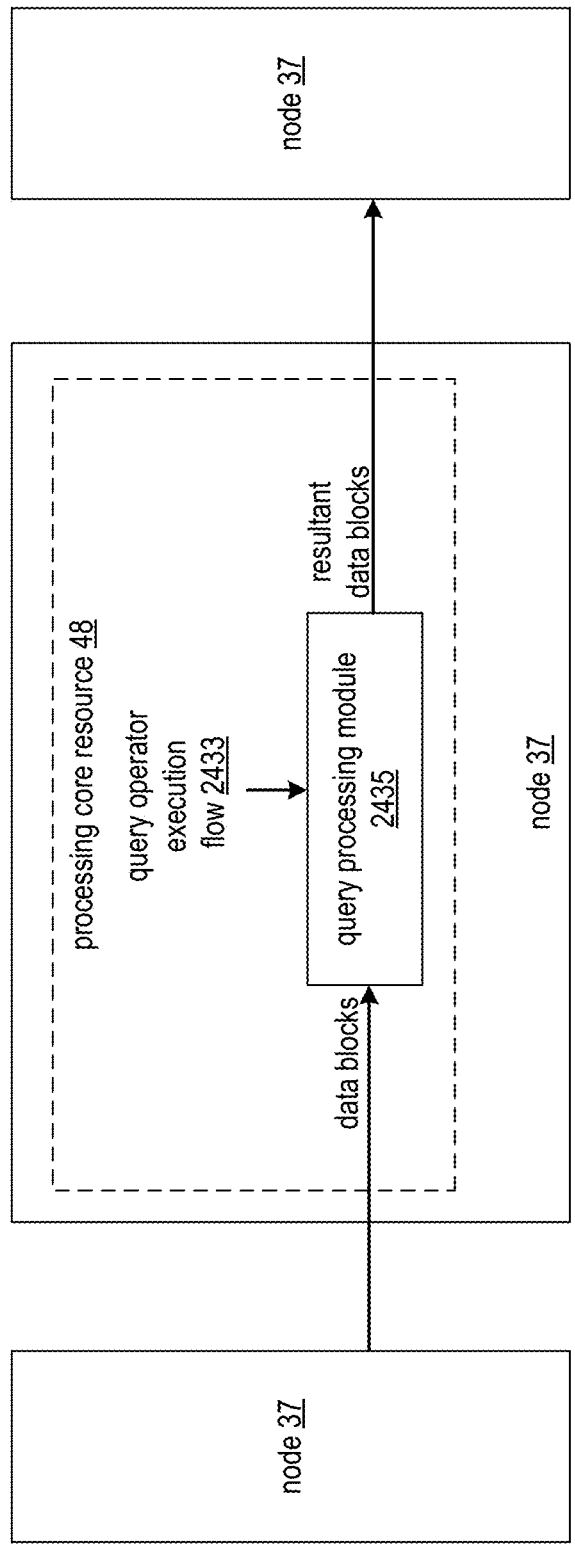
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
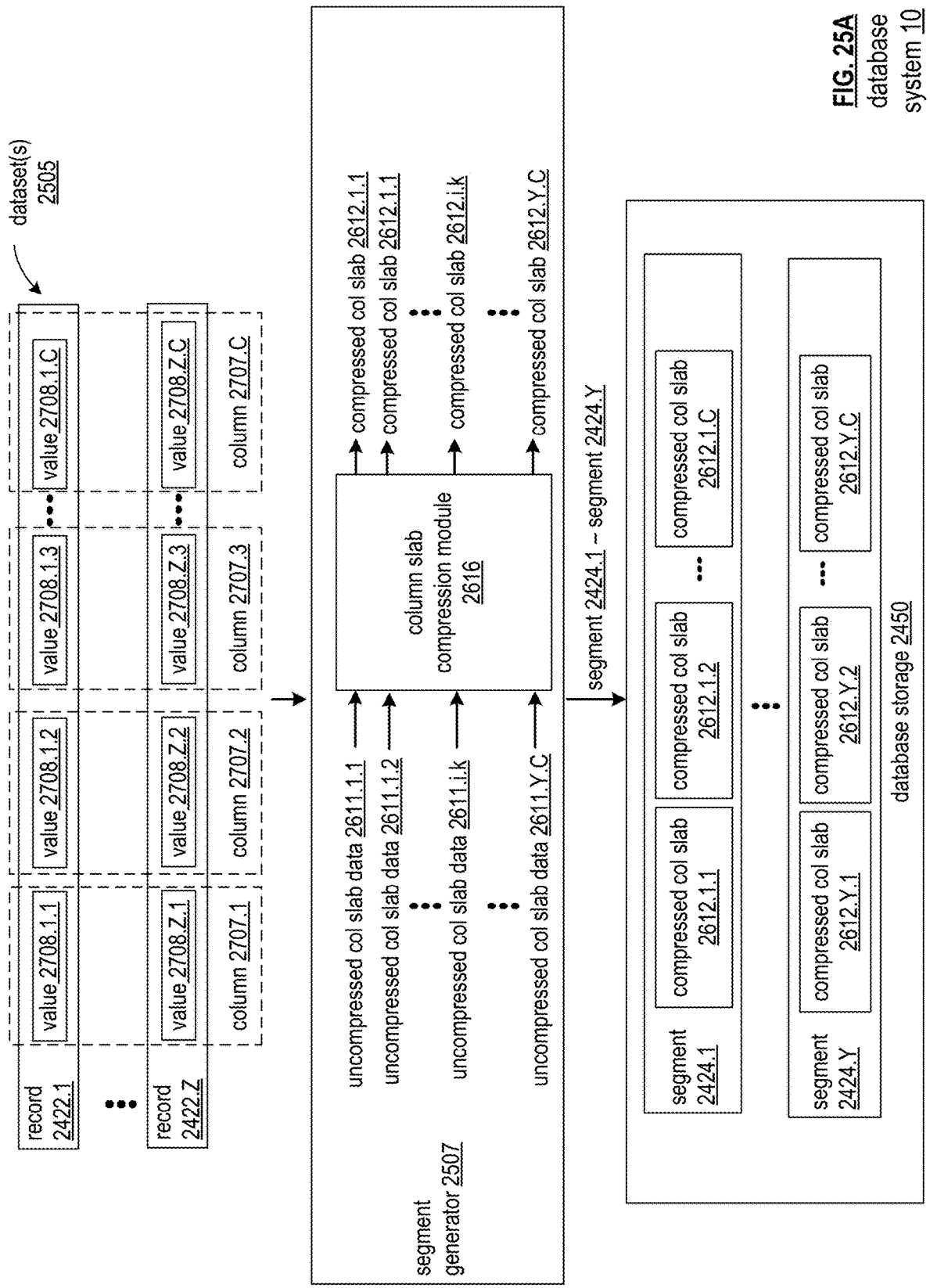
FIG. 25A is a schematic block diagram of a database system that includes a segment generator that implements a column slab compression module to generate a plurality of compressed column slabs from a plurality of uncompressed column slab data in accordance with various embodiments.
Figure 25B:
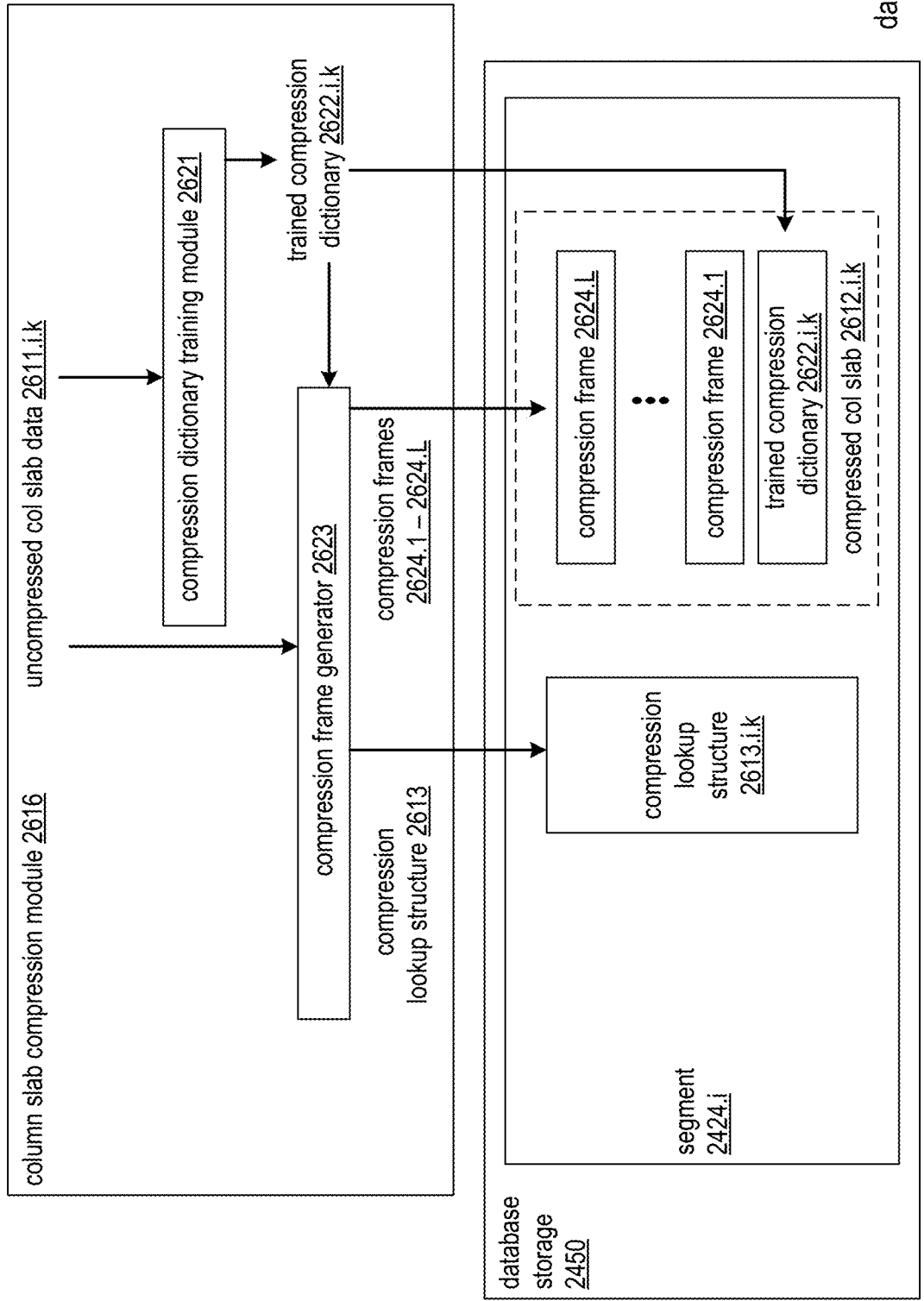
FIG. 25B is a schematic block diagram of a column slab compression module that implements a compression dictionary training module and a compression frame generator in accordance with various embodiments.
Figure 25C:
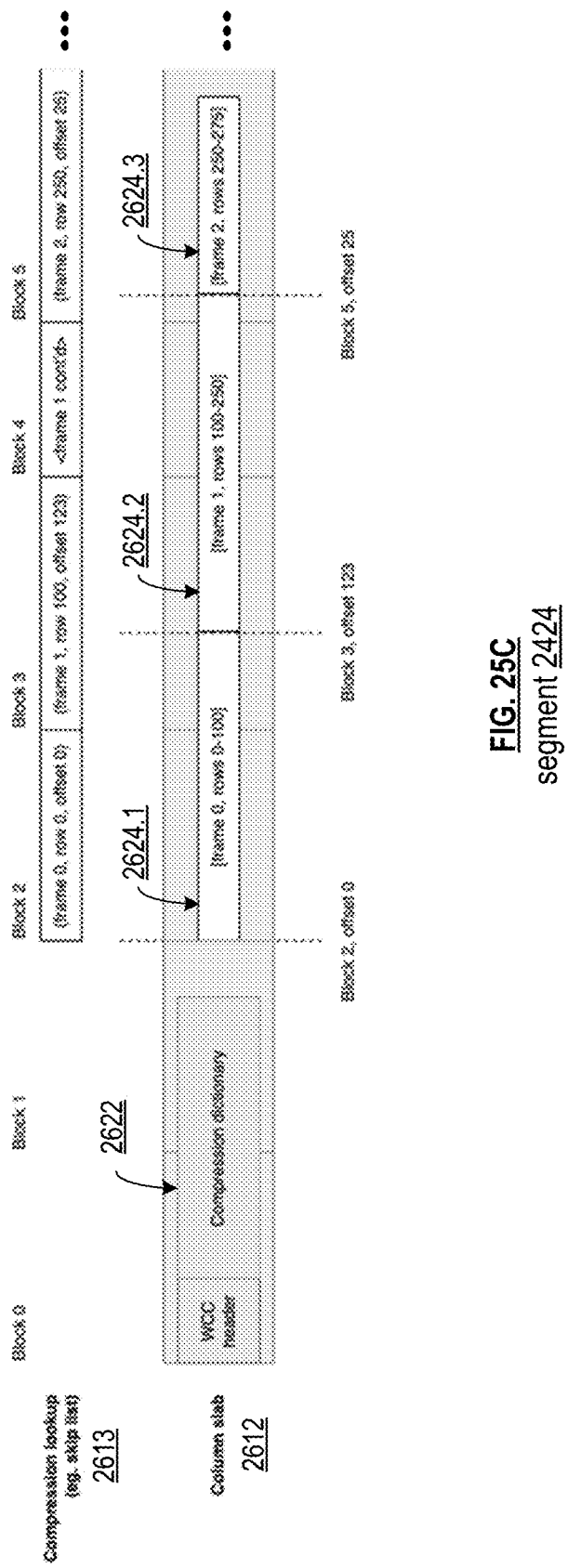
FIG. 25C is an illustrative depiction of a compressed column slab and a compression lookup structure in accordance with various embodiments.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
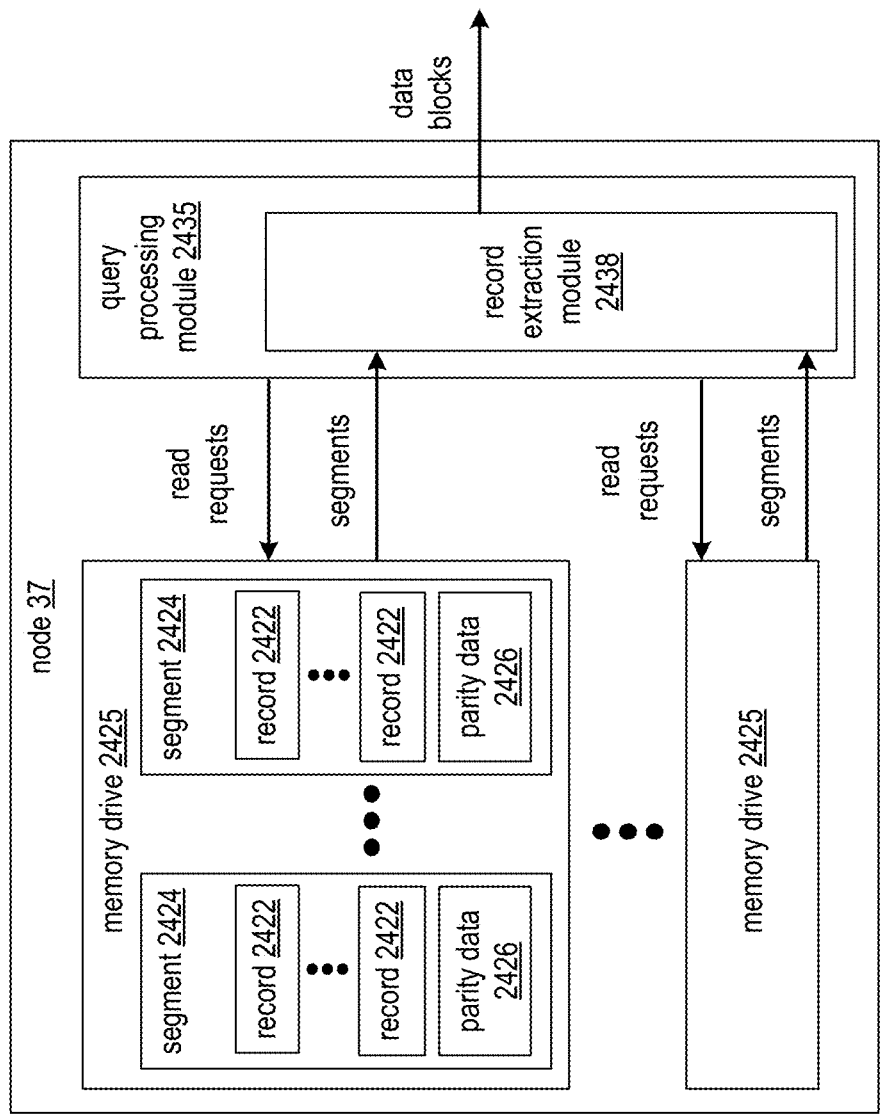
Figure 24D:
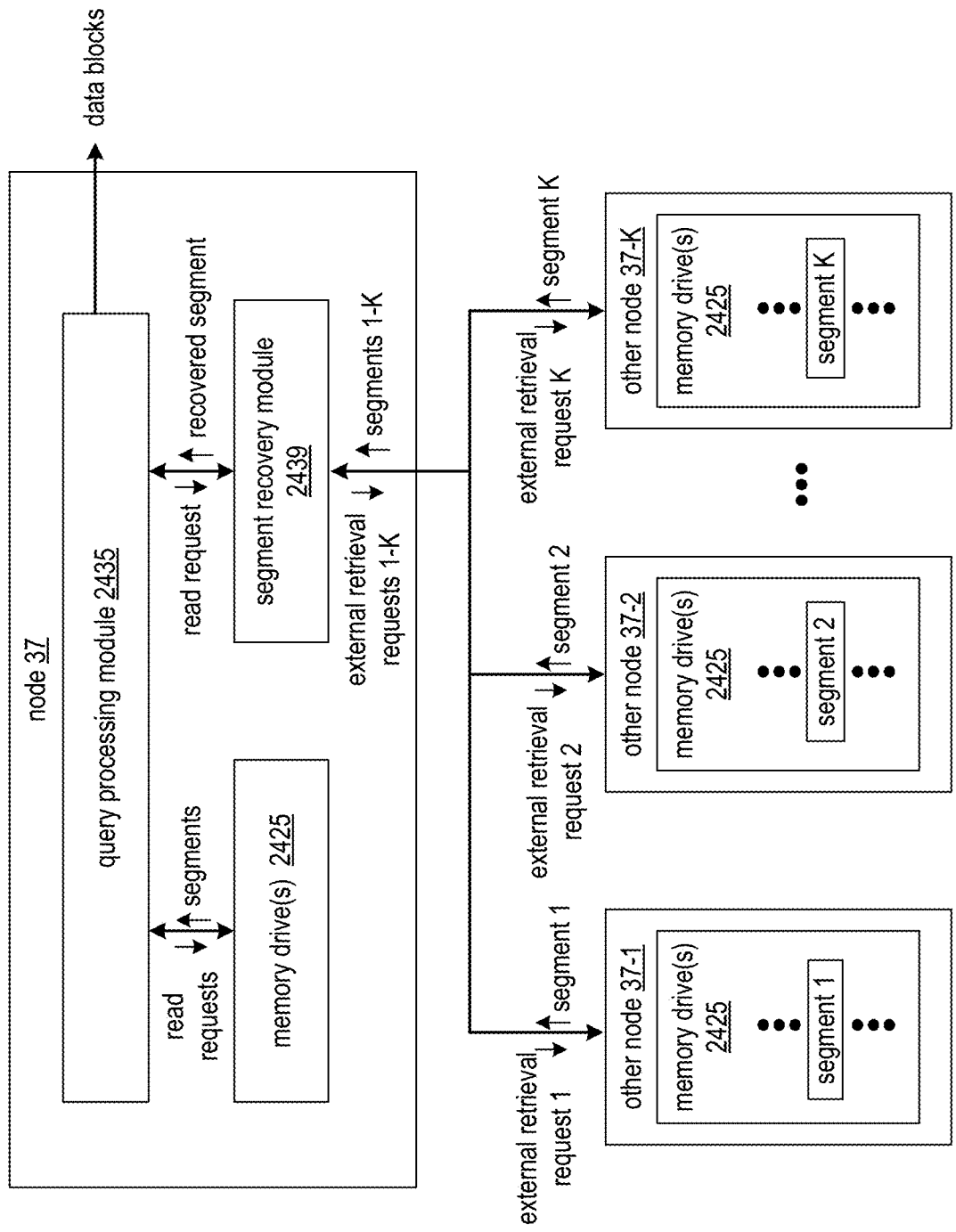

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. This can be achieved based on accessing parity data 2426 stored in segment 2424. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
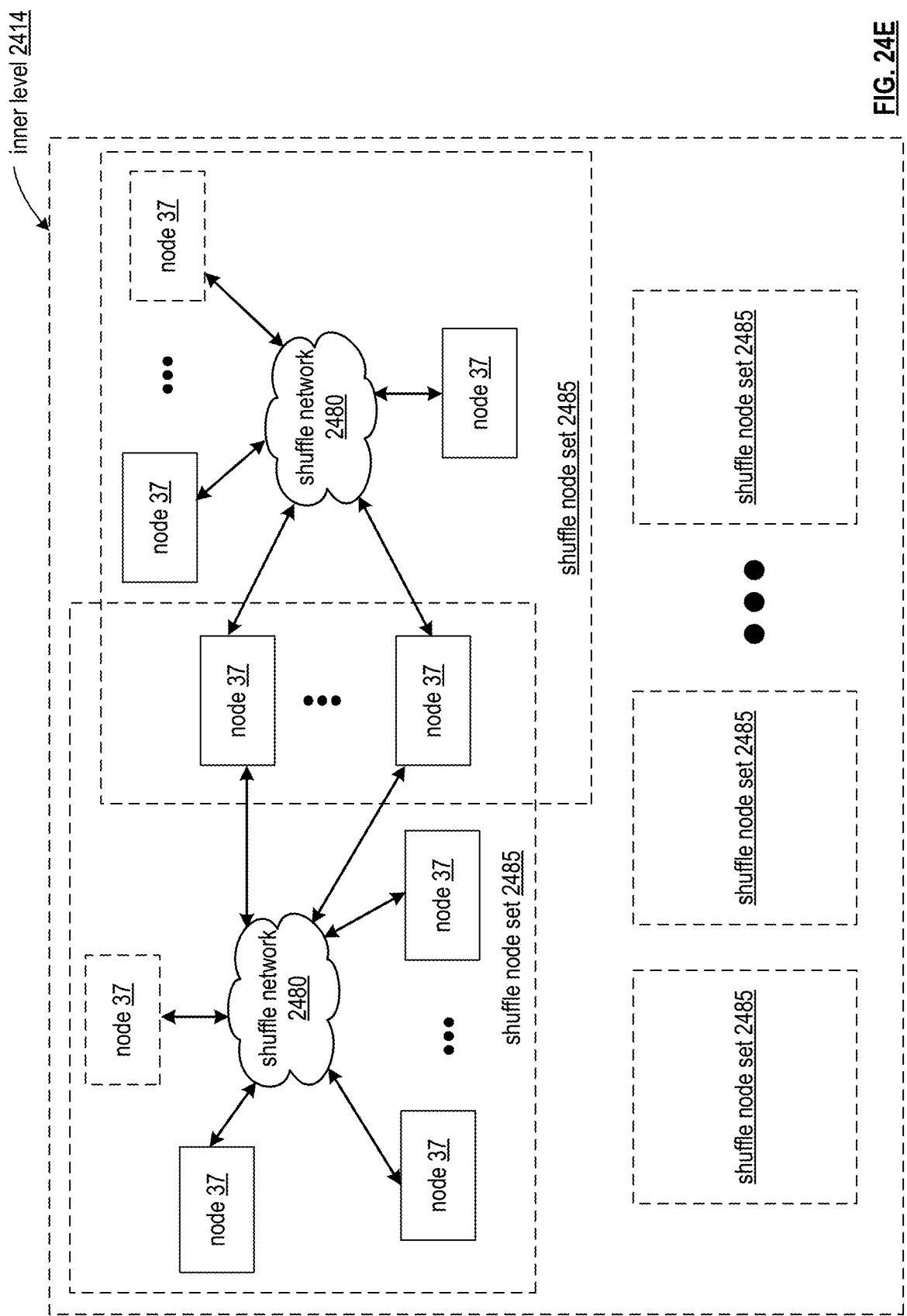
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
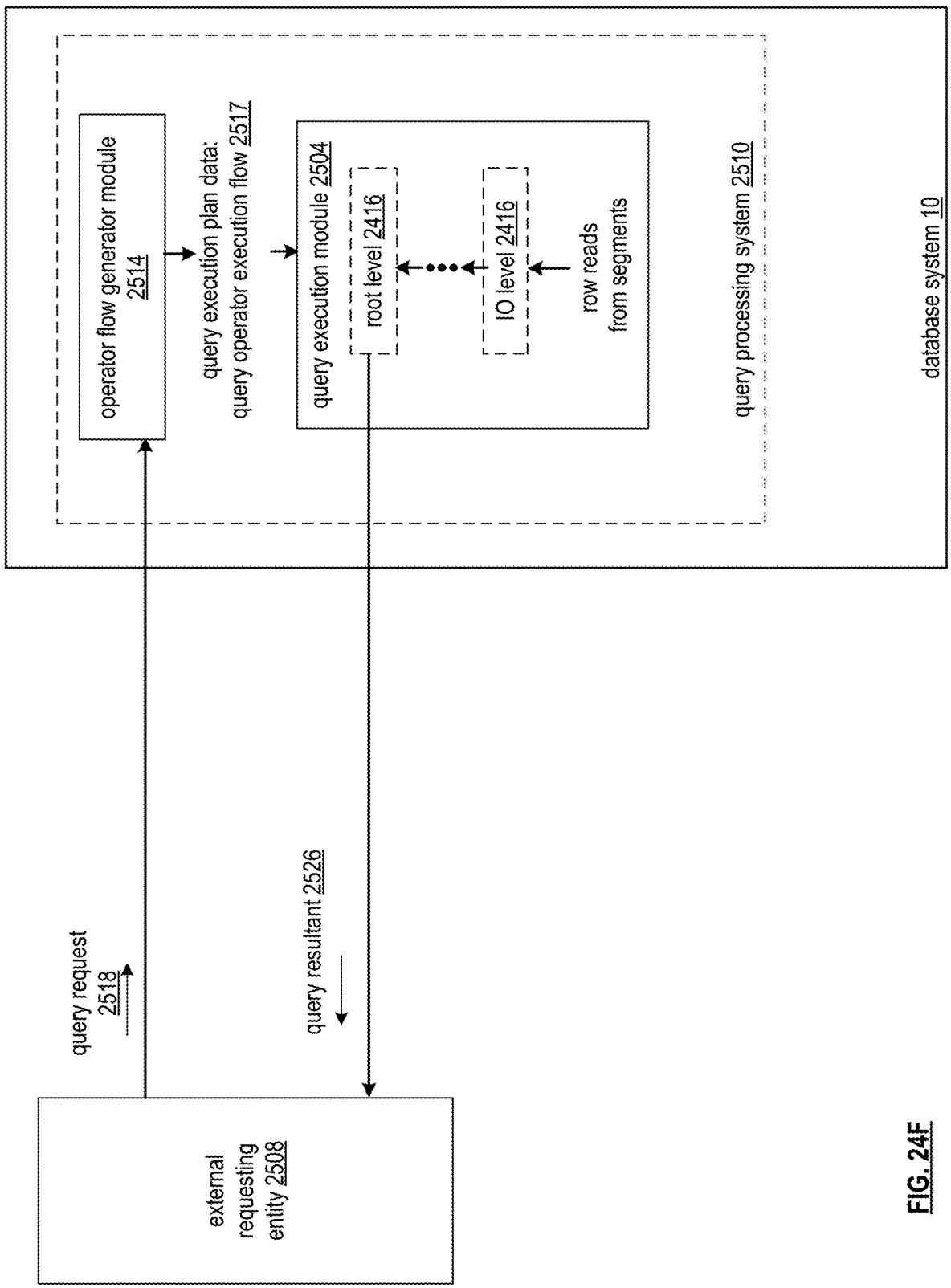
FIG. 24F is a schematic block diagram of a database system communicating with an external requesting entity in accordance with various embodiments.

FIG. 24F illustrates an embodiment of a database system that receives some or all query requests from one or more external requesting entities 2508. The external requesting entities 2508 can be implemented as a client device such as a personal computer and/or device, a server system, or other external system that generates and/or transmits query requests 2515. A query resultant 2526 can optionally be transmitted back to the same or different external requesting entity 2508. Some or all query requests processed by database system 10 as described herein can be received from external requesting entities 2508 and/or some or all query resultants generated via query executions described herein can be transmitted to external requesting entities 2508.

For example, a user types or otherwise indicates a query for execution via interaction with a computing device associated with and/or communicating with an external requesting entity. The computing device generates and transmits a corresponding query request 2515 for execution via the database system 10, where the corresponding query resultant 2526 is transmitted back to the computing device, for example, for storage by the computing device and/or for display to the corresponding user via a display device.

Figure 24G:
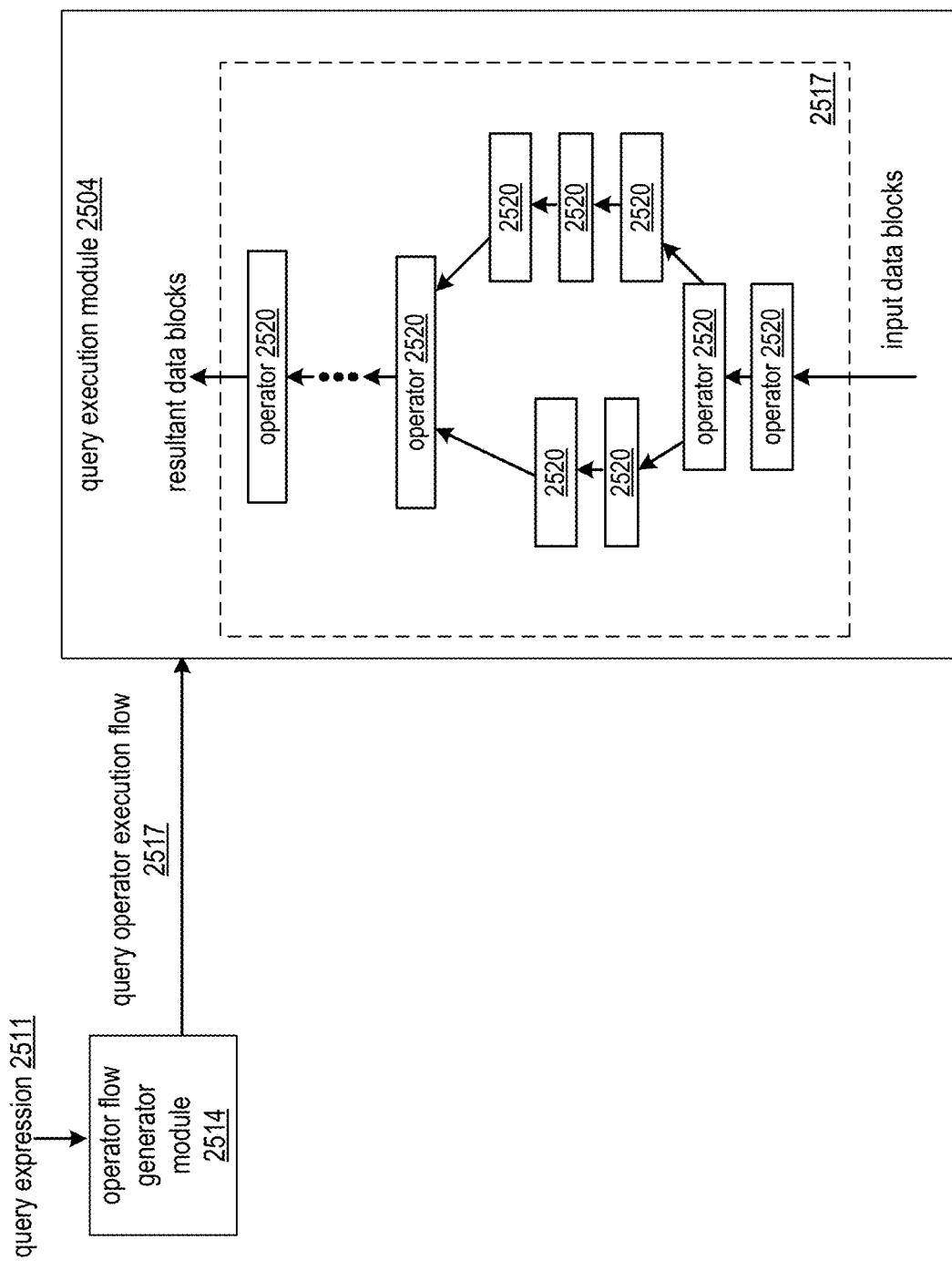
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Figure 24H:
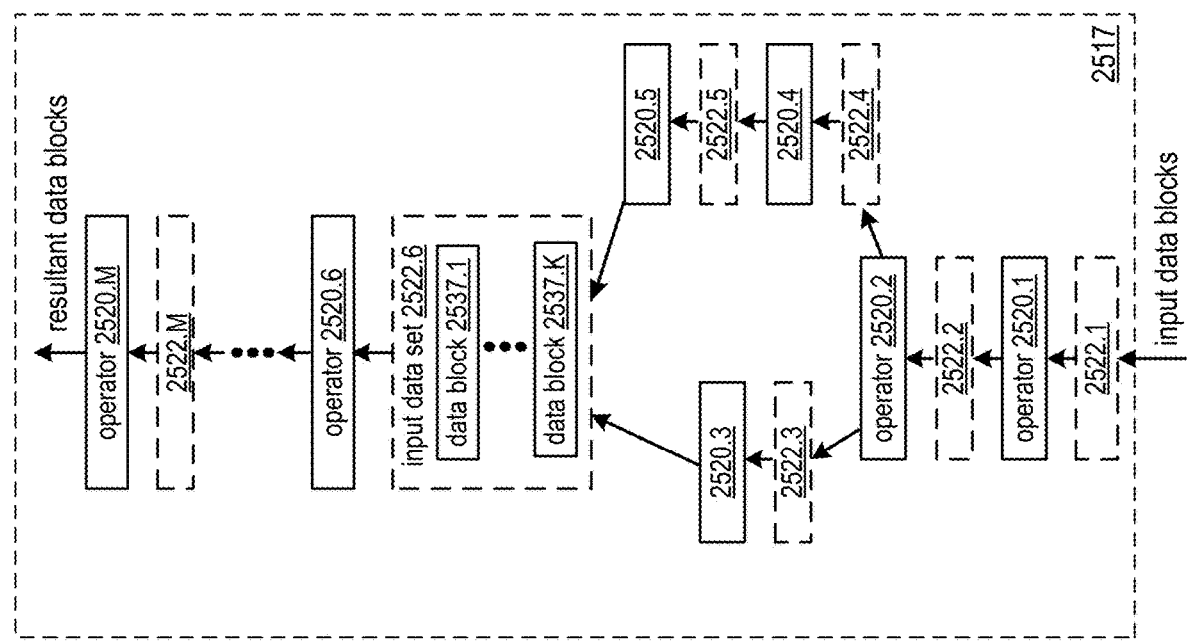
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The datablocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.$i$ in their own query operator execution flow 2433 upon their own corresponding input data set 2522 for this particular operator. The particular node adds this received output of execution of operator 2520.$i$ by the one or more other nodes to the be input data set 2522 of its own next operator 2520.$i$+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.$i$+1 corresponds to and/or is utilized to implement JOIN operator and/or a custom-join operator of the query operator execution flow 2517, and where the operator 2520.$i$+1 thus utilizes input received from many different nodes in the shuffle node set in accordance with their performing of all of the operators serially before operator 2520.$i$+1 to generate the input to operator 2520.$i$+1.

As used herein, a child operator of a given operator corresponds to an operator immediately before the given operator serially in a corresponding query operator execution flow and/or an operator from which the given operator receives input data blocks for processing in generating its own output data blocks. A given operator can have a single child operator or multiple child operators. A given operator optionally has no child operators based on being an IO operator and/or otherwise being a bottommost and/or first operator in the corresponding serialized ordering of the query operator execution flow. A child operator can implement any operator 2520 described herein.

A given operator and one or more of the given operator's child operators can be executed by a same node 37 of a given node 37. Alternatively or in addition, one or more child operators can be executed by one or more different nodes 37 from a given node 37 executing the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow, and/or an operator from which the given operator receives input data blocks for processing in generating its own output data blocks. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator. A parent operator can implement any operator 2520 described herein.

A given operator and one or more of the given operator's parent operators can be executed by a same node 37 of a given node 37. Alternatively or in addition, one or more parent operators can be executed by one or more different nodes 37 from a given node 37 executing the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more shuffle operators of a shuffle operation. For example, a set of lateral operators are implemented via corresponding plurality of parallel processes 2550, for example, of a join process or other operation, to facilitate transfer of data such as right input rows received for processing between these operators. As another example, data is optionally transferred between lateral network operators via a corresponding shuffle and/or broadcast operation, for example, to communicate right input rows of a right input row set of a join operation to ensure all operators have a full set of right input rows.

A given operator and one or more lateral network operators lateral with the given operator can be executed by a same node 37 of a given node 37. Alternatively or in addition, one or lateral network operators can be executed by one or more different nodes 37 from a given node 37 executing the given operator lateral with the one or more lateral network operators. For example, different lateral network operators are executed via different nodes 37 in a same shuffle node set 37.

Figure 24I:
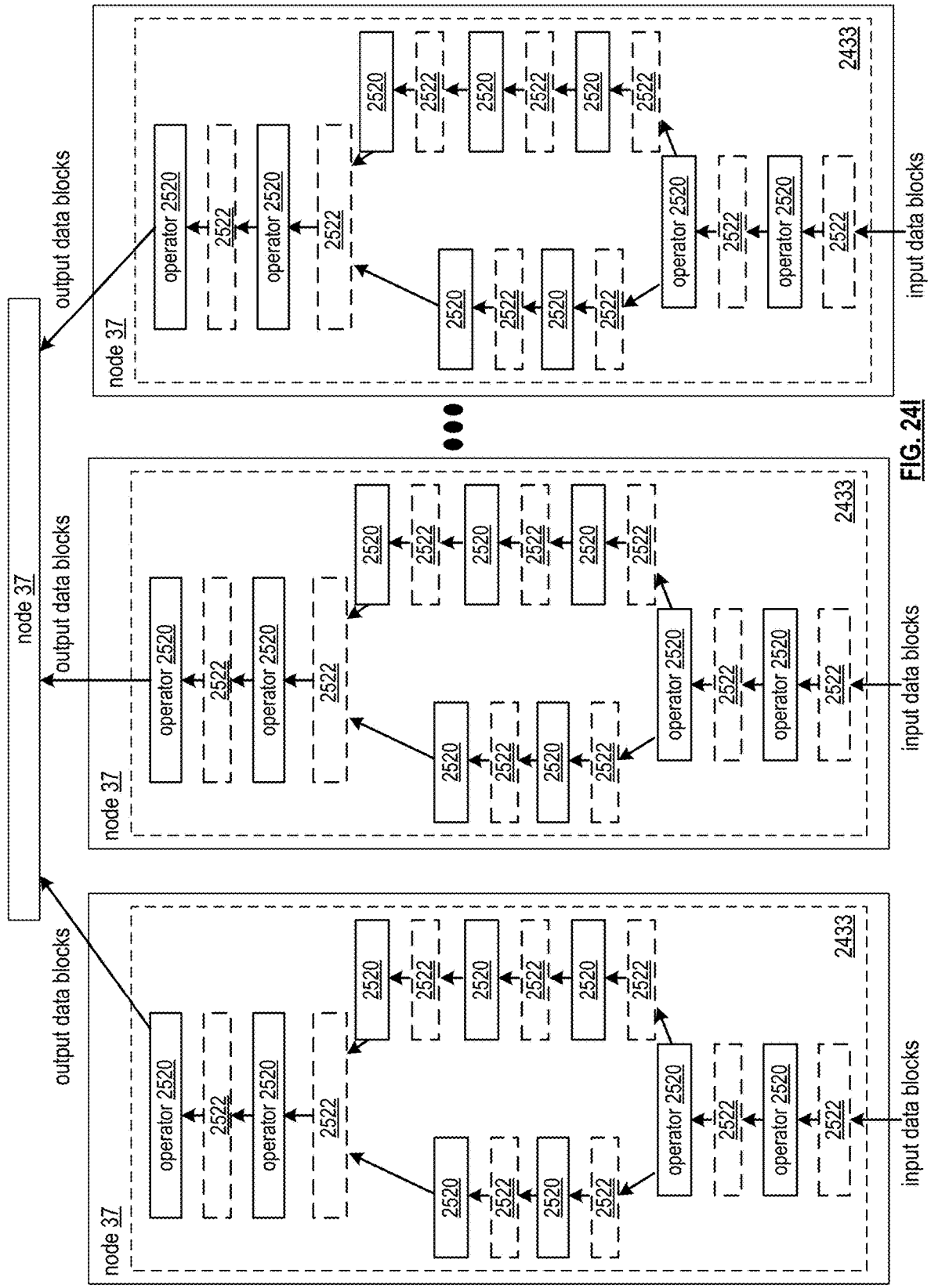
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
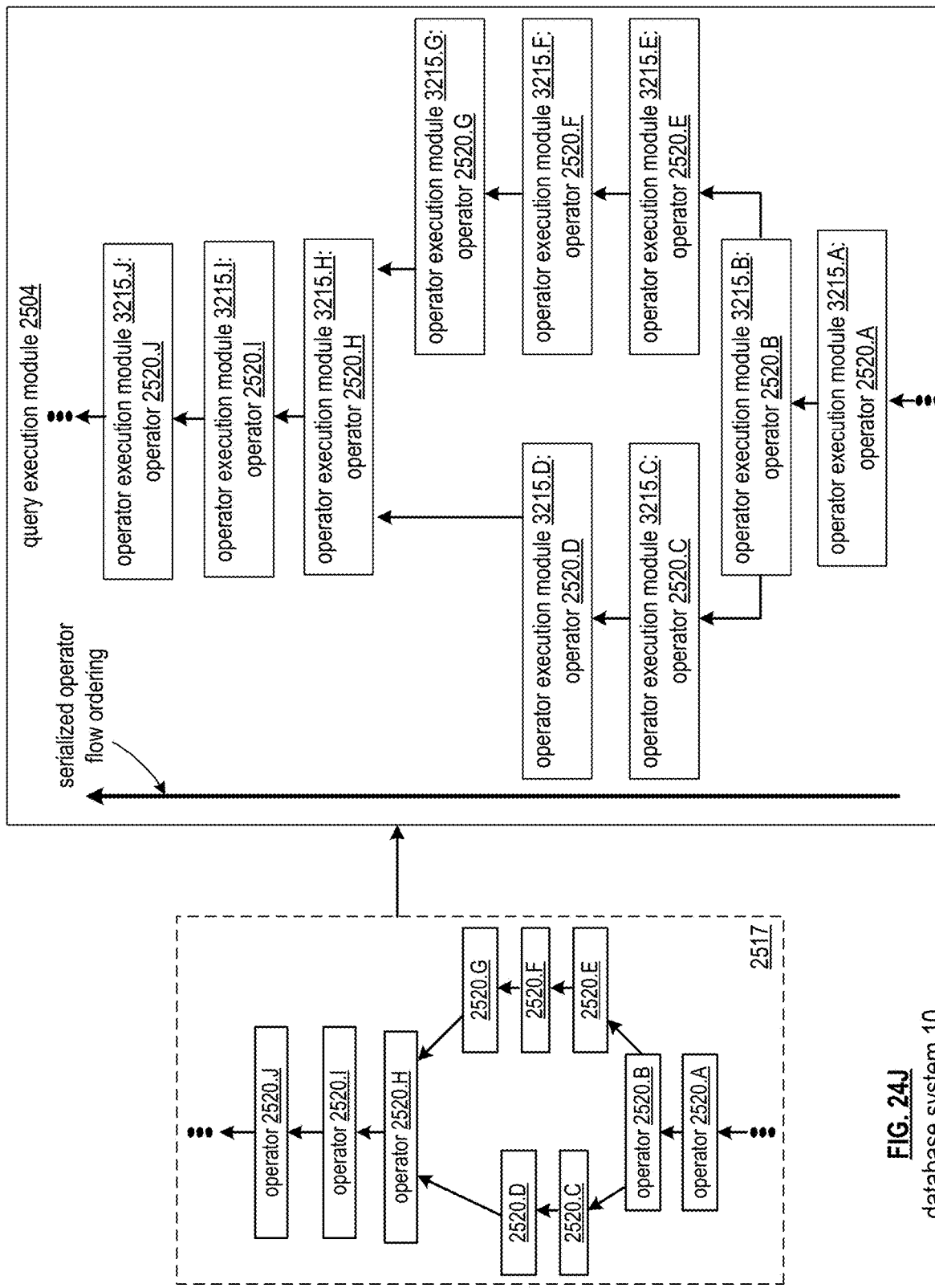
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 32A can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
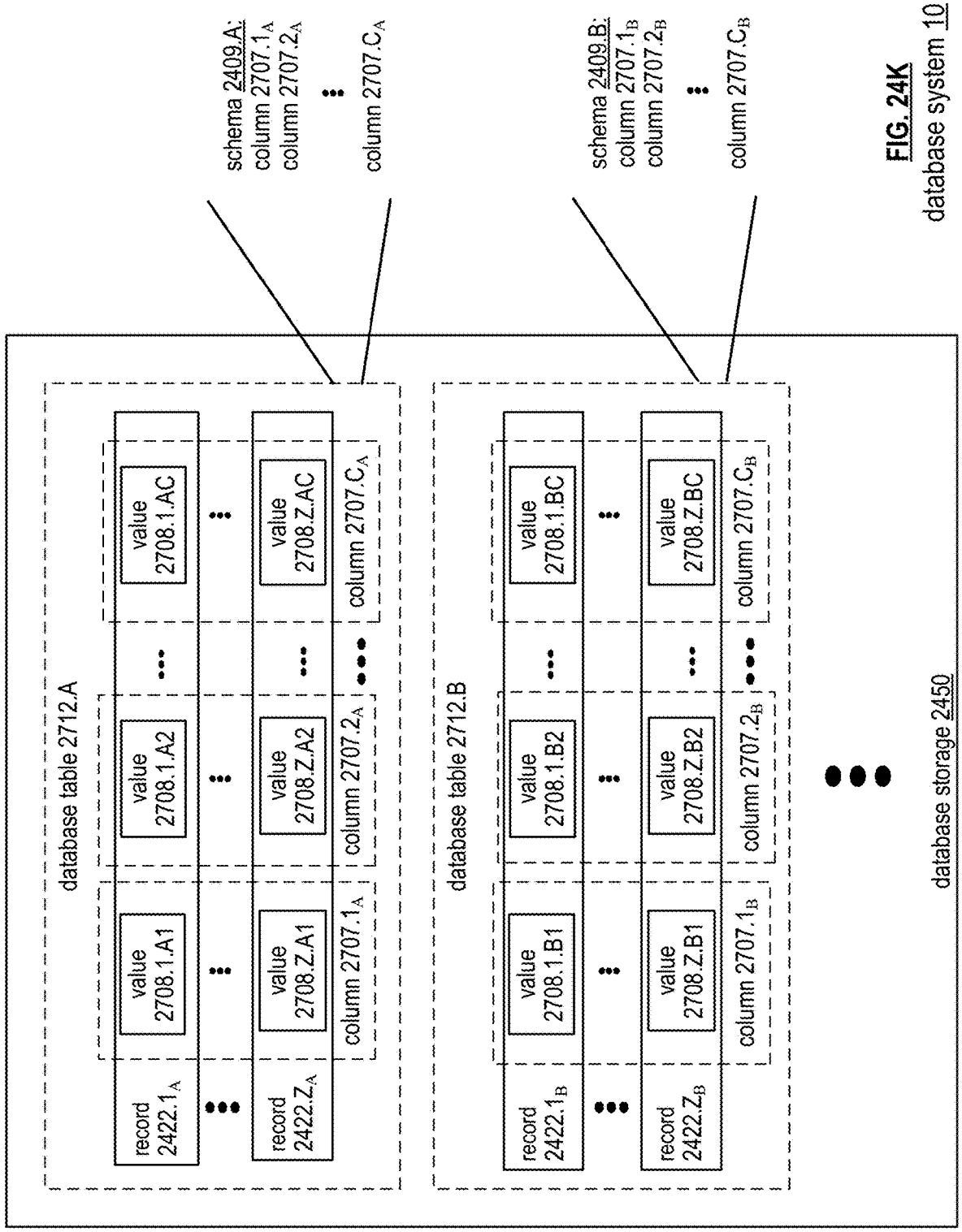
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709.A for database table 2712.A can have a different number of columns than and/or can have different datatypes for some or all columns of the set of columns $2707.1_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
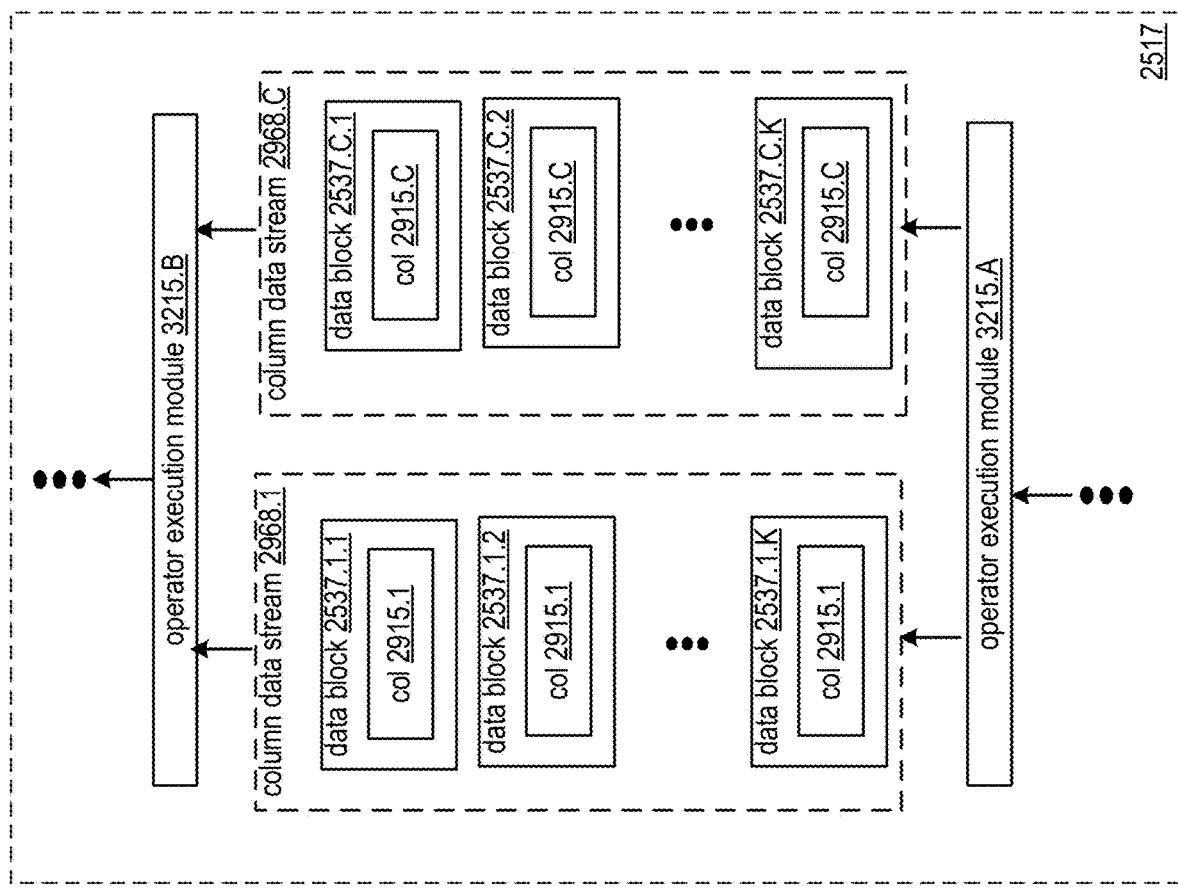
FIG. 24L is a schematic block diagram of a query execution module that implements a plurality of column data streams in accordance with various embodiments.
Figure 24M:
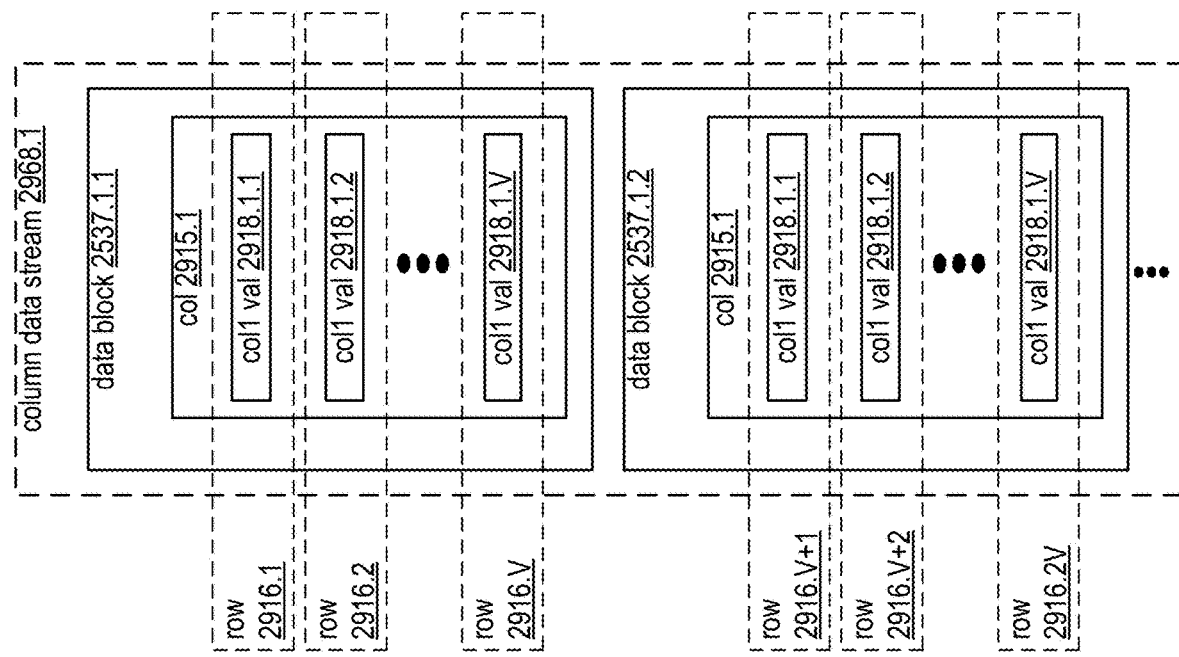
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
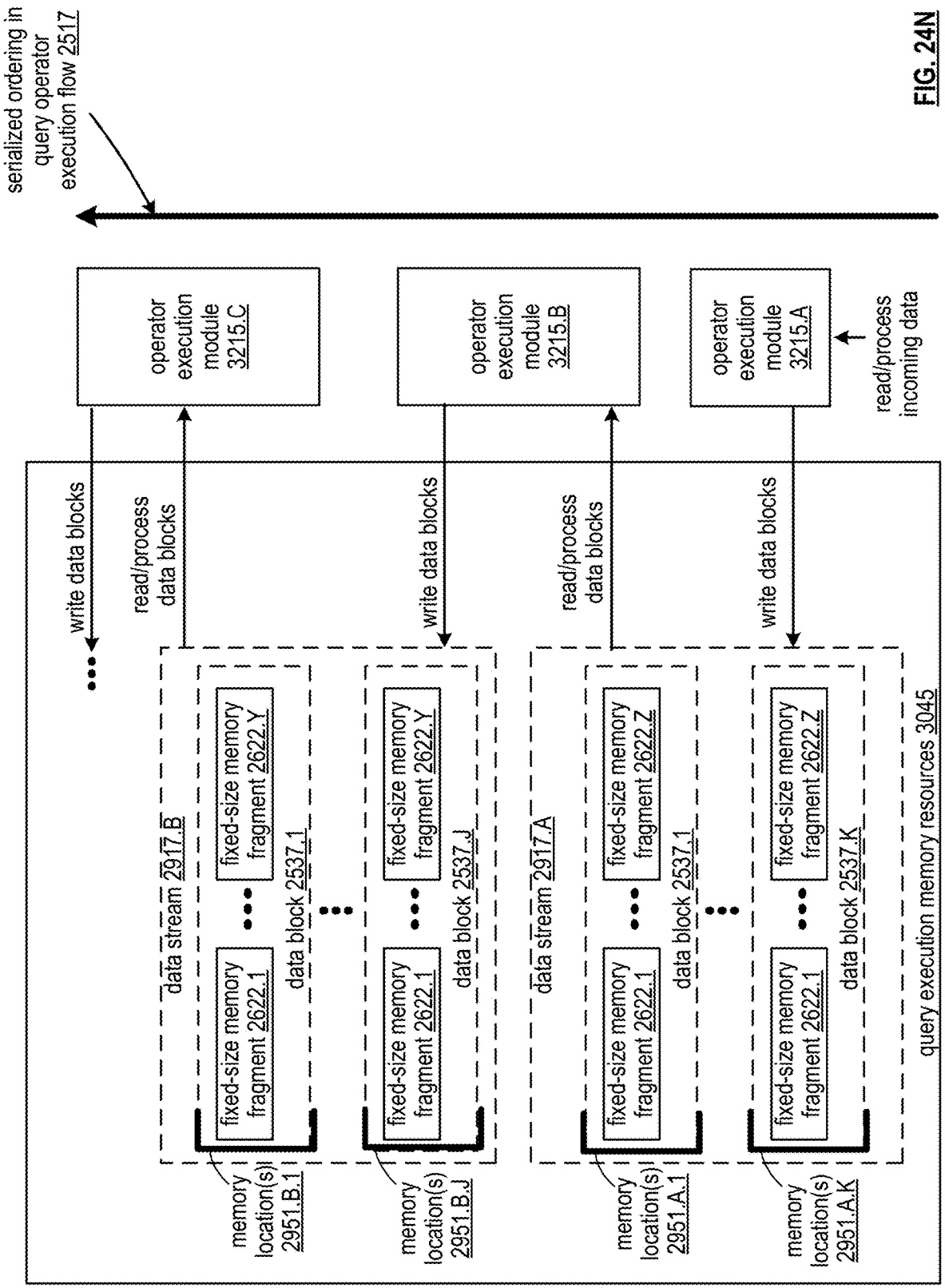
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations to filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

Figure 24O:
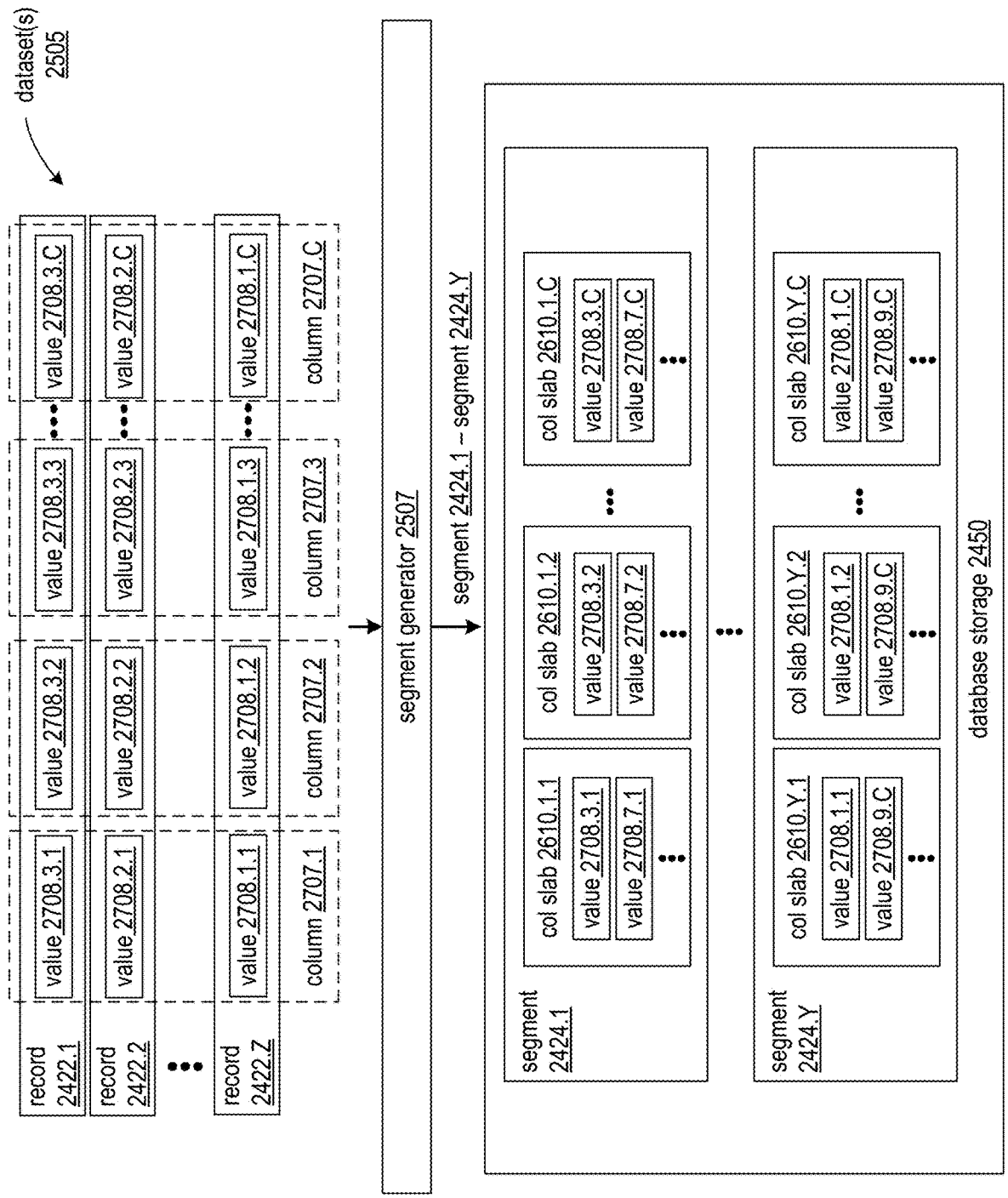
FIG. 24O is a schematic block diagram of a database system that implements a segment generator that generates segments from a plurality of records in accordance with various embodiments.

FIG. 24O illustrates an embodiment of a database system 10 that implements a segment generator 2507 to generate segments 2424. Some or all features and/or functionality of the database system 10 of FIG. 24O can implement any embodiment of the database system 10 described herein. Some or all features and/or functionality of segments 2424 of FIG. 24O can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24P:
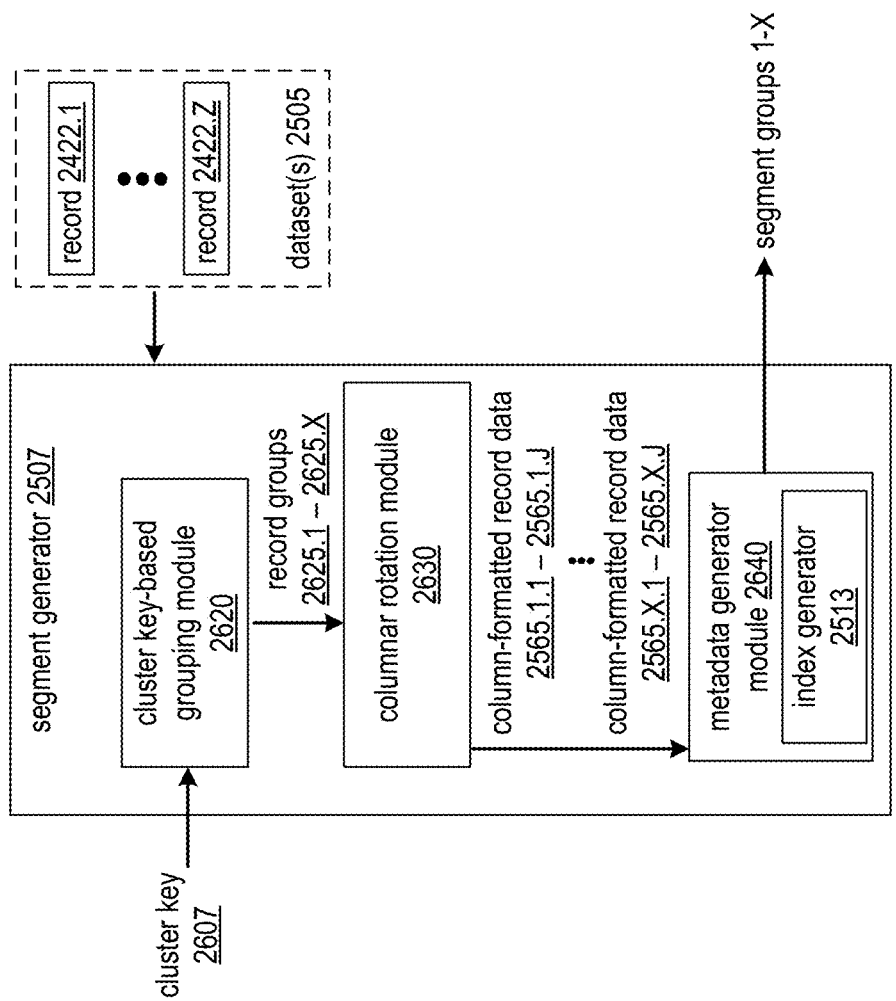
FIG. 24P is a schematic block diagram of a segment generator that implements a cluster key-based grouping module, a columnar rotation module, and a metadata generator module in accordance with various embodiments.

FIG. 24P illustrates an example embodiment of a segment generator 2507 of database system 10. Some or all features and/or functionality of the database system 10 of FIG. 24P can implement any embodiment of the database system 10 described herein. Some or all features and/or functionality of the segment generator 2507 of FIG. 24P can implement the segment generator 2507 of FIG. 24O and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator 2517 as disclosed by: U.S. Utility application Ser. No. 16/985,723, entitled "DELAYING SEGMENT GENERATION IN DATABASE SYSTEMS", filed Aug. 5, 2020, issued as U.S. Pat. No. 11,755,589 on Sep. 12, 2023, which is hereby incorporated herein by reference in its entirety and made part of the present U.S. Utility patent application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility patent application for all purposes; and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility patent application for all purposes. For example, the database system 10 implements some or all features and/or functionality of record processing and storage system 2505 of U.S. Utility application Ser. No. 16/985,723, U.S. Utility application Ser. No. 16/985,957, and/or U.S. Utility application Ser. No. 16/985,930.

Figure 24Q:
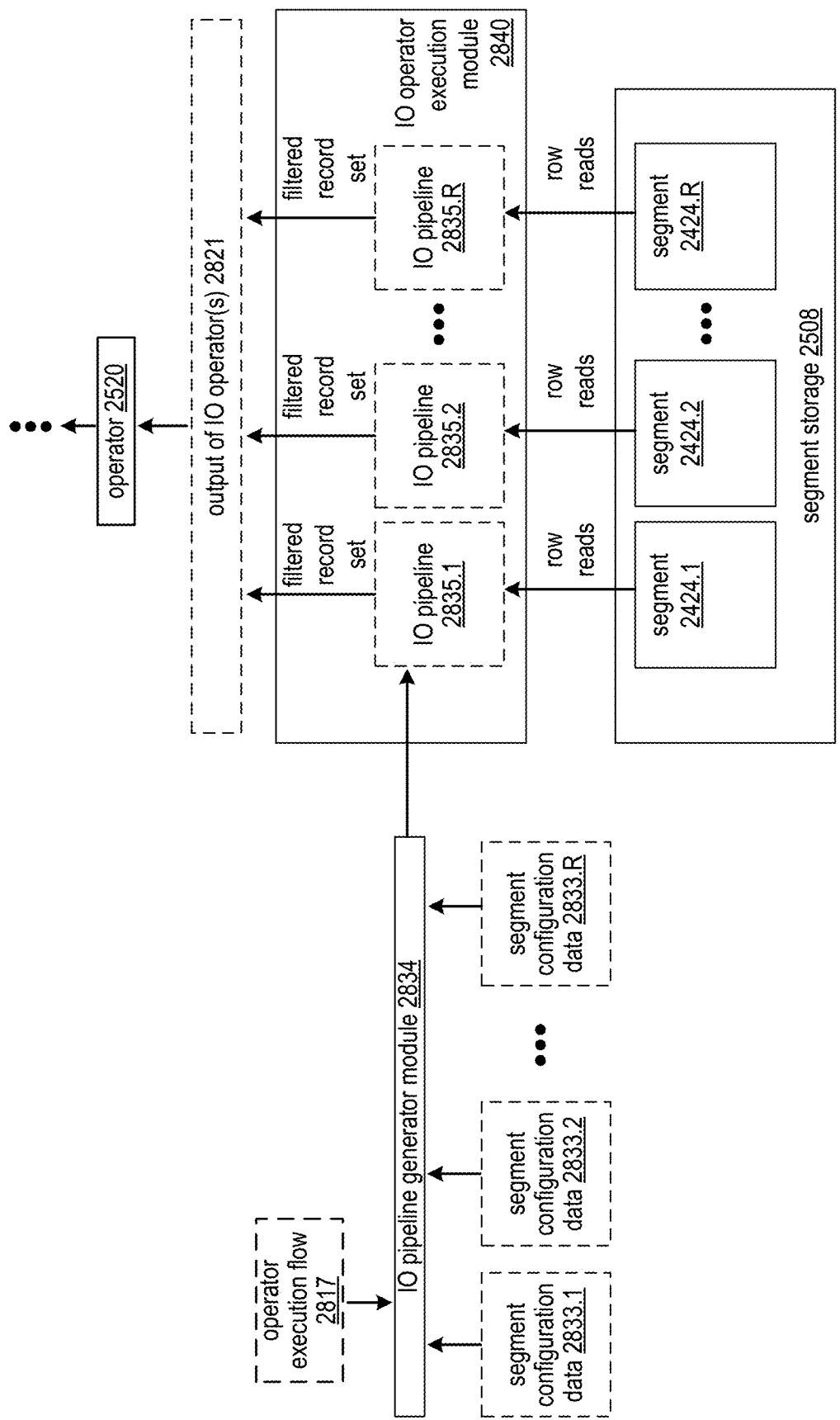
FIG. 24Q is a schematic block diagram of a query processing system that generates and executes a plurality of IO pipelines to generate filtered records sets from a plurality of segments in conjunction with executing a query in accordance with various embodiments.

FIG. 24Q illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24Q can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the column slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24R:
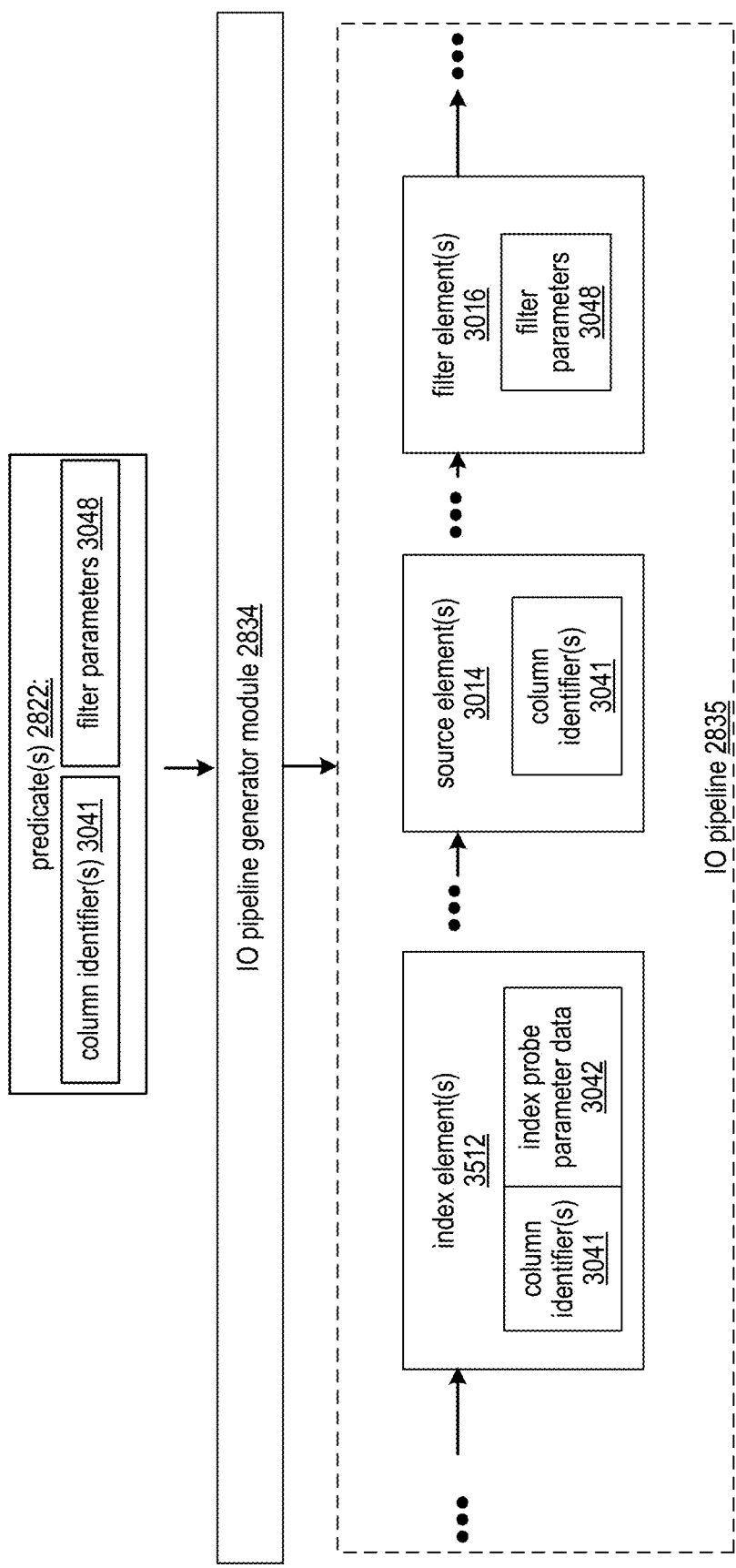
FIG. 24R is a schematic block diagram of a query processing system that generates an IO pipeline for accessing a corresponding segment based on predicates of a query in accordance with various embodiments.

FIG. 24R illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths. These elements can implement sourcing and/or filtering of rows based on query predicates 2822 applied to one or more columns, identified by corresponding column identifiers 3041 and corresponding filter parameters 3048. Some or all features and/or functionality of the IO pipeline 2835 and/or IO pipeline generator module 2834 of FIG. 24R can implement the IO pipeline 2835 and/or IO pipeline generator module 2834 of FIG. 24Q, and/or any embodiment of IO pipeline 2835, of IO pipeline generator module 2834, or of any query execution via accessing segments described herein.

In some embodiments, the IO pipeline generator module 2834, IO pipeline 2835, and/or IO operator execution module 2840 implements some or all features and/or functionality of the IO pipeline generator module 2834, IO pipeline 2835, and/or IO operator execution module 2840 as disclosed by: U.S. Utility application Ser. No. 17/303,437, entitled "QUERY EXECUTION UTILIZING PROBABILISTIC INDEXING", filed May 28, 2021, which is hereby incorporated herein by reference in its entirety and made part of the present U.S. Utility patent application for all purposes. For example, the database system 10 can implement the indexing of segments 2424 and/or IO pipeline generation as execution for accessing segments 2424 during query execution via implementing some or all features and/or functionality as described in U.S. Utility application Ser. No. 17/303,437.

Figure 24S:
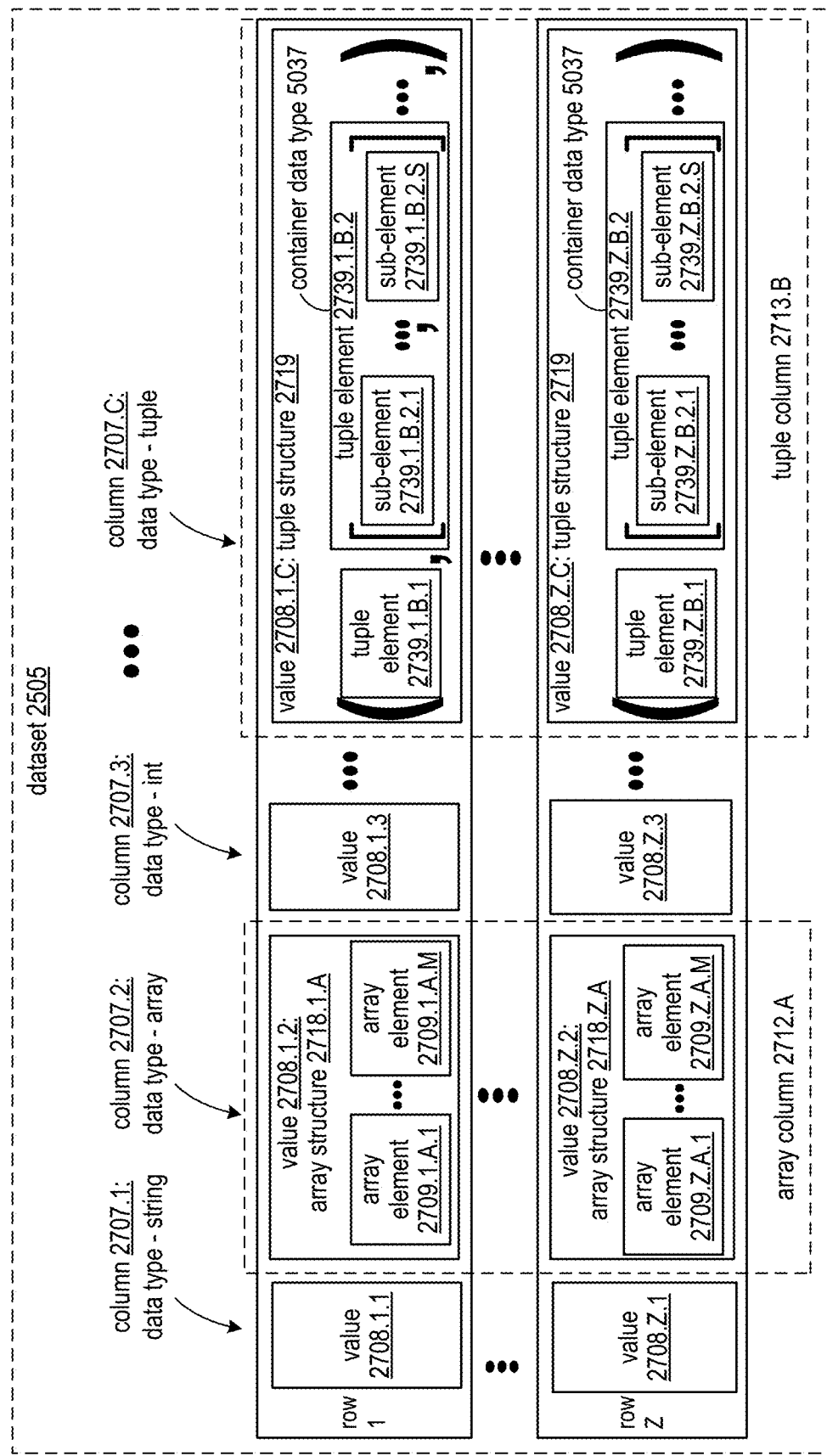
FIG. 24S illustrates an example dataset that includes at least one array column and at least one tuple column in accordance with various embodiments.

FIG. 24S illustrates an example dataset having columns 2707 of various data types. Some or all features and/or functionality of the dataset 2505 and/or some or all columns 2707 of FIG. 24S can implement any dataset described herein and/or any columns/fields described herein.

A given dataset 2505 can have a set of columns 2507.1-2507.C that correspond to various data types. The set of data types of the set of columns 2507.1-2507.C of one or more datasets 2505 processed and stored by database system 10 include: one or more fixed-length data types (e.g. integers, chars, Boolean values, etc.); one or more variable-length data types (e.g. strings, files, media data, etc.); one or more array data types, and/or one or more tuple data types. Note that a given tuple data type and/or array data type can be fixed length and/or variable length, for example, based on whether the respective elements within the array or tuple correspond to fixed-length and/or variable length data types and/or whether the respective number of elements is fixed or variable. One or more columns 2507 can optionally be implemented via a same data type (e.g. data set 2505 has multiple integer columns and/or multiple array columns).

A given array column 2712 can include array structures 2818 as its values 2708, where each array structure 2818 includes a plurality of array elements 2709.1-2709.M. Different array structures of different array columns of the same or different dataset can have different numbers of elements M and/or can have different data types as its array elements 2709.

In some embodiments, for a given array column, the array structures 2718 can optionally be required to have a same, fixed number of elements M (e.g. all rows have array structures in array column 2712.A having exactly 8 elements, and have array structures in a different array column 2712.B having exactly 10 elements). Alternatively, the array structures 2718 of a given array column do not have this requirement, where different array structures 2718 of the same array column can have different numbers of elements.

In some embodiments, for a given array column, the array structures 2718 can optionally be required to have all elements 2709 having a same, predetermined data type (e.g. all rows have array structures in array column 2712.A with array elements 2709 that are all integers, and have array structures in array column 2712.B with array elements 2709 that are all strings). The predetermined data type can be required to be fixed length, and/or can optionally be variable length. Alternatively, the array structures 2718 of a given array column do not have this requirement, where different array elements 2709 of the same array structure can have different data types (e.g., array element 2709.1.A.1 is an integer, and array element 2709.1.A.2 is a char).

A given tuple column 2713 can include tuple structures 2819 as its values 2708, where each tuple structure 2819 includes a plurality of tuple elements 2739. Different tuple elements 2739 can correspond to different data types. In some embodiments, particular tuple elements of the tuple structures 2819 are assigned particular data types and/or a structured arrangement/number of such tuple elements is fixed for the given tuple column 2713. For example, the first tuple element of every tuple structure 2719 in the column is an integer, and the last tuple element of every tuple structure 2719 in the column is a string. Alternatively, different tuple structures 2719 in the same column can have different configurations and/or have elements of different data types.

In some embodiments, the tuple structures 2819 of a given tuple column 2713 can further include tuple elements 2739 that are implemented as container data types 5037 (e.g. array structures 2718, nested tuple structures 2719, etc.) that themselves include multiple elements 2739, considered sub-elements of the tuple structure 2719 implementing the values 2708 of the column. The sub-elements of a given element can be of the same or different data type. One or more sub-elements can itself be a further nested container data types 5037 containing its own set of multiple elements of the same or different data type.

The tuple structures of a given tuple column can be required to have a same number of, same data types of, and/or same arrangement of elements/subs-elements 2739. Different tuple structures of different tuple columns of the same or different dataset can have different numbers of, different data types of, and/or different arrangements of elements/subs-elements 2739.

In some embodiments, array column 2712 and/or tuple column 2713 of a dataset 2505 can implement some or all features and/or functionality of the array field 2712 of dataset 2705 as disclosed by U.S. Utility application Ser. No. 17/932,727, entitled "UTILIZING ARRAY FIELD DISTRIBUTION DATA IN DATABASE SYSTEMS", filed Sep. 16, 2022, which is hereby incorporated herein by reference in its entirety and made part of the present U.S. Utility patent application for all purposes.

In some embodiments, tuple structures 2819 can be implemented via some or all features and/or functionality of tuple structures and/or other use of tuples as disclosed by U.S. Utility application Ser. No. 18/511,765, entitled "STORAGE SCHEME TRANSITION VIA STORAGE STRUCTURE EXPANSION IN A STORAGE SYSTEM", filed Nov. 16, 2023, which is hereby incorporated herein by reference in its entirety and made part of the present U.S. Utility patent application for all purposes.

FIGS. 25A-25L present embodiments of a database system 10 that stores, for one or more segments 2424, one or more column slabs 2610 as compressed column slabs 2612 for some or all columns 2707 based on implementing a column slab compression module 2616. These compressed column slabs 2612 can be accessed during query execution to facilitate identification of rows and/or materialization of the corresponding column values via decompression as needed during query executions accessing the corresponding one or more segments 2424. Some or all features and/or functionality of the database system 10, segments 2424, segment generator 2507, database storage 2450, and/or query processing module 2510 of FIGS. 25A-25L can implement any embodiment of the database system 10, segments 2424, segment generator 2507, database storage 2450, and/or query processing module 2510 described herein.

In some embodiments, for fixed-length data, block-level delta-delta compression, or other compression, can be implemented by database system 10 in generating segments 2424. Such compression of fixed-length data can be effective for certain data types and patterns, but can be less effective for others. In some embodiments, for variable-length data, per-value compression is or other compression, can be implemented in generating segments 2424. Such compression of variable-length data can be effective for very large values, but can be less effective for smaller values.

FIGS. 25A-25L present a database system 10 that implements whole-column compression (WCC), where data is compressed on a per-segment, per-column-slab basis. This can include using a seekable compression scheme, for example, built on top of a 3rd party compression library and/or implementing a custom compression library or any other compression library. The use of such whole-column compression as described herein can achieve high compression ratios based on training a compression dictionary for each column slab that is shared across compression frames. This allows WCC to enjoy the benefits of dictionary compression while keeping frames small enough to minimize overread at query time. Furthermore, this can allow WCC to be effective across more types of data, where the different compression dictionaries generated for different types of data in different columns, where effective compression of fixed-length columns is facilitated, and where effective compression of variable-length columns is also facilitated. Finally, the use of WCC can enable effective compression of array columns storing array values (e.g. a set/list of multiple fixed-length and/or variable-length values) and/or can enable effective compression of tuple columns storing tuple values (e.g. structured set of multiple fixed-length and/or variable-length values, optionally in nested structuring that includes one or more nested arrays and/or other tuples).

In some embodiments, compressed column slabs generated via implementing WCC as discussed herein are seekable to support efficient lookup of single rows in the slab. For example, at a high level: first, a compression lookup structure is loaded and searched to identify the disk blocks that contain the frame holding the target row; next, those blocks are read off disk; finally, the frame is decompressed in a streaming fashion to find and/or materialize the target row. Embodiments of finding/decompressing rows in compressed column slab are discussed in further detail in conjunction with FIGS. 25I-25L.

FIG. 25A illustrates an embodiment of a segment generator 2507 that implements a column slab compression module 2616 to generate, for example, by applying a WCC scheme, compressed column slabs 2612 for storage in segments 2424. Some or all features and/or functionality of the segment generator 2507 and/or the column slab compression module 2616 of FIG. 25A can implement any embodiment of segment generator 2507 and/or the column slab compression module 2616 described herein.

A plurality of uncompressed column slab data 2611 can be determined from a given dataset 2505, where some or all of this uncompressed column slab data 2611 is compressed. In particular, for each segment 2424.$i$, a plurality of uncompressed column slab data 2611.$i$.1-2611.$i$.C can be determined, for example, based on the column values for the records 2422 assigned to be included in the corresponding segment, for example, as discussed in conjunction with FIG. 24O and/or FIG. 24P. Thus, each column can have Y uncompressed column slab data 2611 determined based on the column values of the given column for each distinct set of rows assigned for inclusion in each of the Y segments 2424.

The column slab compression module 2616 can be implemented to compress some or all of the uncompressed column slab data 2611 of some or all segments 2424 to generate a plurality of compressed column slabs, which can be written to the respective segment for the respective column accordingly. Thus, each segment can have some or all of its C column slabs 2610 implemented as compressed column slabs 2612 generated by column slab compression module 2616 from a corresponding uncompressed column slab data 2611. In some embodiments, one or more uncompressed column slab data 2611 for one or more columns and/or one or more segments remains uncompressed, where respective column slabs 2610 are generated from uncompressed column slab data 2611 without applying the WCC scheme via column slab compression module 2610.

Compressed column slabs 2612 can be generated on a per-segment, per column-slab basis. Different compressed column slabs 2612 can thus be generated separately and/or independently from other compressed column slabs 2612. Some or all compressed column slabs 2612 can optionally be generated via parallelized processing resources, for example, operating without coordination.

FIG. 25B illustrates an embodiment of column slab compression module 2616 generating a given compressed column slab 2612.$i$.$k$ from a corresponding uncompressed column slab data 2611.$i$.$k$, where i denotes the column slab is a slab for a given segment 2424.$i$, and where k denotes the column slab is a slab for a given column 2707.$k$. The process illustrated in FIG. 25B can thus be implemented separately to generate some or all other compressed column slabs 2612 for some or all other columns and/or for some or all other segments from respective other uncompressed column slab data 2611. Some or all features and/or functionality of the column slab compression module 2616 of FIG. 25B can implement any embodiment of the column slab compression module 2616 and/or database system 10 described herein.

When a segment is generated and whole-column compression is enabled for at least one column in that segment, the segment writer (e.g. segment generator 2507) can train a compression dictionary on a subset of that column's data. For example, as illustrated in FIG. 25B, a compression dictionary training module 2621 can be implemented to generate a trained compression dictionary 2622.$i$.$k$ from the corresponding uncompressed column slab data 2611.$i$.k. Thus, when a given column k is compressed across multiple segments, multiple different trained compression dictionaries 2622.1.$k$-2622.Y.k can be generated separately for the given column k in conjunction with compressing the column slab for this column across some or all of the Y segments. Alternatively or in addition, when a given segment i is generated to include multiple columns slabs, multiple different trained compression dictionaries 2622.$i$.1-2622.$i$.C can be generated separately for the given segment i in conjunction with compressing the column slabs of this segment i for some or all of the C columns.

Each compression dictionary 2622 can be trained in conjunction with implementing a corresponding compression scheme/compression library. This compression scheme/compression library can be a $3^{rd}$ party compression scheme/compression library that is developed/established separately from database system 10, but is utilized by database system 10. This compression scheme/compression library can alternatively be a custom compression scheme/compression library configured for database system 10, for example, developed/established in conjunction with developing/establishing database system 10.

The compression scheme/compression library utilized to train each compression dictionary 2622 can be implemented via a non-adaptive dictionary compression algorithm, an adaptive dictionary compression algorithm, a lossless compression algorithm, a fixed byte pair encoding, byte pair encoding, and/or other dictionary compression. The compression scheme/compression library utilized to train each compression dictionary 2622 can be based on implementing some or all features and/or functionality of the Lempel Ziv Algorithm and/or adaptations of the Lempel Ziv Algorithm. The compression scheme/compression library utilized to train each compression dictionary 2622 can be implemented as, based on, and/or in a same or similar fashion as: zstd, zlib, LZ4, Smaz, LZ77, LZSS, LZRW1-A, LZJB, BARF, LZF, FastLZ, miniLZO, QuickLZ, LZS, Snappy, PalmDoc, LZSA, LZSA1, LZSA2, LZW, 1ZX, ROLZ, ACB, DTE, SCZ byte pair encoding, ISSDC diagram coding, LZ78, GIF, LXMW, LZAP, LZWL statistical Lempel Ziv, and/or another scheme and/or library.

A given compression dictionary 2622.*i.k* can be trained from a proper subset of the data in the corresponding uncompressed column slab data, for example, corresponding to column values for the column k for only a proper subset of the rows assigned to the segment i. In some embodiments, this proper subset of data utilized to train a given compression dictionary 2622.*i.k* is the first set of data (e.g. the first set of column values, serially) in the uncompressed column slab data 2611. In other embodiments, this proper subset of data utilized to train a given compression dictionary 2622.*i.k* is a random selection set of data (e.g. a randomly selected set of column values) in the uncompressed column slab data 2611.

This trained compression dictionary can be written to output column data. For example, the trained compression dictionary 2622.*i* is written to the corresponding segment 2424.*i*, for example, within the corresponding column slab 2612.*i*.

A header can also be written to output column data. The header can be generated and/or determined by the column slab as dictated/defined by the compression library utilized to generate the trained compression dictionary 2622. While not illustrated in FIG. 25B, this header can also be written to the corresponding segment 2424.*i*, for example, within the corresponding column slab 2612.*i*.

Once the given compression dictionary 2622.*i.k* is trained and/or is written to output column data, the segment generator 2507 can begin compressing the uncompressed column slab data 2611.*i.k* in a streaming fashion, generating one or more compression frames 2624. As illustrated in FIG. 25B, a compression frame generator 2623 can be implemented to generate a write a plurality of compression frames 2624.1-2624.L to the given compressed column slab 2612.*i*.k. For example, each compression frame 2624 is generated one at a time, for example, appended to/written after the prior compression frame in memory, based on compressing the uncompressed column slab data 2611.*i.k* in a streaming fashion.

In some embodiments, decompression can only begin at frame boundaries, and it is ideal to minimize extra block IO needed to read each row. In such embodiments, to minimize extra block IO needed to read rows and thus improve IO efficiency, the segment generator 2507 can be configured to attempt to adaptively determine the number of input rows needed to generate a frame spanning one to two fixed-length memory blocks of the segment 2424. When the desired size is reached, the frame can be closed and a new one is begun. Each frame can be required to contain an integer number of rows, where a column value is never split across frames. Thus, the frames holding very large values may span many (e.g. more than 2 blocks), despite this attempt to minimize blocks per frame being employed. An example compressed columns slab illustrating the spanning of frames across memory blocks is discussed in conjunction with FIG. 24C.

The compression frame generator 2623 can generate a compression lookup structure 2613, which can be written to the segment 2424 and/or other memory resources. When each frame is closed/completed, the compression lookup structure 2613 can be updated with an entry associating the frame with its corresponding blocks.

This entry and/or other mapping data within the compression lookup structure 2613 can further denote which rows are included within the given frame, for example, by simply denoting the number/identifier of a starting row of the frame and/or the range of rows in the frame if rows are written sequentially by identifier/number, and/or by otherwise denoting a list/set of rows included in the frame. In cases where rows are written consecutively, only the starting row is necessary, as the ending row/intermediate rows in the frame are frame is optionally not necessary, as this information is inherently denoted by the starting row of the next frame as indicated in the compression lookup structure 2613.

This entry and/or other mapping data within the compression lookup structure 2613 can further denote an offset/location within the respective starting block for a given frame denoting where within the block the given frame starts, and/or can further indicate an offset/location within the respective ending block for a given frame denoting where within the block the given frame ends. In cases where frames are written consecutively, the ending point of the frame is optionally not necessary, as this information is inherently denoted by the starting offset of the next frame as indicated in the compression lookup structure 2613.

In some embodiments, as illustrated in FIG. 24B, the compression lookup structure 2613.*i.k* is generated for the given compressed column slab 2612.*i*.k, where the set of multiple compression lookup structures 2613 are generated for multiple different column slabs of the segment that are compressed in this fashion, and can each be accessed to enable lookup to rows for a given corresponding column. The compression lookup structure 2613.*i.k* can be stored in the respective segment, and/or other location in memory resources accessible during query execution, where the given segment ultimately stores multiple compression lookup structures 2613 if multiple of its columns are compressed as compressed column slabs.

In other embodiments, a single lookup structure 2613 is generated to include lookup information for multiple different compressed column slabs 2612 for different columns of the same segment, multiple different compressed column slabs 2612 of different segments for the same column, and/or multiple different compressed column slabs 2612 of different segments and different columns. Such shared lookup structures 2613 can be accessible in a corresponding segment and/or other memory resources if shared across multiple segments.

Once all data of the uncompressed column slab data 2611.*i.k* has been compressed and thus included in compression frames 2624 written to the compressed columns slab 2612, the final frame 2424.L can be closed.

Different compressed column slabs 2612 for different columns in the same segment, and/or for the same or different column in different segments, can have the same or different numbers of frames generated. Different compressed column slabs 2612 for different columns in the same segment, and/or for the same or different column in different segments, can have the same or different storage sizes. For example, the number of frames and/or final size of different compressed column slabs 2612 are different based on reflecting different column values rendering different compression ratios, based on having compressed data for different columns of different data types having different sized, based on applying different compression dictionaries 2622 trained separately, or other differences.

FIG. 25C illustrates an example embodiment of a column slab 2612 having a plurality of frames written across blocks, and a compression lookup structure 2613 mapping the blocks to these frames. Some or all features and/or functionality of the segment 2424, column slab 2612, and/or compression lookup structure 2613 of FIG. 25C can implement any embodiment of segment 2424, column slab 2612, compression lookup structure 2613, and/or database system 10 described herein.

The given compressed column slab 2612 can begin with a header and the compression dictionary 2622 written within two blocks, or any number of blocks. The first frame can optionally start at the next new block as illustrated in FIG. 25C, for example, even if the compression dictionary did not span the entire prior block. Alternatively, the first frame can optionally start at the offset within the block where the compression dictionary ends.

The frame header can be defined by the 3rd party compression library utilized to train the compression dictionary and/or the compressed payload (e.g. the plurality of frames 2624.1-2624.L) itself. When decompressed, the payload can be identical to an uncompressed fixed or variable-length column slab on-disk format.

The trained compression dictionary 2622 can optionally span less blocks or more blocks. In some embodiments, the compression dictionary has a predetermined, configurable size and/or size range. In some embodiments, the trained compression dictionary 2622 has a size corresponding to a configured size and/or size range within the 32-128 KiB, or other required and/or suggested size bounds. The configured fixed-size and/or size range can be automatically selected via an optimization or other process, can be configured via user input, can be received, can be accessed in memory, and/or can otherwise be determined. Configuration of dictionary size is discussed in further detail in conjunction with FIG. 25D.

Compression dictionaries for different column slabs of the same or different segments can be of the same or different size. For example, different segments/different columns can optionally be user-configured and/or automatically configured to have compression dictionaries of different sizes. For example, columns having larger data types for its values and/or more cardinality across its values can optionally have larger compression dictionaries, for example, to optimize compression of the larger values. As another example, different segments have different sized dictionaries configured due to automatically detected differences in storage constraints, processing capabilities, or other performance differences across different nodes/computing devices generating, storing and/or accessing these different segments 2424.

In this example, the first frame 2624.1 spans more than one block and less than two blocks; the second frame 2624.2 spans more than two blocks; and the third frame 2624.3 spans less than one block. For example, these differences are based on the frames being variable-length based on applying the compression dictionary and/or the requirement that all column values be written within a single frame. Some or all of the spans of frames 2624 can be close to one to two blocks based on targeting one to two blocks as the frame size in minimizing IO during row reads as discussed previously. In other embodiments, greater/smaller numbers of blocks can be configured as the target/average frame size based on other IO optimizations or other storage/processing optimizations.

The compression lookup structure 2613 can be stored separately from the compressed column slab 2612, for example, within the segment 2424 and/or in another accessible location. WCC can employ a compression lookup structure 2613 that points to compression frames (which can be variable-length and may span blocks). Each block in the column span can appear as an entry in the structure, and each entry can identify the start row of the frame beginning in that block (if any), and the block relative byte offset where that frame begins.

As illustrated in FIG. 25C, for each block, the new frame starting in that block (if applicable), as well as the starting row and the offset for this new frame, can be indicated. In some embodiments, the system is configured to write only one new frame to a given block, where this new frame must end in a later block after the block in which it begins, to render each block being mapped to one (or no) new frames in this fashion. The frame that includes a given row can thus be determined from the compression lookup structure 2613, where only this identified frame need be read to render decompression of the given row as required (e.g. in query execution), rather than the entire compressed column slab being read and decompressed as a whole. In particular, the compression scheme applied to generate frames 2624 can be selected/configured to enable the decompression of any given frame 2624 independently from other frames to reduce IO while still enabling efficient compression of columns. While the location of a given row within the identified frame is optionally unknown until decompression is performed, this mechanism of compressing columns via WCC can still be ideal in improving query execution efficiency and improving efficiency of row reads in general based on the frames being relatively small, particularly as storage efficiency is also improved based on column slabs requiring less storage space due to being compressed, and/or due to being efficiently compressed based on adapting the compression dictionary to the data type of the column and/or the values included within the column due to the compression dictionary being trained per-column and/or per-segment.

FIG. 25D illustrates an embodiment of a database system 10 where at least one column 2707 of dataset 2505 is an array column and/or a tuple column, which has its uncompressed column slab data 2611 compressed via compression slab compression module 2616 for some or all segments 2424. Some or all features and/or functionality of FIG. 25D can implement any embodiment of column slab compression module 2616 and/or database system 10 described herein.

In some embodiments, WCC can be applied to any type of column, including fixed and variable-length scalars, arrays, and/or tuple columns having a plurality of tuple components. The given column 2707.k described herein can optionally be a tuple column and/or an array column. The dataset 2505 can include one or more tuple columns, one or more array columns, and/or a combination of both, where some or all of its tuple columns and array columns are compressed via WCC for some or all segments.

In some embodiments, WCC can be implemented on a per-tuple component basis. In some embodiments, the column slab for a tuple column includes different frames generated separately for different tuple elements 2739. In some embodiments, different compression dictionaries are trained separately for some or all different tuple elements/sub-elements, where multiple tuple component slabs implement a corresponding compressed column slab for the tuple that is stored in a given segment. For example, each tuple component slab for the tuple column can optionally include its own header and/or its own trained compression dictionary 2622, as well as its own set of frames compressing only the given tuple element for each row. Each such tuple component slab can have blocks/frame locations/rows mapped via their own lookup structure 2613, or shared lookup structure can be applied for some or all different elements of the tuple. This can be ideal in optimizing compression of like components appearing as a given element 2739 across the tuple structures of different rows, which can be unrelated to other elements 2739 of a given tuple based on training compression dictionaries separately for different components, for example, motivated similarly to training different compression dictionaries for different columns.

In some embodiments, WCC can be implemented on a per-array component basis in a similar fashion for some or all array columns, Alternatively, in cases where array elements are the same data type and/or are not necessarily mapped to distinct types of data for different indexes of the array, arrays are compressed as a whole and/or their elements undergo compression via a same compression dictionary trained upon some or all elements of a subset of array structures corresponding to a subset of rows of the uncompressed column slab.

In some embodiments, WCC can be implemented for tuples as a whole for some or all tuple columns, where the compression dictionary is trained upon entire tuples and compressed the tuples accordingly via a single dictionary.

Figure 25E:
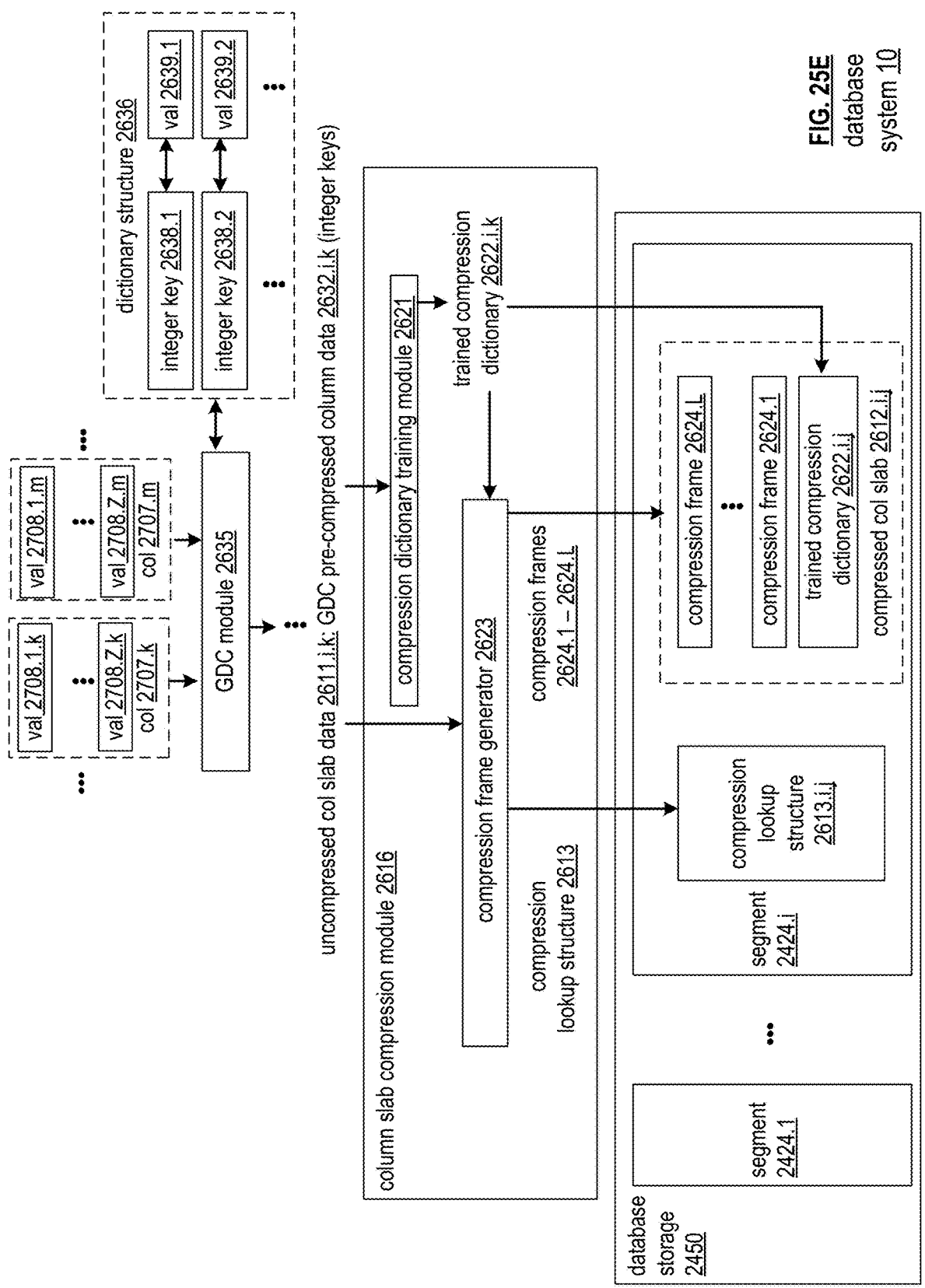
FIG. 25E is a schematic block diagram of a database system that implements a global dictionary compression module to generate pre-compressed column data that is further compressed via column slab compression module in accordance with various embodiments.

FIG. 25E illustrates an embodiment of column slab compression module where the given uncompressed column slab data 2611 that is compressed via WCC has already undergone other compression. Some or all features and/or functionality of the uncompressed column slab data 2611 and/or the column slab compression module of FIG. 25E can implement any other embodiment of column slab data 2611, column slab compression module 2616, and/or database system 10 described herein.

In some embodiments, WCC can be exclusive of other fixed-length or variable-length compression, Furthermore, in some embodiments, WCC can be used in conjunction with global dictionary compression (GDC). For example, when enabled on a GDC column, first GDC is applied to compress a variable-length value into an integer value, and then WCC is applied on the column stream of integers to compress them on disk.

As illustrated in FIG. 25E, a dictionary structure 2636 can be accessed by a global dictionary compression (GDC) module 2635 to generate GDC pre-compressed column data. The GDC pre-compressed column data can correspond to a plurality of integer keys 2638 for the given column, for example, based on these integer keys 2638 mapping to the respective original column values 2639 in the dictionary structure.

In some embodiments, dictionary compression (GDC) module 2635 can determine which integer key maps to a given value of a given column undergoing GDC, and/or can optionally add a new entry if a new value is encountered to map this new value to a new integer key. The integer keys can be unique to ensure the values 2939 is recoverable as needed.

Thus, a given uncompressed column slab data 2611 for the given column can include the corresponding GDC pre-compressed column data 2632 (e.g. integer values) for the respective set of rows assigned to the segment. In some embodiments, the entire column underwent GDC via GDC module prior to grouping of rows into segments groups. In other embodiments, the column undergoes GDC via GDC module after being grouped into segment groups.

Such uncompressed column slab data 2611.$i.k$ of a GDC column k, if compressed via WCC, can thus be processed to train a corresponding compression dictionary 2622.$i.k$, which is different from the dictionary structure 2636. In particular, this corresponding compression dictionary 2622.$i.k$ is trained from the integer values of the corresponding GDC pre-compressed column data 2632.$i.k$ to render further compression of this set of integer values of the given column for the set of rows included in the given segment.

In some embodiments, all rows of the dataset 2505 have the given column GDC compressed via the dictionary structure 2636. However, the given column may be selectively further compressed via WCC for some segments, but not for others, based on WCC being applied on a per-segment basis, while GDC is optionally applied across all rows of a dataset regardless of what segments they ultimately are stored in. Furthermore, for each given segment that is further WCC compressed, a different compression dictionary 2622 is generated and applied to further compress the column in the given segment, where multiple compression dictionaries 2622 are thus generated for this same column if multiple segments have this column undergo WCC, despite the same, single dictionary structure 2636 having been applied to compress this column via GDC across all segments.

In some embodiments, the dataset has multiple GDC compressed columns, such as variable-length columns or fixed-length columns compressed as fixed-length integer values via dictionary structure 2636, where any of these columns can similarly be further compressed for some or all segments 2424 via WCC, and/or where one or more of these columns are not further compressed for some or all segments 2424 via WCC.

In some embodiments, the dataset has one or more variable-length columns or fixed-length columns not compressed via GDC, where the uncompressed column slab data 2611 for these columns are thus still the original variable-length column values and/or original fixed-length values, which are compressed directly via WCC rather than first being converted into integer values.

The dictionary structure 2636 implemented by GDC module can be stored in any memory resources of database system 10. The dictionary structure 2636 can be applied across multiple columns, where different variable-length columns of the same or different dataset 2505 have their integer keys mapped to their original values via the same dictionary structure 2636. Alternatively, different dictionary structures 2636 are implemented for some or all different columns and/or for some or all different datasets 2505.

Once a WCC-compressed frame is identified and decompressed to recover the corresponding column values of a GDC compressed columns, the respective integer values are optionally further decompressed via the dictionary structure 2636 to determine the original variable-length value.

FIG. 25F illustrates an embodiment of a column slab compression module 2616 that generates compressed column slabs in accordance with compression configuration data 2619. Some or all features and/or functionality of the column slab compression module 2616 and/or the segment generator 2507 of FIG. 25F can implement any embodiment of the column slab compression module 2616, segment generator 2507, and/or database system 10 described herein.

In some embodiments, WCC can be configured via user input, for example, as compression configuration data 2619. For example, this configuration is facilitated via user input, for example, by an administrator, end user, software engineer, or other user communicating with database system 10. As a particular example, Whole-column compression can have one or more configurable parameters that can be specified, for example, via the Data Definition Language (DDL) or another programming language/other instructions. Alternatively, some or all of the compression configuration data 2619 is automatically generated by database system 10.

In some embodiments, a first parameter corresponding to compression level can be configured as compression level parameter data 2628, which can be configured as a numeric value that lets users adjust the compression ratio vs. heap memory and CPU usage, for example, to be consumed when training the respective compression dictionary. The compression level parameter data 2628 can be configured as other one or more values/instructions that configure how much compression is employed and/or how much processing/memory resources are utilized to generate the compression dictionary and/or the resulting compressed data slab.

Alternatively or in addition, a second parameter corresponding to dictionary size can be configured as dictionary size parameter data 2629, which can be configured as a value denoting the size (e.g. the fixed-size, and/or maximum/minimum size bounds) of the compression dictionary. In general, larger dictionaries provide better compression, but require more memory to train.

Alternatively or in addition, one or more other parameters of compression configuration data 2619 can be specified via user input and/or automatically. For example, the particular compression library/compression scheme to be applied can be configured to select which compression library/compression scheme is used by column slab compression module. As another example, the target frame size (e.g. one to two blocks) can be configured. Any other parameters specifying size/means by which columns slabs are compressed can be configurable parameters of compression configuration data 2619.

Some or all such parameters of the compression configuration data 2619 can be changed over time, for example, based on further user input updating one or more parameters of the compression configuration data 2619 and/or the database system 10 determining to automatically update one or more parameters, for example, as automatically identified to improve system performance.

Compression metadata 2631 can be maintained in each segment, enabling different segments to have different compression schemes for their respective column slabs. This metadata can be accessed to identify which columns are compressed in the segment, the scheme utilized to compress all columns and/or individual columns, and/or can specify some or all the compression configuration data 2619 that was applied to different individual columns and/or that was applied to the segment as a whole.

In some embodiments, some or all of the compression configuration data 2619 can be applied across a system level, where all compressed columns slabs across different columns and different segments are compressed via the same parameters as specified in compression configuration data 2619. In some embodiments, some or all of the compression configuration data 2619 can be applied across a per-segment, per-column or per-tuple-component basis. For example, different compression level parameter data 2628, different dictionary size parameter data 2629, and/or other different parameters of compression configuration data 2619 can be applied across different segments, different columns, and/or different tuple components. For example, a first column is configured differently from a second column, and the first column is compressed in a first corresponding fashion across some or all segments, while the second column is compressed in a different, second corresponding fashion across some or all segments. As another example, a first segment is configured differently from a second segment, and the compressed columns of the first segment are all compressed in a first corresponding fashion, while the compressed columns of the second segment are all compressed in a second corresponding fashion.

As another example, a first tuple component of a given tuple column is configured differently from a second tuple component of the given tuple column, and the compressed column for the tuple column (across a given segment, or some or all segments), is generated based on compressing the first tuple component in a first corresponding fashion, and based on compressing the second tuple component in a different, second corresponding fashion. In some embodiments, the column slab for the tuple includes different frames generated separately for different tuple components, each in accordance with different compression parameters. In some embodiments, different compression dictionaries are trained separately for different tuple components, each in accordance with different compression parameters.

Figure 25H:
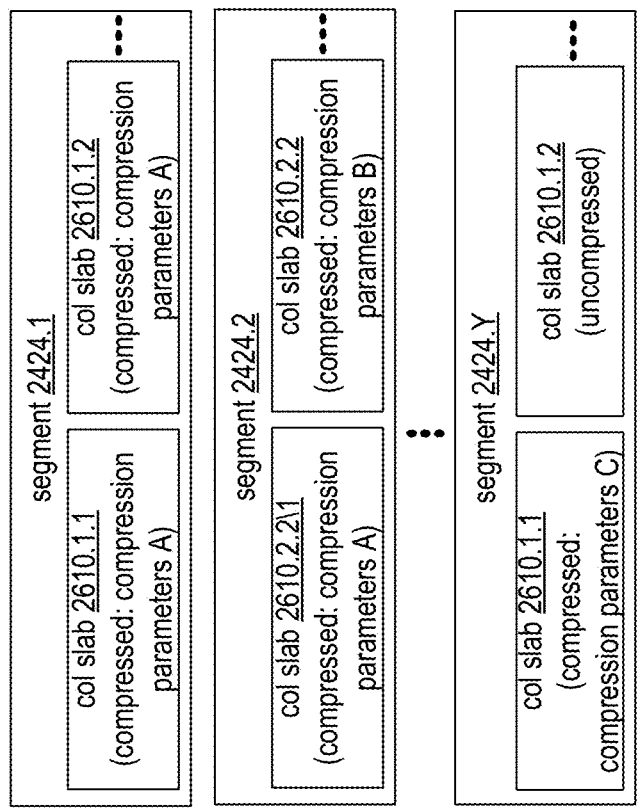
FIG. 25H illustrates an example plurality of segments having different compression schemes applied to compress column slabs in accordance with various embodiments.
Figure 25G:
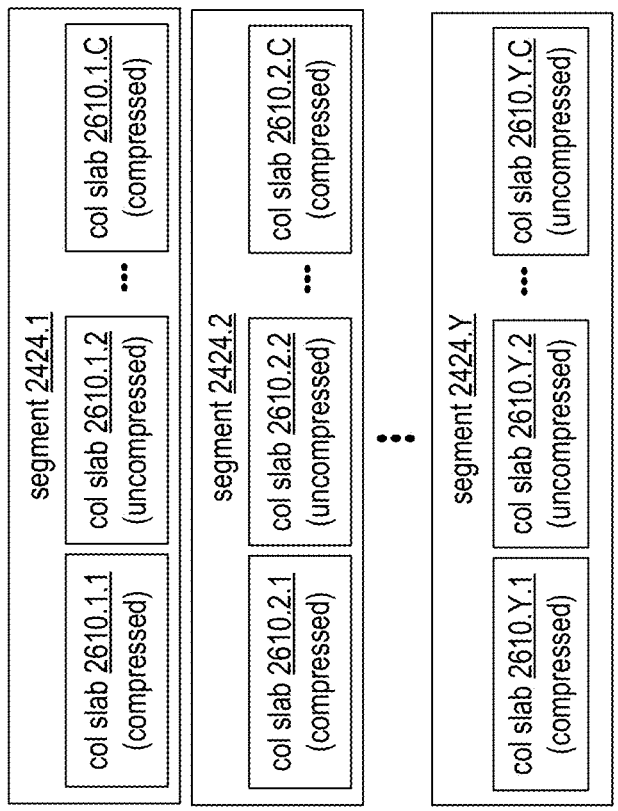
FIG. 25G illustrates an example plurality of segments having different subsets of column slabs compressed in accordance with various embodiments.

FIG. 25G illustrates an example where different segments have different sets of the set of columns slabs compressed vs. uncompressed via WCC, based on WCC being applied to different columns for some or all different segments. Some or all features and/or functionality of the set of segments 2424.1-2424.Y of FIG. 25G can implement any set of segments generated from a dataset 2505 and/or any embodiment of database system described herein.

As illustrated in the example of FIG. 25G, "compressed" denotes the column slab is a compressed column slab 2612 that was compressed via WCC (e.g. via column slab compression module 2616 as described herein), while "uncompressed" denotes the column slab is a column slab 2610 that was not compressed via WCC. Note that one or more columns slabs that are indicated as uncompressed or compressed in FIG. 25G may have undergone GDC compression or other types of compression, which can be independent from their status as a compressed or uncompressed column slab under WCC.

Different segments can be configured differently to have different ones of its columns compressed via WCC. This configuration is optionally specified by compression configuration data 2619 denoting different configuration for different columns, and/or other instructions that are user specified and/or automatically determined. Compression metadata 2631 can optionally be stored in and/or mapped to each segment to denote which columns of the corresponding segment are compressed vs. uncompressed.

In some embodiments, one or more segments have all of their columns compressed via WCC. In some embodiments, one or more segments have none of their columns compressed via WCC. In some embodiments, at least two segments have different non-null proper subsets of columns compressed via WCC and/or have different numbers of columns compressed via WCC.

In some embodiments, at least one column 2707 is consistent across all segments, where at least one columns is WCC compressed for all segments 2424, or is not WCC compressed for all segments 2424. In some embodiments, all columns 2707 are consistent across all segments, where every column is either WCC compressed in all segments segment 2424 or not WCC compressed in all segments segment 2424.

In some embodiments, at least one column 2707 is not consistent across all segments, where at least one column is WCC compressed in at least one segment 2424, and is also not WCC compressed for at least one other segment 2424. In some embodiments, no columns 2707 are consistent across all segments, where every column is WCC compressed in at least one segment 2424, and is also not WCC compressed for at least one other segment 2424.

FIG. 25H illustrates an example where different segments have different compression parameters applied under via WCC for its column slabs, based on WCC being applied to different columns for some or all different segments via different parameters. Some or all features and/or functionality of the set of segments 2424.1-2424.Y of FIG. 25H can implement any set of segments generated from a dataset 2505 and/or any embodiment of database system described herein.

As illustrated in the example of FIG. 25G, "compressed" denotes the column slab is a compressed column slab 2612 that was compressed via WCC (e.g. via column slab compression module 2616 as described herein), while "uncompressed" denotes the column slab is a column slab 2610 that was not compressed via WCC. However, "compression parameters A" vs. "compression parameters B" can compression under WCC, via different corresponding parameters (e.g. as configured in compression configuration data 2619). Note that one or more columns slabs that are indicated as uncompressed or compressed in FIG. 25G may have undergone GDC compression or other types of compression, which can be independent from their status as a compressed or uncompressed column slab under WCC.

Different segments can be configured differently to have different ones of its columns compressed via different parameters under WCC. This configuration is optionally specified by compression configuration data 2619 denoting different configuration for different columns, and/or other instructions that are user specified and/or automatically determined. Compression metadata 2631 can optionally be stored in and/or mapped to each segment to denote how different columns of the corresponding segment are compressed under WCC.

In some embodiments, some or all columns compressed are via WCC for a given segment, and all of the columns compressed under WCC are compressed via the same compression parameters. In some embodiments, a first segment segments has all of its WCC compressed column slabs compressed via first compression parameters applied across its column slabs, and a second segment segments has all of its WCC compressed column slabs compressed via second compression parameters applied across its column slabs, where the second compression parameters are different from the first compression parameters.

In some embodiments, some or all columns compressed are via WCC for a given segment, but some or all of different columns of the given segment are compressed under WCC via different compression parameters from each other. In some embodiments, at least two segments 2424 can have different sets of different compression parameters applied across its column slabs and/or can have different numbers of different compression parameters applied across its column slabs. In some embodiments, a first segment segments has its WCC compressed column slabs compressed via a corresponding set of compression parameters (which can be the same or different), and a second segment segments has all of its WCC compressed column slabs compressed via this same corresponding set of compression parameters (e.g. column 1 is compressed via compression parameters A for both segments. column 2 is compressed via compression parameters B for both rows, etc.).

In some embodiments, at least one column 2707 is compressed consistently across all segments, where at least one column is WCC compressed via the same compression parameters for all segments 2424. In some embodiments, at least one column 2707 is compressed consistently across all segments where it is compressed under WCC, where at least one column is WCC compressed via the same compression parameters for all segments 2424 in which it is WCC compressed, but is not compressed in some segments 2424. In some embodiments, all columns 2707 are compressed consistently across all segments when compressed under WCC, where all columns are each WCC compressed via the same compression parameters for all segments 2424 in which they are WCC compressed, which are optionally different from that of other columns.

In some embodiments, a first columns is compressed consistently across all segments via first parameters, and a second column is also compressed consistently across all segments via these first parameters. In some embodiments, a first columns is compressed consistently across all segments via first parameters, and a second column is compressed consistently across all segments via second parameters different from the first parameters.

In some embodiments, at least one column 2707 is not compressed consistently across all segments in which it is compressed under WCC, where at least one column is WCC compressed in at least one segment 2424 via first compression parameters, and this at least one column is WCC compressed in at least one other segment 2424 via second compression parameters. In some embodiments, no column 2707 is compressed consistently across all segments in which it is compressed under WCC, where any given column is WCC compressed in at least one segment 2424 via corresponding compression parameters, and the given column is WCC compressed in at least one other segment 2424 via other compression parameters.

In some embodiments, at least two columns can have different sets of different compression parameters applied across all segments and/or can have different numbers of different compression parameters applied across all segments.

Figure 25I:
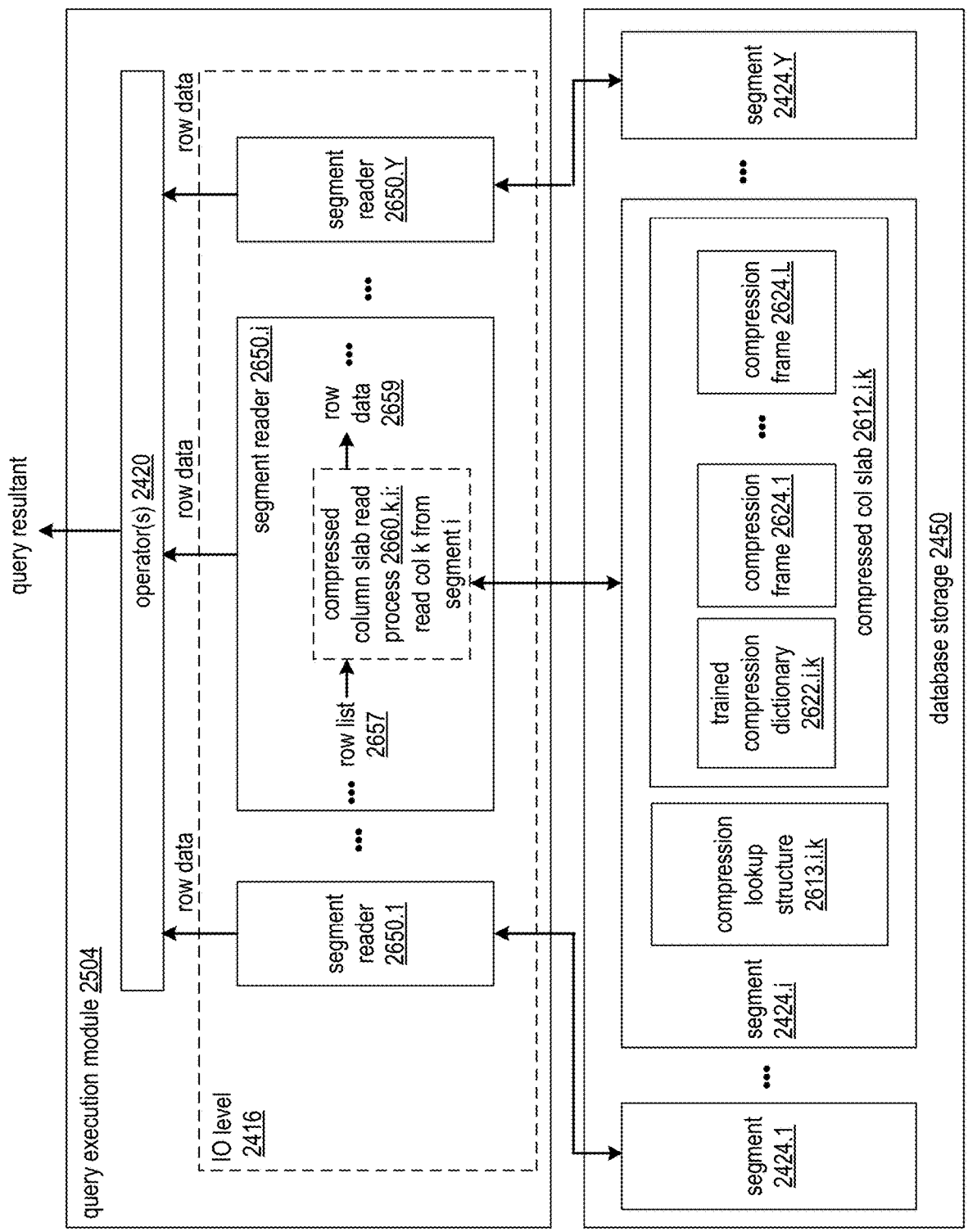
FIG. 25I is a schematic block diagram of a database system 10 that implements a query execution module that implements at least one segment reader to read compressed column slabs during query execution in accordance with various embodiments.

FIG. 25I illustrates an embodiment of a database system that implements at least one segment reader 2560 to generate row data for a given column that is WCC compressed as a compressed column slab 2612 in a corresponding segment. Some or all features and/or functionality of the segment reader 2560 and/or query execution module 2504 of FIG. 25L can implement any embodiment of the segment reader 2560, query execution module 2504, and/or database system 10 described herein.

During query execution for a query requiring access to a given column k that is WCC compressed as a compressed column slab in one or more segments 2424, the IO level 2415 can implement segment readers 2650. A segment reader 2560 can be operable to read whole-column compressed data of at least one column slab of at least one segment. In particular, a given segment reader 2560 can be operable to perform a compressed column slab read process 2650.i.k to read column k from segment i, rendering generation of row data from an incoming row list. This row data can be further filtered/processed at the IO level and/or can be emitted to operators 2420 for processing, for example, in conjunction with other data for other columns.

In some embodiments, some or all other segment readers for other segments do not perform the compressed column slab read process 2660 for column k based on column k not being compressed and being able to be read directly. I In some embodiments, the segment reader 2650.i, and/or some or all other segment readers, performs additional compressed column slab read processes 2660 for additional columns based on these additional columns being compressed via WCC and also requiring access in conjunction with execution of the given query.

Some or all of the plurality of segment readers 2650 can optionally be implemented independently and/or in parallel.

Figure 25K:
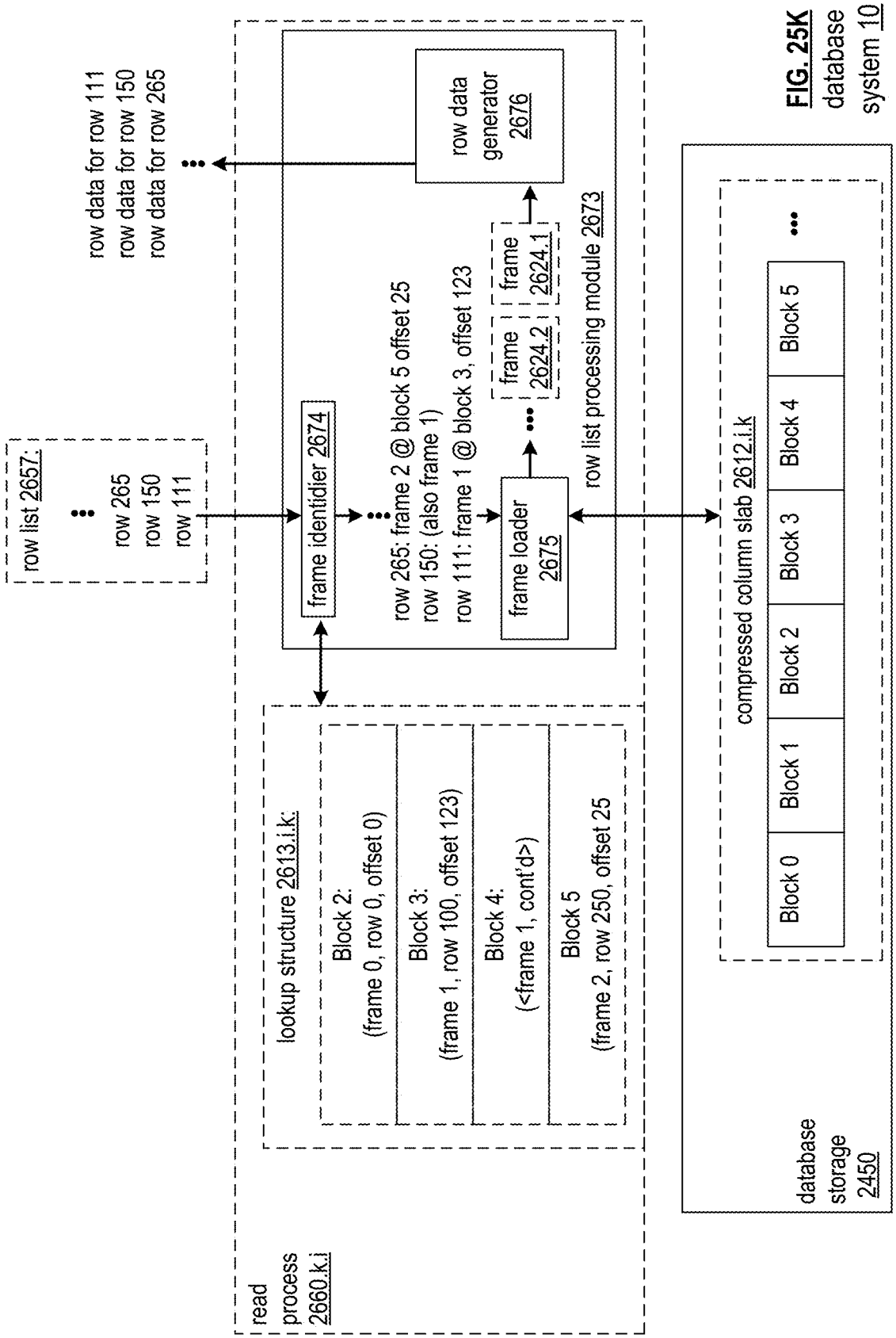
FIG. 25K is a schematic block diagram of a segment reader processing an example row list in accordance with various embodiments.
Figure 25L:
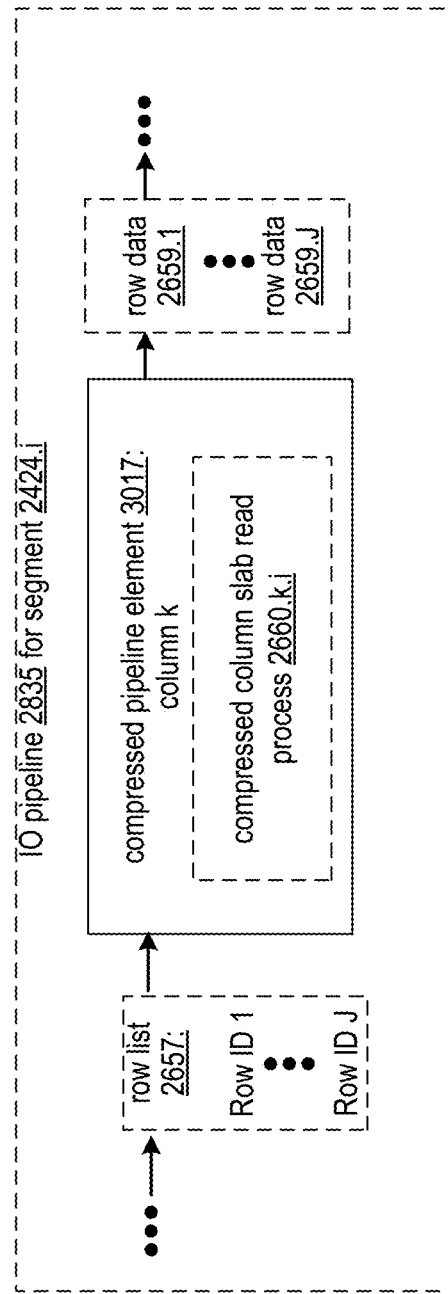
FIG. 25L is a schematic block diagram illustrating execution of an IO pipeline that includes a compressed pipeline element in accordance with various embodiments.

Some or all of the plurality of segment readers 2650 can optionally be implemented as respective IO pipelines 2835 for the respective segments, for example, as discussed in conjunction with FIG. 25L Each of the plurality of segment readers 2650 can optionally be implemented via a corresponding node 37 storing the respective segment 2424, where a given node optionally implements multiple segment readers 2650 via shared and/or distinct processing resources based on storing multiple ones of the segments 2424 requiring access.

FIG. 25J illustrates an embodiment of performance of a read process 2660.$i.k$ to access a given compressed column slab 2612.$i.k$ in conjunction with executing a given query. Some or all features and/or functionality of the read process 2660.$i.k$ and/or segment reader 2560 of FIG. 25J can implement any embodiment of the read process 2660.$i$.k, segment reader 2560, and/or database system 10 described herein.

An incoming row list 2657 can specify which rows require being read, for example, for ultimate decompression of the respective values in conjunction with execution of the query. This incoming row list 2657 optionally specifies a filtered, proper subset of all rows of the segment based on prior filtering having been applied (e.g. based on applying other query predicates, based on accessing probabilistic index data for the given column, based on accessing the index data and/or values for other columns to filter the row list based on predicates for other columns, based on this row being specified in the query and/or in user input directly, etc.) Alternatively, the incoming row list 2657 optionally specifies all rows of the segment.

A lookup structure loader 2671 can be implemented to load some or all of the compression lookup structure 2613.$i.k$ to local memory or other memory accessible by the read process 2660 for access to identify frame locations of each row in the row list 2657. Alternatively, the compression lookup structure 2613.$i.k$ is already loaded based on having been cached, for example, in conjunction with executing another query. Alternatively, the compression lookup structure 2613.$i.k$ is not loaded, but instead accessed directly in segment 2424 to return frame location data for each row in the row list as needed.

A dictionary loader 2672 can be implemented to load some or all of the compression structure 2613.$i$.k to local memory or other memory accessible by the read process 2660 for access to generate row data for each row in the row list 2657. Alternatively, the compression structure 2613.$i.k$ is already loaded based on having been cached, for example, in conjunction with executing another query. Alternatively, the compression structure 2613.$i.k$ is not loaded, but instead accessed directly in segment 2424 to return compression data for rows in the row list as needed.

A row list processing module 2673 can be implemented to process the row IDs included in the row list 2657 in conjunction with accessing the lookup structure 2613.$i.k$ and/or dictionary 2622.$i.k$, for example, in local memory based on having been loaded and/or via corresponding accesses to the segment 2424 in database storage 2450. A frame identifier 2674 can be implemented to access the lookup structure 2613.$i.k$ (e.g. in local storage based on having been loaded) to identify, for each row in the row list, the frame location of a corresponding compression frame.

For example, for a given row ID j, this includes searching the lookup structure to identify a starting block denoting the start of a frame p that has the largest row number that is still less than the given row j ID (e.g. via a binary search or other search), determining the row is thus included this frame p, identifying the offset of this frame in the corresponding starting block as specified in the respective entry of the lookup structure 2613, identifying the block and corresponding offset for the start of the next frame based on entries for one or more subsequent blocks in the lookup structure 2613.

A frame loader 2675 can utilize the frame location data for each row to load the identified frame p for each row. For a given frame p location, the frame 2624.$p$ is loaded, for example, by reading from the offset in the identified starting block to the offset in the identified ending block where the next frame begins. In cases where multiple rows are included in the same frame, this same frame is optionally loaded only once.

A row data generator 2676 can process the frame 2624 in conjunction with processing dictionary 2622.$i.k$ to generate row data 2659 for row j. In some embodiments, the row data 2659 is the original, decompressed column value of row j for column k. In other embodiments, the row data 2659 is a view, such as instructions or other data, that can render fast decompression of the frame to render recovery of the original, decompressed column value of row j for column k at a later time, as needed. For example, the row data 2659 includes and/or indicates: a relevant portion of the dictionary 2622 and/or memory location data to access the loaded dictionary 2622 when decompression is performed; the frame 2624.$p$ and/or memory location data to access the loaded frame 2624.$p$ when decompression is performed; information denoting which row in the loaded frame is row j (e.g. a number of rows from the starting row to row j is the ID for row j minus the ID for the starting row of the frame as specified in the lookup table); and/or other information.

Decompressing the frame 2624.$p$ to recover the column value of row j for column k (e.g. at a later time, or directly by row generator 2676) can include accessing the compression dictionary 2622.$i.k$ (e.g. in local memory based on having been loaded) to decompress the loaded frame 2624.$p$ in accordance with the respective compression library/compression scheme applied to train the compression dictionary 2622.$i$.k. The loaded frame 2624.$p$ can be decompressed starting from the beginning of the frame. In some embodiments, rather than decompressing the whole frame, only a first portion of the frame is decompressed up until row j (e.g. based on decompressing the determined number of values of row j from the start row).

In embodiments where multiple rows included in the same frame 2624 require decompression, the frame is optionally decompressed only once to render recovery of the multiple respective column values. In such cases, rather than decompressing the whole frame, only a first portion of the frame is decompressed up until the last row/row with the highest ID included in the column to ensure all necessary rows are decompressed, without requiring full decompression of the frame.

In embodiments where the column k was also GDC compressed, the dictionary structure 2636 can be accessed as necessary to further decompress the integers as the original column values.

FIG. 25K illustrates a particular example of a row list processing module 2763 being applied for an example set of rows. The compressed column slab 2612.$i.k$ can have frames that include the rows as illustrated in the example of FIG. 25C and that span the blocks as illustrated in the example of FIG. 25C.

In this example, frame identifier 2674 identifies location data for frame 1 and frame 2 based on accessing lookup structure 2613 and determining frame 1 includes rows 111 and 150, and that frame 2 includes row 265. The frame loader loads these frames 1 and 2 starting from the specified block at the specified offset. Frame 0 is not loaded based on the row list not including any rows from row 0 to row 100.

The row data generator 2676 can generate row data by decompressing, or generating a view to enable decompression of, the identified rows of the row list. When ultimately decompressing the column values for rows 111 and 150, frame 2624.1 is optionally decompressed once to read both of these rows, up until row 150 is decompressed, as no rows after row 150 are required. This can include reading only the first 51 values of the frame based on the frame starting at row 100, and based on the compression being applied serially in accordance with applying the respective compression scheme, where the $51^{st}$ value and the $12^{th}$ value are returned as the column values for row 111 and 150. Frame 2 and/or other frames can be decompressed similarly based on which rows within the frame require having values materialized.

FIG. 25L illustrates an embodiment of an IO pipeline 2835 for a given segment 2424.i that is executed by query execution module 2504. The IO pipeline 2835 can include a compressed pipeline element 3017 for a given WCC compressed column k. Execution of the compressed pipeline element 3017 upon its input row list can include performing some or all functionality of compressed column slab read process 2660 discussed in conjunction with FIGS. 25I-25J for the corresponding compressed column slab 2612.i.k. Some or all features and/or functionality of the segment reader 2560, IO pipeline 2835, and/or query execution module 2504 of FIG. 25L can implement any embodiment of the segment reader 2560, IO pipeline 2835, query execution module 2504, and/or database system 10 described herein.

In some embodiments, the segment reader 2560 can optionally be implemented for a given segment in conjunction with executing a corresponding IO pipeline 2835 for the given segment 2424. In the case where the segment contains whole-column compressed data as one or more of its column slabs requiring access in conjunction with a corresponding query, IO pipeline 2835 can include a compressed pipeline element 3017 for column k that, when executed, renders execution of compressed column slab read process 2660. In such embodiments, the functionality of segment reader 2560 illustrated in conjunction with FIGS. 25I-25J can be performed upon execution of a corresponding IO pipeline 2835, and/or functionality of compressed column slab read process 2660 illustrated in conjunction with FIGS. 25I-25J can be performed upon execution of such a compressed pipeline element 3017.

In some embodiments, this compressed pipeline element 3017 is implemented as a type of source element 3014 that generates row data for specified rows of a given columns. However, the output of the compressed pipeline element optionally does not emit materialized column values like source elements applied to uncompressed columns, and can instead emit views for the requested rows that can be later processed to find, decompress, and/or materialize the column values for the requested rows from the loaded frames, for example, lazily and/or on-demand.

In particular, this element 3017 can be operable to generate a set of row data 2659.1-J for an incoming set of rows 1-J indicated in incoming row list 2657 based on: reading the compression dictionary off disk, loading the corresponding compression lookup structure partition (which may be cached) and searching it for the frame and corresponding disk blocks holding the needed row data; issuing IO for the blocks containing the matching frames; and/or returning a view that can find, decompress, and materialize rows from the loaded frames lazily and/or on-demand as corresponding row data 2659.

In some embodiments, for each row materialized: a portion of corresponding compression frame can be decompressed, starting from the beginning of the frame. Decompressed column data is streamed into the provided output buffer, avoiding unnecessary copies.

In some embodiments, the incoming row list processed by compressed pipeline element 3017 of FIG. 25L was previously generated by first applying an index element 3512 of the IO pipeline 2835 for the column k to identify the rows meeting conditions specified in the query predicates and/or to identify a superset of rows in conjunction with accessing a probabilistic index structure for column k. In some embodiments, the incoming row list processed by compressed pipeline element 3017 of FIG. 25L was previously generated by first applying filtering to another row list, for example, based on whether values of another column meet conditions specified in the query predicates. In some embodiments, the incoming row list processed by compressed pipeline element 3017 of FIG. 25L was previously generated by first applying a set intersection, set union, set difference, or other set element two or more incoming row lists generated by prior, parallel elements of the IO pipeline. In some embodiments, the incoming row list processed by compressed pipeline element 3017 of FIG. 25L was previously generated by first applying at least one other prior one or more elements of the IO pipeline. In some embodiments, the incoming row list processed by compressed pipeline element 3017 of FIG. 25L was not previously generated by first applying at least one other prior one or more elements of the IO pipeline, and/or the row list optionally corresponds to all rows.

In some embodiments, only some of the rows of the incoming row list having row data generated is ultimately materialized, for example, based on filtering being applied to the set of rows 1-J to filter some or all of these rows out in conjunction with applying the query predicates. Alternatively, all of the rows of the incoming row list having row data generated are ultimately materialized.

In some embodiments, additional compressed pipeline elements 3017 are applied for other WCC compressed columns for example, as specified in the query for being projected and/or being filtered based on their values. Such other compressed pipeline elements 3017 are optionally applied serially before, serially after, and/or in parallel with the given compressed pipeline elements 3017 of FIG. 25L.

In some embodiments, other segments are processed via different IO pipelines that optionally do not include the compressed pipeline element 3017 for column k, for example, based on the column k not being WCC compressed in these other segments. In some embodiments, other segments are processed via different IO pipelines that optionally include the compressed pipeline element 3017 for column k, but are configured in a different fashion from the IO pipeline for segment i based on other differences between the segments.

In some embodiments, the rows are materialized within the IO pipeline to render further filtering of the rows, for example, via filtering elements 3016 that compare the decompressed values to a value specified by the query predicates or otherwise evaluate the decompressed values against the query predicate. Alternatively, the rows are materialized later via other operators 2520 that process the respective view.

Ultimately, the materialized, decompressed values can be further processed/manipulated/aggregated via operators 2520 and/or can be emitted as projected values in the resultant, as specified by the query.

Figure 25M:
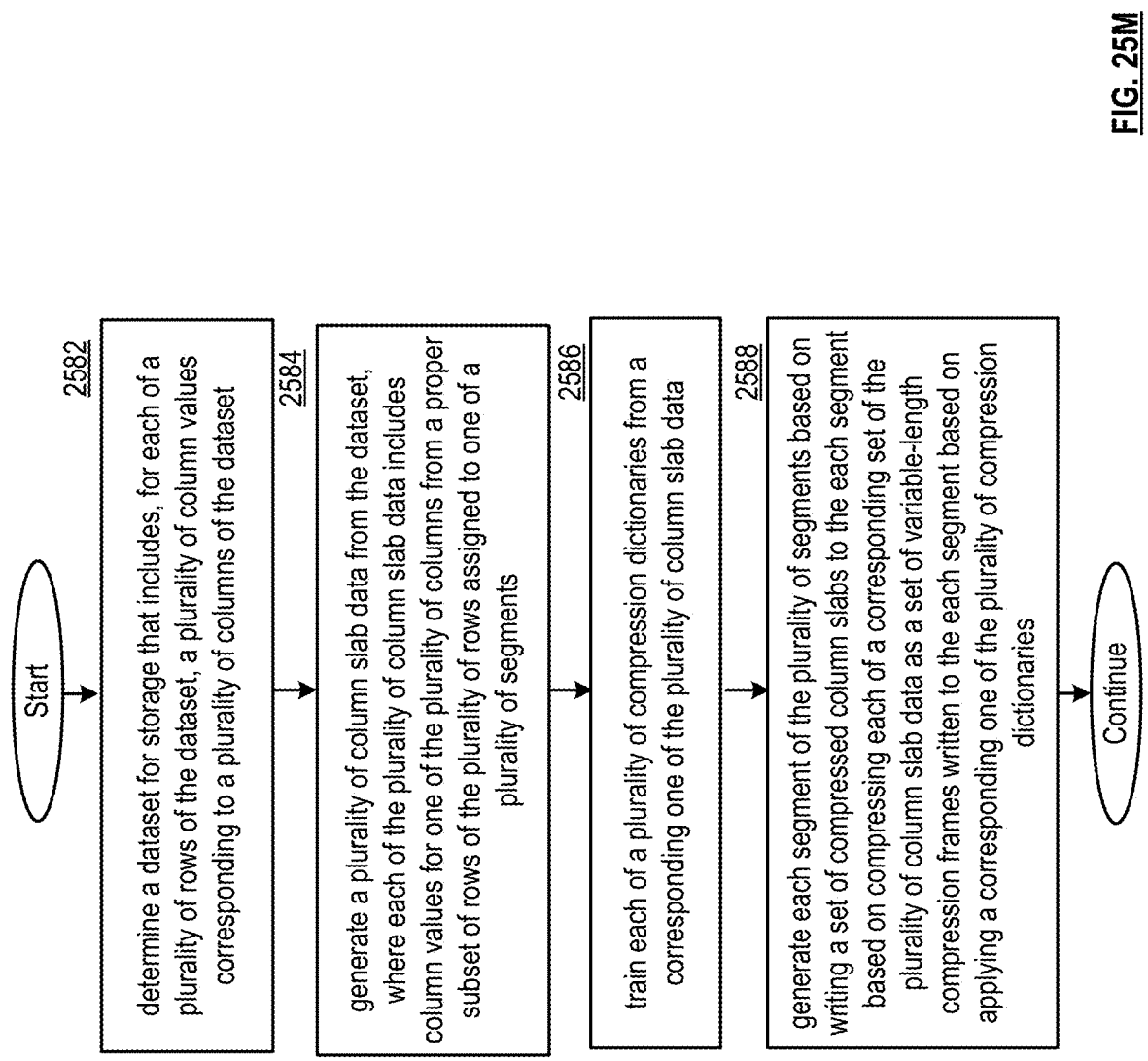
FIG. 25M is a logic diagram illustrating a method for execution in accordance with various embodiments.

FIG. 25M illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25M. In particular, a node 37 can utilize a processing module to execute some or all of the steps of FIG. 25M, where multiple nodes 37 implement their own processing modules to independently execute some or all of the steps of FIG. 25M. For example, a given node 37 executes some or all of the steps of FIG. 25M in conjunction with storing and/or accessing data via a corresponding one or more storage devices, such as its own memory drives, where multiple nodes 37 independently execute some or all of the steps of FIG. 25M in conjunction with storing data via their own, separate storage devices.

Some or all of the method of FIG. 25M can be performed by utilizing a segment generator 2507, for example, by implementing a column slab compression module 2616, in accordance with some or all features and/or functionality described in conjunction with FIGS. 25A-25L. Some or all of the steps of FIG. 25M can optionally be performed by any other processing module of the database system 10. Some or all steps of FIG. 25M can be performed by database system 10 in accordance with other embodiments of the database system 10 and/or nodes 37 discussed herein.

Step 2582 includes determining a dataset for storage. For example, the dataset includes, for each of a plurality of rows of the dataset, a plurality of column values corresponding to a plurality of columns of the dataset. Step 2584 includes generating a plurality of column slab data from the dataset. For example, each of the plurality of column slab data includes column values for one of the plurality of columns from a proper subset of rows of the plurality of rows assigned to one of a plurality of segments. Step 2586 includes training each of a plurality of compression dictionaries from a corresponding one of the plurality of column slab data. Step 2588 includes generating each segment of the plurality of segments based on writing a set of compressed column slabs to the each segment, for example, based on compressing each of a corresponding set of the plurality of column slab data as a set of variable-length compression frames written to the each segment based on applying a corresponding one of the plurality of compression dictionaries.

In various examples, the proper subset assigned to the one of the plurality of segments is one of a plurality of proper subsets of rows assigned to the plurality of segments. In various examples, each of the plurality of proper subsets of rows is assigned for storage in exactly one of the plurality of segments, and/or each of the plurality of plurality of proper subsets are mutually exclusive and/or collectively exhaustive with respect to the plurality of rows. In various examples, each of the plurality of rows is assigned to have its column values stored in exactly one segment. In various examples, a given row's column values for all columns of the plurality of columns are stored in a same segment of the plurality of segments, for example, across multiple corresponding column slab data.

In various examples, the plurality of column slab data are generated from the dataset based on performing a cluster key-based grouping process to group rows into different record groups, where each record group is processed to generate a corresponding segment group.

In various examples, the dataset corresponds to a portion of a full dataset (e.g. a most recently received set of rows and/or a set of rows identified to be converted into segments at a given time) and/or corresponds to a full dataset. In various examples, the full dataset can correspond to one or more database tables, such as one or more relational database tables, for example, where its rows have the column values for some or all of the set of columns. In various examples, the full dataset corresponds to non-relational row data and/or other records having values for a set of fields (e.g. columns).

In various examples, the set of compressed column slabs includes only one compressed column slab. In various examples, the set of compressed column slabs includes multiple compressed column slabs. In various examples, the set of compressed column slabs corresponds to a set of columns that includes all of the plurality of columns, or only a proper subset of the plurality of columns. In various examples, some or all different ones of the plurality of segments have respective sets of compressed column slabs that correspond to the same set of columns, or different sets of columns.

In various examples, each of the plurality of compression dictionaries are trained from a proper subset of column values in the corresponding one of the plurality of column slab data. In various examples, the proper subset of column values includes one of: a first set of column values from a full set of column values in the corresponding one of the plurality of column slab data and/or a randomly selected set of column values from the full set of column values in the corresponding one of the plurality of column slab data. In various examples, the proper subset of column values in the corresponding one of the plurality of column slab data corresponds to column values of only a proper subset of the proper subset of rows assigned to the corresponding segment.

In various examples, each of the set of compressed column slabs is generated to include: a header; the corresponding one of the plurality of compression dictionaries; and/or compressed data generated based on a compressing one of the plurality of column slab data based on applying the corresponding one of the plurality of compression dictionaries. In various examples, the header is defined by and/or otherwise based on a third-party compression library and/or third-party compression scheme. In various examples, the header is defined by and/or otherwise based on a custom compression library and/or custom compression scheme.

In various examples, each of the set of variable-length compression frames includes a corresponding subset of a plurality of subsets of the proper subset of rows assigned to the each segment. In various examples, the plurality of subsets are mutually exclusive and collectively exhaustive with respect to the proper subset.

In various examples, generating the each of the plurality of segments is further based on writing a set of compression lookup structures corresponding to the set of compressed column slabs.

In various examples, the set of variable-length compression frames are written across a set of fixed-length blocks of the segment.

In various examples, each compression lookup structure of the set of compression lookup structures indicates, for each of the set of fixed-length blocks of the corresponding compressed column slab in which a new frame of the set of variable-length compression frames starts: a frame identifier identifying the new frame; a row identifier for identifying a starting row of the new frame; and/or an offset identifying a starting location of the new frame within the each of the set of fixed-length blocks.

In various examples, at least one frame of the set of variable-length compression frames of the each compressed column slab spans more than two blocks of the set of fixed-length blocks. In various examples, a corresponding compression lookup structure of the set of compression lookup structures indicates a corresponding at least one of the set of fixed-length blocks of the corresponding compressed column slab is entirely consumed by compressed data of a frame of the at least one frame that started in a prior one of the set of fixed-length blocks based on spanning more than two blocks.

In various examples, the method further includes determining compression level parameter data, for example, based on the compression level parameter data being configured via user input. In various examples, the method further includes determining dictionary size parameter data, for example, based on the dictionary size parameter data being configured via the same or different user input. In various examples, the plurality of compression dictionaries are trained based on applying the compression level parameter data and the dictionary size parameter data.

In various examples, generating the each of the plurality of segments is further based on writing compression metadata to the each segment indicating segment compression data for the each segment. In various examples, a first corresponding set of the plurality of column slab data of a first segment of the plurality of segments are compressed in accordance with first segment compression data. In various examples, a second corresponding set of the plurality of column slab data of a second segment of the plurality of segments are compressed in accordance with second segment compression data that is different from the first segment compression data.

In various examples, the first segment compression data is different from the second segment compression data based on the first segment compression data denoting compression of a first subset of columns of the plurality of columns, the second segment compression data denoting compression of a second subset of columns of the plurality of columns, wherein the first subset has a non-null set difference with the second subset.

In various examples, the first segment compression data is different from the second segment compression data based on the first segment compression data denoting compression of a first number of columns of the plurality of columns, the second segment compression data denoting compression of a second number of columns of the plurality of columns, wherein the first number is different from the second number.

In various examples, the first segment compression data is different from the second segment compression data based on the first segment compression data denoting compression of one of the plurality of columns in accordance with first compression parameters, and the second segment compression data denoting compression of the one of the plurality of columns in accordance with second compression parameters different from the first compression parameters.

In various examples, the compressing of each of the corresponding set of the plurality of column slab data is in accordance with a first compression type. In various examples, determining the plurality of column slab data includes generating a set of pre-compressed column data as a subset of the plurality of column slab data by applying a second compression type to column values of at least one of the plurality of columns for rows assigned to at least one segment of the plurality of segments. In various examples, a corresponding subset of the plurality of compression dictionaries are each trained from a corresponding one of the set of pre-compressed column data. In various examples, the at least one of the of a plurality of segments are generated based on writing the set of compressed column slabs to the at least one segment based on further compressing each corresponding one of the set of pre-compressed column data in accordance with the first compression type as the set of variable-length compression frames written to the each segment based on applying the corresponding one of the plurality of compression dictionaries.

In various examples, the second compression type is a global dictionary compression type. In various examples, the same global compression dictionary is utilized to generate the set of pre-compressed column data for the at least one of the plurality of columns for all of the plurality of segments. In various examples, the same global compression dictionary is utilized to generate the pre-compressed column data for multiple ones of the plurality of columns.

In various examples, a first set of column slab data is generated for a first column of the plurality of columns storing a first data type. In various examples, a second set of column slab data is generated for a first column of the plurality of columns storing a second data type. In various examples, the first data type and the second data type are different data types of a set of data types that includes: at least one fixed-length data type; at least one variable-length data type; at least one array data type; and/or at least one tuple data type. For example, the first data type and the second data type are: different fixed-length data types; different variable-length data types; different array data types; and/or different tuple data types. As another example, the first data type is a fixed-length data type and the second data type is a variable-length data type; the first data type is an array data type and the second data type is not an array data type; and/or the first data type is a tuple data type and the second data type is not a tuple data type.

In various examples, the method further includes determining a query having query predicates indicating a first column compressed as compressed column slabs in a set of segments of the plurality of segments. In various examples, the method further includes, for each segment of the set of segments, determining row data for rows satisfying the query predicates. Determining the row data for the rows satisfying the query predicates can be based on: reading the compression dictionary from the each segment; determining a set of rows of the each segment for access; identifying ones of the set of variable-length compression frames of the compressed column slab written for the first column that include ones of the set of rows; and/or generating the row data based on reading only the ones of the set of variable-length compression frames identified to include the ones of the set of rows. In various examples, the method further includes generating a query resultant for the query based on processing the row data for all segments of the set of segments.

In various examples, the method further includes reproducing column values of the first column, for each segment, based on utilizing the compression dictionary to decompress at least one of the set of variable-length compression frames indicated in the row data generated for the each segment.

In various examples, reproducing the column values of the first column is based on decompressing only a portion of one variable-length compression frame of the set of variable-length compression frames, starting from a start of the variable-length compression frame and ending before an end of the variable-length compression frame, based on all ones of the set of rows compressed in the one variable-length compression frame being serially included within the portion of the one variable-length compression frame.

In various examples, identifying the ones of the set of variable-length compression frames of the compressed column slab that include ones of the set of rows is based on accessing a compression lookup structure for the compressed column slab mapping row identifiers of the set of rows to corresponding ones of the set of variable-length compression frames, and further mapping memory location data to corresponding ones of the set of variable-length compression frames.

Figure 25N:
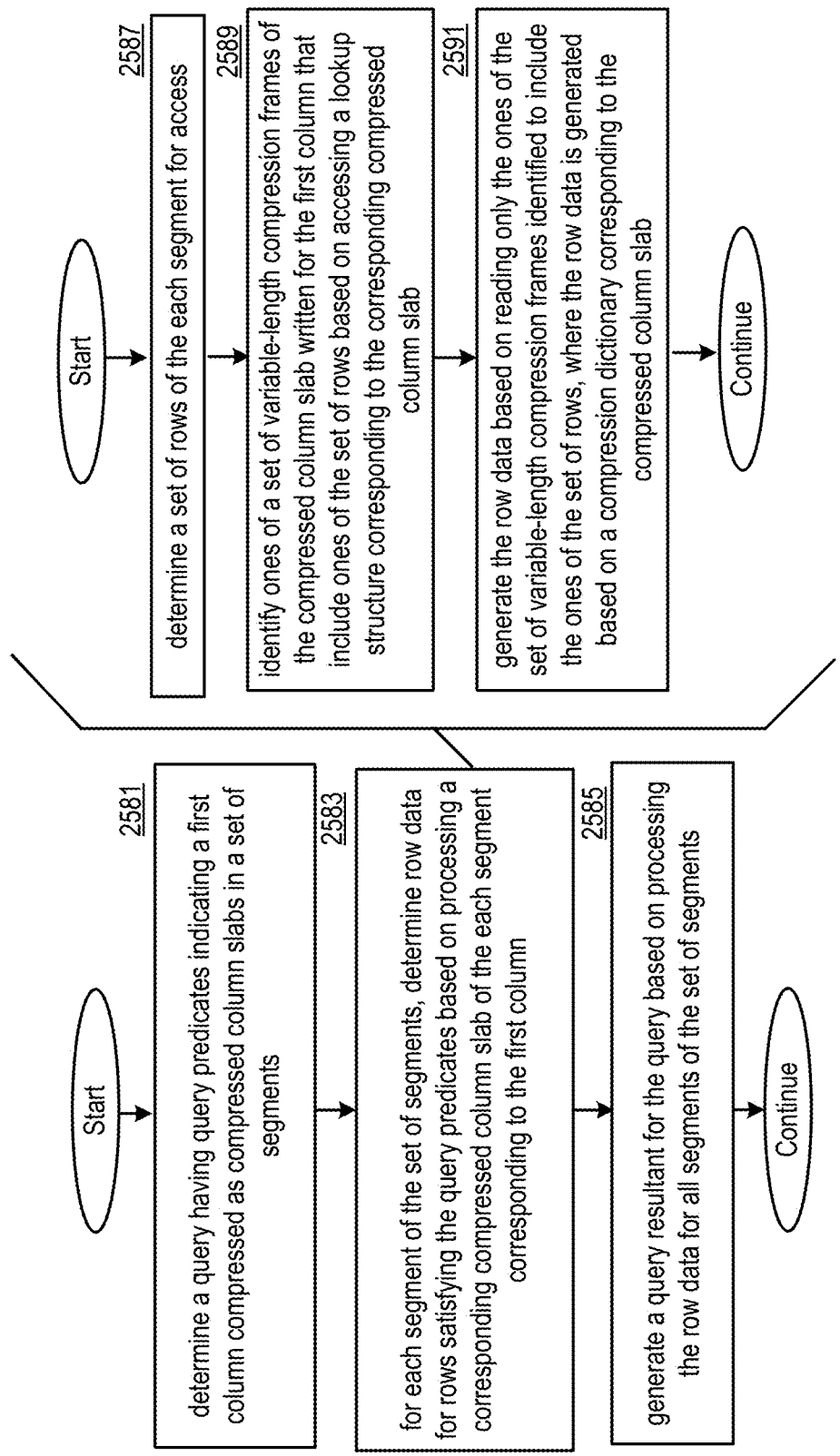
FIG. 25N is a logic diagram illustrating a method for execution in accordance with various embodiments.

In various examples, the method further includes executing a query based on processing compressed column slabs stored in at least some of the plurality of segments based on performing some or all steps of FIG. 25N.

In various embodiments, any one of more of the various examples listed above are implemented in conjunction with performing some or all steps of FIG. 25M and/or FIG. 25N. In various embodiments, any set of the various examples listed above can be implemented in tandem, for example, in conjunction with performing some or all steps of FIG. 25M and/or FIG. 25N and/or any method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 25M described above, for example, in conjunction with further implementing any one or more of the various examples described above.

In various embodiments, a storage system, such as a database system, includes at least one processor and at least one memory that stores operational instructions. In various embodiments, the operational instructions, when executed by the at least one processor, cause the storage system to perform some or all steps of FIG. 25M, for example, in conjunction with further implementing any one or more of the various examples described above.

In various embodiments, the operational instructions, when executed by the at least one processor, cause the storage system to determine a dataset for storage that includes, for each of a plurality of rows of the dataset, a plurality of column values corresponding to a plurality of columns of the dataset; generate a plurality of column slab data from the dataset, where each of the plurality of column slab data includes column values for one of the plurality of columns from a proper subset of rows of the plurality of rows assigned to one of a plurality of segments; train each of a plurality of compression dictionaries from a corresponding one of the plurality of column slab data; and/or generate each segment of the plurality of segments based on writing a set of compressed column slabs to the each segment based on compressing each of a corresponding set of the plurality of column slab data as a set of variable-length compression frames written to the each segment based on applying a corresponding one of the plurality of compression dictionaries.

FIG. 25N illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25N. In particular, a node 37 can utilize a processing module to execute some or all of the steps of FIG. 25N, where multiple nodes 37 implement their own processing modules to independently execute some or all of the steps of FIG. 25N, for example, in conjunction with executing a corresponding query as participants in a query execution plan 2405. For example, a given node 37 executes some or all of the steps of FIG. 25N in conjunction with executing queries via a query processing module 2435 and/or in conjunction accessing data via a corresponding one or more storage devices, such as its own memory drives, where multiple nodes 37 independently execute some or all of the steps of FIG. 25N in conjunction with storing data via their own, separate storage devices.

Some or all of the method of FIG. 25N can be performed by utilizing a query execution module 2504, for example, by implementing at least one segment reader 2650, in accordance with some or all features and/or functionality described in conjunction with FIGS. 25A-25L. Some or all of the steps of FIG. 25N can optionally be performed by any other processing module of the database system 10. Some or all steps of FIG. 25N can be performed by database system 10 in accordance with other embodiments of the database system 10 and/or nodes 37 discussed herein. Some or all of the steps of FIG. 25N can optionally be performed in conjunction with performing some or all steps of FIG. 25M.

Step 2581 includes determining a query having query predicates indicating a first column compressed as compressed column slabs in a set of segments. Step 2583 includes, for each segment of the set of segments, determining row data for rows satisfying the query predicates based on processing a corresponding compressed column slab of the each segment corresponding to the first column. Step 2585 includes generating a query resultant for the query based on processing the row data for all segments of the set of segments.

Performing step 2583 can include performing some or all of steps 2587, 2589, and/or 2591. Step 2587 includes determining a set of rows of the each segment for access. Step 2589 includes identifying ones of a set of variable-length compression frames of the compressed column slab written for the first column that include ones of the set of rows based on accessing a lookup structure corresponding to the corresponding compressed column slab. Step 2589 includes generating the row data based on reading only the ones of the set of variable-length compression frames identified to include the ones of the set of rows, where the row data is generated based on a compression dictionary corresponding to the compressed column slab.

In various examples, the method further includes loading the lookup structure from storage resources in conjunction with accessing the each segment. In various examples, the lookup structure is read from the each segment based on being stored within the each segment. In various examples, the lookup structure is read from the compressed column slab based on being stored within the compressed column slab.

In various examples, the method further includes loading the corresponding compression dictionary from storage resources in conjunction with accessing the each segment. In various examples, the corresponding compression dictionary is read from the each segment based on being stored within the each segment. In various examples, the corresponding compression dictionary is read from the compressed column slab based on being stored within the compressed column slab.

In various examples, the query predicates further indicate at least one additional column of the plurality of columns. In various examples, the at least one additional column is compressed, where the method further includes, for each segment of the set of segments, processing at least one additional corresponding compressed column slab of the each segment corresponding to the at least one additional column. In various examples, the at least one additional is uncompressed, where the method further includes, for each segment of the set of segments, processing at least one corresponding uncompressed column slab of the each segment corresponding to the at least one additional column.

In various examples, determining the set of rows of the each segment for access is based on applying at least one prior IO pipeline element of an IO pipeline generated for the each segment. In various examples, the set of rows is a row list emitted based on having applied at least one: filtering operator, source operator, index element. intersection element, union element, or other IO pipeline element for the first column or for other columns. In various examples, the same IO pipeline is applied across all segments. In various examples, different IO pipelines are generated for different segments. In various examples, the IO pipelines are different for different segments based on at least one segment having different ones of the sets of columns compressed.

In various examples, the first column is uncompressed as uncompressed column slabs in a second set of segments. In various examples, the method further includes, for each additional segment of the second set of segments, determining additional row data for rows satisfying the query predicates based on processing a corresponding uncompressed column slab of the each additional segment corresponding to the first column. In various examples, the a query resultant for the query is generated further based on processing the additional row data for all additional segments of the second set of segments.

In various examples, the row data is generated based on decompressing the column values for the set of rows based on applying the compression dictionary to the ones of the set of variable-length compression frames. In various examples, the row data indicates the decompressed column values based on the ones of the set of variable-length compression frames being decompressed.

In various examples, the row data is generated as view that can enable finding, decompressing, and/or materializing of rows from the loaded frames at a later time (e.g. if the corresponding column values are determined to be necessary for generation of the query resultant), for example, on-demand. In various examples, the column values for all of the set of rows is not decompressed, for example, based on column values of the first column not requiring materialization (e.g. the row identifiers are used to filter rows based on predicates applied to the first column, where other column values of other columns are projected in the resultant and/or are processed to generate the resultant), and/or based on at least some rows of the first column being filtered out via other filtering (e.g. based on other predicates), where only the column values of the first column of the remaining rows are materialized based on the view and/or other relevant information indicated in the row data.

In various examples, the method further includes generating the compressed column slab for each segment of the set of segments based on performing some or all of the method of FIG. 25M.

In various embodiments, any one of more of the various examples listed above are implemented in conjunction with performing some or all steps of FIG. 25M and/or FIG. 25N. In various embodiments, any set of the various examples listed above can be implemented in tandem, for example, in conjunction with performing some or all steps of FIG. 25M and/or FIG. 25N and/or any method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 25N described above, for example, in conjunction with further implementing any one or more of the various examples described above.

In various embodiments, a storage system, such as a database system, includes at least one processor and at least one memory that stores operational instructions. In various embodiments, the operational instructions, when executed by the at least one processor, cause the storage system to perform some or all steps of FIG. 25N, for example, in conjunction with further implementing any one or more of the various examples described above.

In various embodiments, the operational instructions, when executed by the at least one processor, cause the storage system to: determine a query having query predicates indicating a first column compressed as compressed column slabs in a set of segments; determine, for each segment of the set of segments, row data for rows satisfying the query predicates based on processing a corresponding compressed column slab of the each segment corresponding to the first column; and/or generating a query resultant for the query based on processing the row data for all segments of the set of segments. In various embodiments, processing the corresponding compressed column slab of the each segment is based on: determining a set of rows of the each segment for access; identifying ones of a set of variable-length compression frames of the compressed column slab written for the first column that include ones of the set of rows based on accessing a lookup structure corresponding to the corresponding compressed column slab; and/or generating the row data based on reading only the ones of the set of variable-length compression frames identified to include the ones of the set of rows, where the row data is generated based on a compression dictionary corresponding to the compressed column slab.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a data input sub-system of a database system, the method comprising:
   receiving data of a dataset for storage, wherein the dataset includes a plurality of rows and a plurality of columns, a row of a plurality of rows includes a plurality of column values corresponding to the plurality of columns, wherein a set of rows of the plurality of row corresponds to an uncompressed data segment;
   when the uncompressed data segment has been received, generating a plurality of column slab data from the uncompressed data segment, wherein a first column slab data of the plurality of column slab data includes column values of a first column of the plurality of columns of the uncompressed data segment;
   training a compression scheme and/or library based on compression configuration data and on the plurality of column slab data to produce a plurality of compression dictionaries, wherein a first compression dictionary of the plurality of compression dictionaries is based on at least a portion of the compression configuration data and on at least a portion of the first column slab data of the plurality of column slab data;
   data compressing the plurality of column slab data based on the plurality of compression dictionaries to produce a plurality of compressed column slabs, wherein the first column slab data is data compressed based on the first compression dictionary to produce a first compressed column slab data of the plurality of compressed column slab data; and
   storing the plurality of compressed column slab data as a compressed data segment.

2. The method of claim 1, wherein the at least a portion of the first column slab data comprises one of:
   a first set of column values of the column values of the first column; or a randomly selected set of column values of the column values of the first column.

3. The method of claim 1, wherein storing the first compressed column slab data further comprises:
   storing a header as being associated with the first compressed column slab data; and
   storing the first compression dictionary as being associated with the first compressed column slab data.

4. The method of claim 1, wherein data compressing the first column slab data comprises:
   data compressing the first column slab data into a set of variable-length compression frames.

5. The method of claim 1, wherein data compressing the first column slab data comprises:
   data compressing the first column slab data into a set of fixed length blocks.

6. The method of claim 1, wherein data compressing the first column slab data comprises:

data compressing the first column slab data into a subset of fixed length blocks and into a subset of variable length compression frames.

7. The method of claim 1, wherein the compression configuration data further comprising:
   a compression level parameter; and
   a dictionary size parameter.

8. The method of claim 7 further comprises:
   the compression level parameter including a plurality of compression levels, wherein a first compression level of the plurality of compression levels corresponds to training of the first compression dictionary; and
   the dictionary size parameter includes a plurality of dictionary sizes, wherein a first dictionary size of the plurality of dictionary sizes corresponds to training of the first compression dictionary.

9. The method of claim 1 further comprises:
   when a second uncompressed data segment has been received, generating a second plurality of column slab data from the second uncompressed data segment, wherein a second-first column slab data of the second plurality of column slab data includes second column values of the first column of the plurality of columns of the second uncompressed data segment;
   training the compression scheme and/or library based on the compression configuration data and on the second plurality of column slab data to produce a second plurality of compression dictionaries, wherein a second-first compression dictionary of the second plurality of compression dictionaries is based on at least a portion of the compression configuration data and on at least a portion of the second-first column slab data;
   data compressing the second plurality of column slab data based on the second plurality of compression dictionaries to produce a second plurality of compressed column slabs, wherein the second-first column slab data is data compressed based on the second-first compression dictionary to produce a second-first compressed column slab data of the second plurality of compressed column slab data; and
   storing the second plurality of compressed column slab data as a second compressed data segment.

10. The method of claim 1 further comprises:
    when a second uncompressed data segment has been received, generating a second plurality of column slab data from the second uncompressed data segment, wherein a second-first column slab data of the second plurality of column slab data includes second column values of the first column of the plurality of columns of the second uncompressed data segment;
    training a second compression scheme and/or library based on second compression configuration data and on the second plurality of column slab data to produce a second plurality of compression dictionaries, wherein a second-first compression dictionary of the second plurality of compression dictionaries is based on at least a portion of the compression configuration data and on at least a portion of the second-first column slab data;
    data compressing the second plurality of column slab data based on the second plurality of compression dictionaries to produce a second plurality of compressed column slabs, wherein the second-first column slab data is data compressed based on the second-first compression dictionary to produce a second-first compressed column slab data of the second plurality of compressed column slab data; and
    storing the second plurality of compressed column slab data as a second compressed data segment.

11. A database system comprises:
    a data input sub-system that is operably coupled to:
       receive data of a dataset for storage, wherein the dataset includes a plurality of rows and a plurality of columns, a row of a plurality of rows includes a plurality of column values corresponding to the plurality of columns, wherein a set of rows of the plurality of row corresponds to an uncompressed data segment;
       when the uncompressed data segment has been received, generate a plurality of column slab data from the uncompressed data segment, wherein a first column slab data of the plurality of column slab data includes column values of a first column of the plurality of columns of the uncompressed data segment;
       train a compression scheme and/or library based on compression configuration data and on the plurality of column slab data to produce a plurality of compression dictionaries, wherein a first compression dictionary of the plurality of compression dictionaries is based on at least a portion of the compression configuration data and on at least a portion of the first column slab data of the plurality of column slab data;
       data compress the plurality of column slab data based on the plurality of compression dictionaries to produce a plurality of compressed column slabs, wherein the first column slab data is data compressed based on the first compression dictionary to produce a first compressed column slab data of the plurality of compressed column slab data; and
       store the plurality of compressed column slab data as a compressed data segment.

12. The database system of claim 11, wherein the at least a portion of the first column slab data comprises one of:
    a first set of column values of the column values of the first column; or a randomly selected set of column values of the column values of the first column.

13. The database system of claim 11, wherein the data input sub-system is further operable to store the first compressed column slab data by:
    storing a header as being associated with the first compressed column slab data; and
    storing the first compression dictionary as being associated with the first compressed column slab data.

14. The database system of claim 11, wherein the data input sub-system is further operable to data compress the first column slab data by:
    data compressing the first column slab data into a set of variable-length compression frames.

15. The database system of claim 11, wherein the data input sub-system is further operable to data compress the first column slab data by:
    data compressing the first column slab data into a set of fixed length blocks.

16. The database system of claim 11, wherein the data input sub-system is further operable to data compress the first column slab data by:
    data compressing the first column slab data into a subset of fixed length blocks and into a subset of variable length compression frames.

17. The database system of claim 11, wherein the compression configuration data further comprising:
    a compression level parameter; and
    a dictionary size parameter.

18. The database system of claim 17 further comprises:
the compression level parameter including a plurality of compression levels, wherein a first compression level of the plurality of compression levels corresponds to training of the first compression dictionary; and
the dictionary size parameter includes a plurality of dictionary sizes, wherein a first dictionary size of the plurality of dictionary sizes corresponds to training of the first compression dictionary.

19. The database system of claim 11, wherein the data input sub-system is further operable to:
when a second uncompressed data segment has been received, generate a second plurality of column slab data from the second uncompressed data segment, wherein a second-first column slab data of the second plurality of column slab data includes second column values of the first column of the plurality of columns of the second uncompressed data segment;
train the compression scheme and/or library based on the compression configuration data and on the second plurality of column slab data to produce a second plurality of compression dictionaries, wherein a second-first compression dictionary of the second plurality of compression dictionaries is based on at least a portion of the compression configuration data and on at least a portion of the second-first column slab data;
data compress the second plurality of column slab data based on the second plurality of compression dictionaries to produce a second plurality of compressed column slabs, wherein the second-first column slab data is data compressed based on the second-first compression dictionary to produce a second-first compressed column slab data of the second plurality of compressed column slab data; and
store the second plurality of compressed column slab data as a second compressed data segment.

20. The database system of claim 11, wherein the data input sub-system is further operable to:
when a second uncompressed data segment has been received, generate a second plurality of column slab data from the second uncompressed data segment, wherein a second-first column slab data of the second plurality of column slab data includes second column values of the first column of the plurality of columns of the second uncompressed data segment;
train a second compression scheme and/or library based on second compression configuration data and on the second plurality of column slab data to produce a second plurality of compression dictionaries, wherein a second-first compression dictionary of the second plurality of compression dictionaries is based on at least a portion of the compression configuration data and on at least a portion of the second-first column slab data;
data compress the second plurality of column slab data based on the second plurality of compression dictionaries to produce a second plurality of compressed column slabs, wherein the second-first column slab data is data compressed based on the second-first compression dictionary to produce a second-first compressed column slab data of the second plurality of compressed column slab data; and
store the second plurality of compressed column slab data as a second compressed data segment.

* * * * *